(12) United States Patent
Abe et al.

(10) Patent No.: US 7,664,178 B2
(45) Date of Patent: *Feb. 16, 2010

(54) MOVING PICTURE CODING METHOD AND MOVING PICTURE DECODING METHOD

(75) Inventors: Kiyofumi Abe, Kadoma (JP); Shinya Kadono, Nishinomiya (JP); Makoto Hagai, Moriguchi (JP); Satoshi Kondo, Yawata (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/976,826

(22) Filed: Oct. 29, 2007

(65) Prior Publication Data

US 2008/0069212 A1   Mar. 20, 2008

Related U.S. Application Data

(62) Division of application No. 10/473,350, filed as application No. PCT/JP03/00992 on Jan. 31, 2003.

(30) Foreign Application Priority Data

Feb. 1, 2002   (JP) ............................ 2002-026197
Nov. 18, 2002  (JP) ............................ 2002-334422

(51) Int. Cl.
   *H04N 7/12*   (2006.01)
   *H04N 11/02*  (2006.01)

(52) U.S. Cl. .............................. 375/240.13; 375/240.24

(58) Field of Classification Search ................
         375/240.01–240.06, 240.12–240.16, 240.24,
         375/240.26
   See application file for complete search history.

(56) References Cited

U.S. PATENT DOCUMENTS 5,488,570 A * 1/1996 Agarwal ...................... 345/501

(Continued)

FOREIGN PATENT DOCUMENTS

JP       10-23423       1/1998

(Continued)

OTHER PUBLICATIONS

Thomas Wiegand, "H.26L Test Model Long Term No. 9 (TML9) draft0", ITU—Telecommunications Standardization Sector, Study Group 16, Video Coding Experts Group (VCEG), Dec. 21, 2001, pp. 1-80.

(Continued)

*Primary Examiner*—David Czekaj
(74) *Attorney, Agent, or Firm*—Wenderoth, Lind & Ponack, L.L.P.

(57) ABSTRACT

A moving picture coding apparatus (10a) according to the present invention includes a level analyzer (100a) that decides the maximum number of intra frame pixels which can be coded (Nfpx) and the maximum number of storage pixels which can be stored in a picture memory of a decoding apparatus (Nspx) on the basis of a level identifier (Lst) indicating a coding level that is designated by the user, thereby judging whether coding of an input image is possible or not and calculating the maximum number of reference pictures (Nrpn) as the number of reference candidate pictures which can be referred to at inter picture prediction coding, on the basis of the maximum number of intra frame pixels (Nfpx) and the input image size (the number of vertical pixels (Nhpx) and the number of horizontal pixels (Nwpx)). A decoding apparatus to which a bit stream from the moving picture coding apparatus (10a) is supplied can always decode the bit stream satisfactorily, and perform inter picture prediction decoding corresponding to the inter picture prediction coding on the coding end. Consequently, memory areas of a coding apparatus and a decoding apparatus that are adapted to a coding method in which there is no restraint on the capacity of the memory area can be designed.

4 Claims, 24 Drawing Sheets

U.S. PATENT DOCUMENTS

| | | | |
|---|---|---|---|
| 5,687,257 | A | 11/1997 | Paik et al. |
| 5,959,672 | A * | 9/1999 | Sasaki ................... 375/240.23 |
| 6,111,915 | A | 8/2000 | Fukunaga et al. |
| 6,112,205 | A | 8/2000 | Nakaya et al. |
| 6,188,798 | B1 | 2/2001 | Lee |
| 6,208,689 | B1 | 3/2001 | Ohira et al. |
| 6,256,347 | B1 * | 7/2001 | Yu et al. ................. 375/240.13 |
| 6,381,275 | B1 | 4/2002 | Fukunaga et al. |
| 6,512,793 | B1 | 1/2003 | Maeda |
| 6,571,019 | B1 * | 5/2003 | Kim et al. ................... 382/246 |
| 6,766,059 | B1 * | 7/2004 | Kondo ........................ 382/236 |
| 6,788,353 | B2 | 9/2004 | Wredenhagen et al. |
| 6,968,082 | B2 | 11/2005 | Obrador |
| 2002/0071485 | A1 | 6/2002 | Caglar et al. |

FOREIGN PATENT DOCUMENTS

| | | |
|---|---|---|
| JP | 10-271507 | 10/1998 |
| JP | 2000-152234 | 5/2000 |
| WO | 01/86960 | 11/2001 |

OTHER PUBLICATIONS

Iain E. G. Richardson, "H.264/MPEG-4 Part 10 Tutorials", "Switching P and I Slices", pp. 1 of 4 to 4 of 4, [online], Jan. 31, 2003, vcodex: H.264 tutorial white papers, [retrieval date May 7, 2003], Internet<http://www.vcodex.fsnet.co.uk/h264.html>.

Bo Hong, "Introduction to H.264", [online], Nov. 22, 2002, Multimedia Communications Laboratory University of Texas at Dallas, [retrieval date May 7, 2003], Internet<http://www.utdallas.edu/~bhong/h264.pdf>.

Teruhiko Suzuki, "Shotai Koen MPEG-4AVC|H. 264 no Gaiyo to Hyojunka Doko", The Institute of Electronics, Information and Communication Engineers Kenkyu Hokoku, The Institute of Electronics, Information and Communication Engineers, Nov. 14, 2002, vol. 102, No. 440 (IN2002 103-115), pp. 69 to 73.

G. Sullivan, "Draft for H.263++ Annexes U, V, and W to Recommendation H.263" ITU-T H.263++ Draft for H.263++ Annexes U, V and W to Recommendation H.263, Nov. 2000, pp. 1-46.

Thomas Wiegand et al., "Long-Term Memory Motion-Compensated Prediction", IEEE Transactions on Circuits and Systems for Video Technology, IEEE Service Center, Piscataway, NJ, US, vol. 9, No. 1, Feb. 1999.

International Search Report (in English language) issued May 20, 2003 in International Application No. PCT/JP03/00992.

Supplementary European Search Report (in English language) issued May 30, 2006 in European Application No. 03 70 3124.

Dave Lindbergh, "*Updated Profile Framework for JVT Codec*", Joint Video Team (JVT) of ISO/IEC MPEG & ITU-T VCEG (ISO/IEG JTC1/SC29/WG11 and ITU-T SG16 Q.6), Jan. 2002.

Office Action issued Jan. 9, 2009 in U.S. Appl. No. 10/473,350.

Office Action issued May 12, 2009 in U.S. Appl. No. 11/976,847.

\* cited by examiner

Fig.15

| level identifier | maximum intra frame pixel number (Nfpx) | maximum storage pixel number (Nspx) |
|---|---|---|
| 1 | 25344 | 50688 |
| 2 |  | 152064 |
| 3 | 101376 | 202752 |
| 4 |  | 608256 |
| 5 | 405504 | 811008 |
| 6 |  | 2433024 |
| 7 | 2088960 | 4177920 |
| 8 |  | 12533760 |

| level identifier | maximum intra frame pixel number(Nfpx) |
|---|---|
| 1 | 25344 |
| 2 | 101376 |
| 3 | 405504 |
| 4 | 2088960 |

| level identifier | maximum storage pixel number(Nspx) |
|---|---|
| 1 | 50688 |
| 2 | 152064 |
| 3 | 202752 |
| 4 | 608256 |
| 5 | 811008 |

| identification number | vertical pixel number calculation coefficient(N α hpx) | horizontal pixel number calculation coefficient(N α wpx) |
|---|---|---|
| 1 | 64 | 128 |
| 2 | 128 | 256 |
| 3 | 256 | 512 |
| 4 | 512 | 1024 |

| identification number | horizontal pixel number calculation coefficient(N α wpx) |
|---|---|
| 1 | 128 |
| 2 | 256 |
| 3 | 512 |
| 4 | 1024 |

| identification number | vertical pixel number calculation coefficient(N α hpx) |
|---|---|
| 1 | 64 |
| 2 | 128 |
| 3 | 256 |
| 4 | 512 |

| identification number | maximum vertical pixel number(H) | maximum horizontal pixel number(W) |
|---|---|---|
| 1 | 96 | 128 |
| 2 | 144 | 176 |
| 3 | 288 | 352 |
| 4 | 480 | 720 |

| identification number | maximum horizontal pixel number(W) |
|---|---|
| 1 | 128 |
| 2 | 176 |
| 3 | 352 |
| 4 | 720 |

| identification number | maximum vertical pixel number(H) |
|---|---|
| 1 | 96 |
| 2 | 144 |
| 3 | 288 |
| 4 | 480 |

T3b

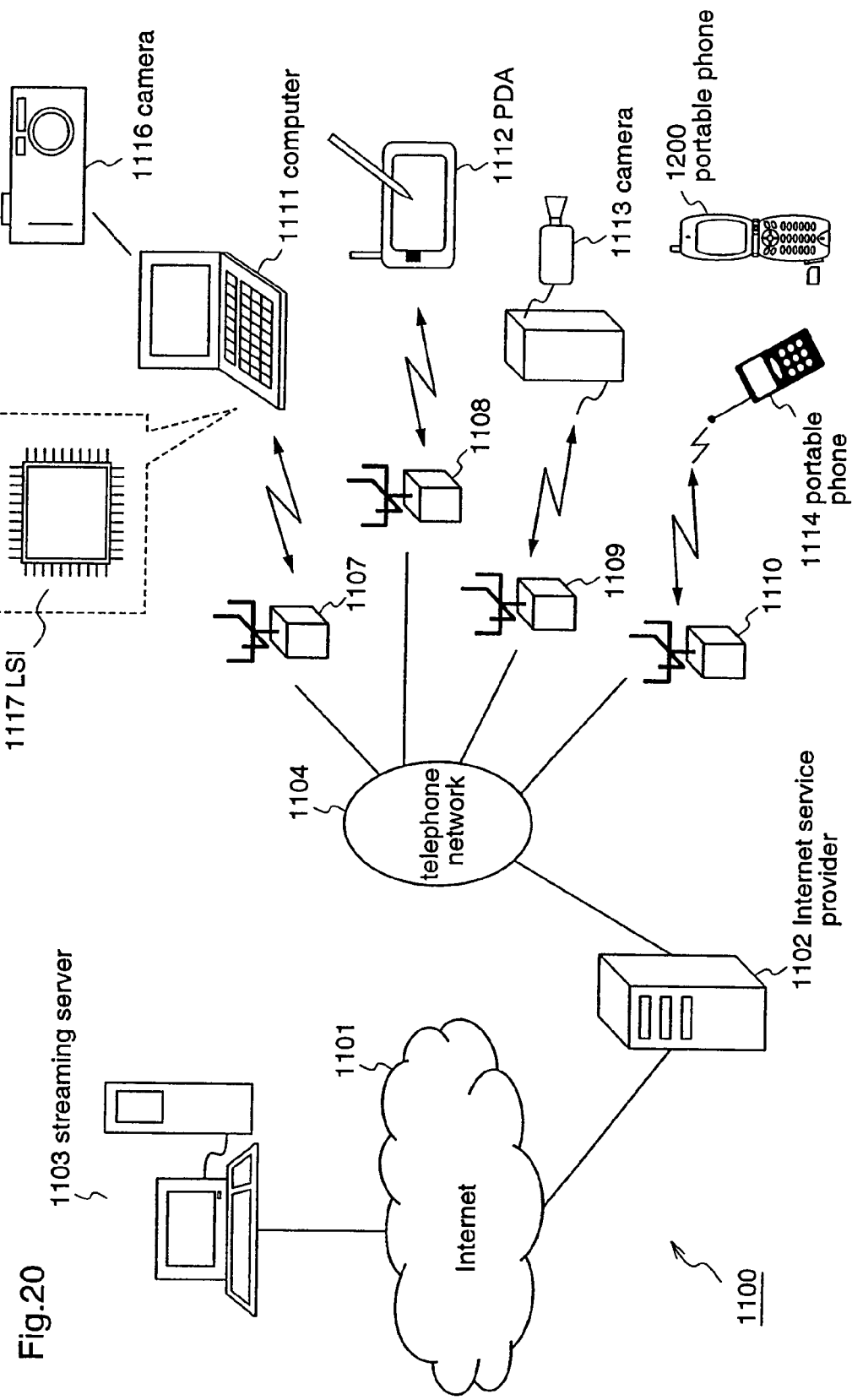

MOVING PICTURE CODING METHOD AND MOVING PICTURE DECODING METHOD

This is a divisional application of Ser. No. 10/473,350, filed Sep. 30, 2003, which is the National Stage of International Application No. PCT/JP03/00992, filed Jan. 31, 2003.

TECHNICAL FIELD

The present invention relates to a moving picture coding method and a moving picture decoding method and, more particularly, to a coding method for coding digital data of moving pictures which are to be transmitted or stored, and a decoding method corresponding to the coding method.

BACKGROUND ART

A moving picture consists of a plurality of pictures, and each picture consists of a predetermined number of pixels. Coding of a moving picture is carried out for each picture, and coding of each picture is carried out with taking a block which is obtained by partitioning the picture as a unit.

Generally, coding of a moving picture carries out compression of information amount by eliminating redundancy in time direction and in space direction.

For example, an inter picture prediction coding aiming at eliminating temporal redundancy carries out motion estimation and motion compensation for the target picture which is to be coded in block units with referring to pictures which are located temporally forward or backward of the target picture to generate prediction information, and then codes the difference between the prediction information and the target picture information. A picture which is located temporally forward of the target picture is a preceding picture, which is displayed earlier than the target picture, while a picture which is located temporally backward of the target picture is a following picture, which is displayed later than the target picture.

The H.264 coding system which is now being standardized as a moving picture coding system carries out motion compensation with respect to the target picture with referring to arbitrary two pictures which are located temporally forward and backward of the target picture. The H.264 is numbered as a recommendation number by ITU-T (International Telecommunication Union-Telecommunication Standardization Sector).

The coding aiming at eliminating spatial redundancy is carried out using coding information of the coded blocks which were already coded and which are positioned surrounding the target block.

However, when designing a coding apparatus and a decoding apparatus according to the H.264 system, there arises a problem that it is not possible to appropriately decide the sizes of the memory areas which are required in these apparatus. This is caused by that the degree of freedom concerning the number of reference pictures which are referred at inter picture prediction coding is extremely high.

Generally, in the coding method for a moving picture which consists of plural pictures, coding of a moving picture is carried out for each picture, and coding of each picture is carried out with taking a block which is obtained by dividing the picture (hereinafter, referred to as macroblock) as a unit.

For example, the coding of a picture P is carried out for each macroblock MB constituting the picture P, successively along an arrow B as shown in FIG. 24(a). Further, coding of the macroblock MB12 as a target block is carried out by predicting information such as motion vector, i.e., coding information, for the target macroblock with referring to the coding information for macroblocks MB3, MB4, MB5, and MB12 which are located at above and at sides of the target macroblock MB12.

Therefore, it is necessary to hold the coding information of such as the above macroblocks MB3 to MB11 which are located at above and at side of the target macroblock MB12 in order to perform prediction of coding information in coding macroblocks which are coded lately relative to the macroblock 12 until the coding process for the target macroblock MB12 is completed. In other words, in coding processing for each picture, coded information of macroblocks of approximately one row are always held. Therefore, in a case where the target image is an image that is laterally long, i.e., long in the horizontal direction, the coded information which is to be held in the coding processing becomes large. Accordingly, when designing an apparatus which can perform coding of an image that is laterally long, i.e., long in the horizontal direction, it is required to secure a large memory area for storing the coding information. Meanwhile, the coding information of macroblocks MB1 and MB2 shown in FIG. 24(b) are not referred to at coding of a macroblock whose coding order follows the macroblock MB12.

It is needless to say that a larger storage area for storing the coding information, is required also when designing a decoding apparatus that can decode an image having a longer lateral side, similarly as when designing a coding apparatus.

In the H.264 coding system, however, no requirements are currently imposed on images for their pixel numbers in the horizontal and vertical direction. This leads to a situation where the minimum size for a storage area that is required for appropriately performing coding or decoding of an image according to the H.264 standard is not decided.

In addition, when inter picture prediction coding or decoding is performed according to the H.264 standard, it is required to store all preceding and following pictures which are likely to be referred to in a picture memory.

To be brief, in the conventional MPEG (Moving Picture Experts Group)-2 or MPEG-4 method, pictures which can be referred to at the inter picture prediction coding or inter picture prediction decoding, i.e., reference candidate picture, are shared by all blocks of the target picture to be coded or decoded. For example, when the target picture is a B picture which can refer to two other processed pictures at maximum, pictures which are referred to at coding or decoding of each block, i.e., reference pictures, are selected from two reference candidate pictures that are decided for the target picture. When the target picture is a P picture which can refer to only one processed picture, only a reference picture which is decided for the target picture, is used as a picture that is referred to at coding or decoding of each block.

Descriptions of the reference pictures are given in a following part of the MPEG-4 Standard:
ISO/IEC 14496-2:1999(E)
Information technology—coding of audio-visual objects
Part 2: Visual
(1999 Dec. 1)
PP. 328, 329 Annex N On the other hand, in the H.264 coding method, a picture that is referred to at the inter picture prediction coding or inter picture prediction decoding, i.e., a reference picture, is selected from plural processed pictures whose image data are stored in a picture memory, for each block in a target picture to be coded or decoded. For example, in a case where the target picture is a B picture, for which each block is coded or decoded with referring to two other processed pictures at maximum, two pictures at maximum which are selected from plural processed pictures image data of which are stored in a picture memory, are referred to at coding or decoding of each block as reference pictures. In a case where the target picture is a P picture, for which each block is coded or decoded with referring to only one processed picture, a picture which is selected from plural processed pictures image data of which are stored in the picture memory is employed as a picture to be referred to at coding or decoding of each block, as a reference picture.

As discussed above, according to the MPEG-2 or MPEG-4 method, when the target picture is a P picture, one processed picture is a candidate for the reference picture, i.e., a reference candidate picture, and when the target picture is a B picture, two processed pictures are reference candidate pictures, while according to the H.264 method, both in cases where the target picture is a P picture and where the target picture is a B picture, plural processed pictures whose image data are stored in the picture memory, serve as candidates for the reference picture, i.e., reference candidate pictures.

FIG. 25 is a diagram for explaining a specific control of a picture memory according to the H.264 system. FIG. 25 shows a case where a picture memory can hold image data of four pictures. That is, in this case, three pictures among these four pictures, other than a target picture to be processed, are reference candidate pictures that may be referred to.

For example, when inter picture prediction coding or inter picture prediction decoding is carried out with taking picture P5 as a target picture to be processed as shown in FIG. 25, pictures P2 to P4 whose image data are stored in a picture memory Mpt are adopted as reference candidate pictures. Here, pictures P1 to P5 are arranged in coding order (or decoding order), and these pictures are coded or decoded in the order of arrangement. Thus, pictures which are displayed earlier than the target picture P5 among the reference candidate pictures P2 to P4, are preceding pictures for the target picture P5, and pictures which are displayed later than the target picture P5 among the reference candidate pictures P2 to P4, are following pictures for the target picture P5.

In a decoding apparatus, even when a previously decoded picture is a decoded picture that is other than reference candidate pictures which are employed for referring in the inter picture prediction decoding for the target picture, i.e., a decoded picture that is not employed as a reference picture, image data of the decoded picture must be stored in a picture memory as a display waiting picture until the order of display comes.

FIG. 26 are diagrams schematically showing the display wait pictures. FIG. 26(a) shows plural pictures constituting a moving picture, which are pictures that may be used as reference pictures (reference candidate pictures) [used], and pictures that would not be used as reference pictures [unused]. FIG. 26(b) shows the relationship between the decoding timing and the display timing of each picture.

For the purpose of illustration, FIG. 26 show a case where reference pictures [used] which are used at coding or decoding of each block in B picture are both or either of two reference candidate pictures that are commonly used for all blocks in this B picture, and reference pictures [used] which are used at the coding or decoding of each block in P picture are one reference candidate picture that is commonly used for all blocks in this P picture. However, in the H.264 method, a picture to be referred to at picture coding or decoding, i.e., a reference picture, is selected from plural processed pictures whose image data are stored in picture memory, for each block of a target picture to be coded or decoded. Therefore, the reference candidate pictures which are used at coding or decoding of B picture are not restricted to two specific pictures for each B picture as shown in FIG. 26(a), and the reference candidate picture that is used at coding or decoding of P picture is not restricted to one specific picture for each P picture as shown in FIG. 26(a).

In FIG. 26(a), reference candidate pictures for B picture B1 are an I picture I0 and B picture B2, and reference candidate pictures for B picture B2 are I picture I0 and P picture P4. Further, reference candidate pictures for B picture B3 are B picture B2 and P picture P4, and a reference candidate picture for P picture P8 is P picture P4.

FIG. 26(b) shows that respective pictures shown in FIG. 26(a) are decoded in the order of pictures I0, P4, B2, B1, B3, P8, B6, B5, B7, and then displayed in the order of pictures I0, B1, B2, B3, P4, B5, B6, B7, P8.

In FIG. 26(b), Tdec shows the time axis for representing the decoding times of respective pictures, and Tdsp shows the time axis for representing the display times of respective pictures. In addition, tdec(0), tdec(1), tdec(2), tdec(3), tdec(4), tdec(5), tdec(6), tdec(7), and tdec(8) denote the time periods in which decoding of pictures I0, B1, B2, B3, P4, B5, B6, B7, and P8 are carried out, respectively. Further, tdsp(0), tdsp(1), tdsp(2), tdsp(3), tdsp(4), tdsp(5), tdsp(6), tdsp(7), and tdsp(8) denote the time periods in which display of pictures I0, B1, B2, B3, P4, B5, B6, B7, and P8 are carried out, respectively.

In this case, the decoding times of the pictures B2, B1, B3, P8, B6, B5 and B7 roughly coincide with the display times of the pictures I0, B1, B2, B3, P4, B5, and B6, respectively, as shown in FIG. 26(b). In addition, the control of the picture memory is performed so that image data of decoded pictures are stored in the picture memory, and the image data of the pictures are deleted successively from pictures which have been displayed.

In this case, for example, I picture I0 is displayed after waiting for the B picture B2 being decoded.

The image data of the reference candidate pictures are stored in the picture memory, and these pictures are employed as reference pictures until these pictures are displayed later. However, image data of pictures that are not referred to also must be kept until these pictures are displayed after being decoded. The image data of such decoded pictures that are not employed as reference pictures, are stored in a predetermined memory as display waiting pictures until these pictures are displayed.

In FIG. 26(a), B picture B1 that is decoded after I picture I0 being decoded, is a picture that is not used as a reference picture and will be displayed subsequent to I picture I0, and therefore, it can be displayed immediately after the decoding thereof, while B picture B3 that is decoded after B picture B1 being decoded, is a picture that will be displayed after B picture B2 being displayed, that follows B picture B1, and therefore, it will be displayed with waiting for a display period of one picture, i.e., B picture B2, after B picture B1 being decoded.

In this case, the number of display waiting picture(s) at the decoding start timing of P picture P8 is only one, i.e., B picture B3.

Further, there arises no problem by that the image data of pictures which will not be used as reference pictures should be deleted immediately after the display of those pictures is completed. However, the timing of deleting the image data of these pictures may be other than immediately after the display of those pictures being performed.

In such cases, the image data of the pictures which are not used as reference pictures, would be kept stored in the memory also after these pictures are displayed, and these pictures whose image data are held in the picture memory are also handled as display waiting pictures.

For example, in a case where the control of the picture memory is carried out such that image data of a picture which is stored in the picture memory but is not used as a reference picture, is deleted from the picture memory after a display time of one picture expiring after the picture was displayed, the number of display waiting pictures at the start of decoding of P picture P8 amounts to two, i.e., B picture B2 and B picture B3.

As discussed above, plural decoded or coded pictures are stored in a picture memory of a decoding apparatus or a coding apparatus, while in the H.264 coding system there is currently no limitations on the maximum number of reference candidate pictures which are employed at the inter picture prediction coding or decoding, i.e., the maximum reference picture number.

Thus, in the design of a coding apparatus or a decoding apparatus according to the H.264 system, the maximum number of decoded or coded pictures which are to be stored in the picture memory cannot be established, and therefore the capacity of a storage area to be mounted in the apparatus cannot be decided.

The present invention is made to solve the above-mentioned problems, and has for its object to provide a moving picture coding method and a moving picture decoding method which can correctly judge the capability/incapability of coding or decoding for a moving picture as well as efficiently utilize a memory area mounted in a coding/decoding apparatus, and thereby enables designing a memory area in a coding/decoding apparatus according to a coding method which imposes no limitations on the capacity of the memory.

DISCLOSURE OF THE INVENTION

According to a first aspect of the present invention, there is provided a method for coding a moving picture which consists of a plurality of pictures each consisting of a prescribed number of pixels, according to a selected coding level, including: a step of judging whether it is possible to code the moving picture, on the basis of the maximum number of intra frame pixels for a picture, which number conforms with the selected coding level; and a step of coding the moving picture that has been judged encodable in the judging step, for each picture, to generate a code sequence for the moving picture, in which the code sequence includes a code of a level identifier that identifies the maximum number of intra frame pixels for a picture that conforms with the selected coding level, and the maximum number of storage pixel number corresponding to the data amount that can be stored in a picture memory, which conforms with the selected coding level, and the vertical pixel number and the horizontal pixel number of a picture constituting the moving picture that has been judged encodable in the judgement step satisfy predetermined conditions dependent on the level identifier.

According to a second aspect of the present invention, in the moving picture coding method of the first aspect, the coding step performs an inter picture prediction coding to a target picture to be coded, using a coded picture as a reference picture, where the maximum reference picture number that is the maximum number of reference candidate pictures serving as candidates for the reference picture, which pictures can be stored in the picture memory, is calculated on the basis of the vertical pixel number and the horizontal pixel number of the target picture as well as the level identifier.

According to a third aspect of the present invention, in the moving picture coding method of the first aspect, the vertical pixel number (h) and the horizontal pixel number (w) of a picture included in the moving picture that has been judged encodable satisfy all following conditions, i.e., (condition 1) to (condition 3):

$h \times w <=$ (the maximum number of intra frame pixel number)  (condition 1)

$h <= \mathrm{round1}(H)$  (condition 2)

$w <= \mathrm{round2}(W)$  (condition 3)

where H denotes the maximum number among vertical pixel numbers in the picture which can be coded, W denotes the maximum number among horizontal pixel numbers in the picture which can be coded, round1( ) denotes a value that is obtained by an operation of rounding an argument in parentheses to a multiple of the vertical pixel number in a macroblock which is a unit for coding a picture, and round2( ) denotes a value that is obtained by an operation of rounding an argument in parentheses to a multiple of the horizontal pixel number in the macroblock.

According to a fourth aspect of the present invention, in the moving picture coding method of the third aspect, round1( ) and round2( ) each denotes a value which is obtained by an operation of rounding an argument in parentheses to a multiple of 16.

According to a fifth aspect of the present invention, in the moving picture coding method of the second aspect, the maximum reference picture number for the target picture is determined by a following formula:

(the maximum reference picture number)=(the maximum storage pixel number)÷($h \times w$)−1 where h denotes the vertical pixel number in the target picture, w denotes the horizontal pixel number in the target picture, and the maximum storage pixel number is the total number of the pixel numbers of the reference candidate pictures and of the target picture to be decoded, which pictures are stored in a picture memory in the decoding apparatus.

According to a sixth aspect of the present invention, in the moving picture coding method of the second aspect, the maximum reference picture number for the target picture is determined by a following formula:

(the maximum reference picture number)=(the maximum storage pixel number)÷($h \times w$)−1−(the number of display waiting decoded pictures)

where h denotes the vertical pixel number in the target picture, w denotes the horizontal pixel number in the target picture, and the maximum storage pixel number is the total number of the pixel numbers of, reference candidate pictures, the target picture to be decoded, and display waiting decoded pictures, which pictures are stored in a picture memory of the decoding apparatus.

According to a seventh aspect of the present invention, in the moving picture coding method of the third aspect, the maximum vertical pixel number and the maximum horizontal pixel number are calculated using following two formulae:

$H = \mathrm{sqrt}(h \times w \times N)$ $W = \mathrm{sqrt}(h \times w \times N)$, where h denotes the vertical pixel number in the target picture, w denotes the horizontal pixel number in the target picture, H denotes the maximum number among the vertical pixel numbers over pictures which can be coded, W denotes the maximum number among the horizontal pixel numbers over the pictures which can be coded, N denotes an arbitrary natural number, and sqrt( ) denotes a positive square root of an argument in parentheses.

According to an eighth aspect of the present invention, in the moving picture coding method of the seventh aspect, the natural number N is 8.

According to a ninth aspect of the present invention, in the moving picture coding method of the third aspect, the maximum vertical pixel number and the maximum horizontal pixel number are calculated using following two formulae:

$H$ = (the maximum intra frame pixel number) ÷
(vertical pixel number calculation coefficient)

$W$ = (the maximum intra frame pixel number) ÷
(horizontal pixel number calculation coefficient)

where H denotes the maximum vertical pixel number among pictures which can be coded, W denotes the maximum horizontal pixel number among pictures which can be coded, and the vertical pixel number calculation coefficient and the horizontal pixel number calculation coefficient are predetermined values.

According to a tenth aspect of the present invention, in the moving picture coding method of the third aspect, the maximum vertical pixel number and the maximum horizontal pixel number are decided with referring to a previously defined table.

According to an eleventh aspect of the present invention, there is provided a method for decoding a code sequence corresponding to a moving picture which consists of plural pictures each consisting of a prescribed number of pixels, in accordance with a level identifier for identifying a selected coding level, which is extracted from the code sequence, including: a step of judging whether it is possible to decode the code sequence or not, on the basis of the maximum intra frame pixel number for a picture, which number is dependent on the coding level indicated by the level identifier, and the maximum storage pixel number which is an amount of data which can be stored in a picture memory and is dependent on the coding level; and a step of decoding the code sequence that has been judged decodable in the judgement step, for each picture, to generate image data for the moving picture, in which the vertical pixel number and the horizontal pixel number of a picture presented by the code sequence that has been judged decodable in the judgement step satisfy predetermined conditions which are provided according to the level identifier.

According to a twelfth aspect of the present invention, in the moving picture decoding method of the eleventh aspect, the judgment step performs judgment of whether it is possible to decode the target code sequence or not, on the basis of the result of comparison between unique conditions provided in the decoding apparatus, and the maximum intra frame pixel number and the maximum storage pixel number both corresponding to the coding level indicated by the level identifier which is extracted from the code sequence.

According to a thirteenth aspect of the present invention, in the moving picture decoding method of the eleventh aspect, the decoding step subjects a target code sequence to an inter picture prediction decoding, using decoded pictures as reference pictures, and the maximum reference picture number which is the maximum number of reference candidate pictures serving as a candidate for a reference picture, which can be stored in the picture memory, is calculated on the basis of the vertical pixel number and the horizontal pixel number for the target picture as well as the level identifier.

According to a fourteenth aspect of the present invention, in the moving picture decoding method of the eleventh aspect, the vertical pixel number (h) and the horizontal pixel number (w) of a picture corresponding to the bit stream that has been judged decodable satisfy all following conditions, i.e., (condition 4) to (condition 6):

$h \leq \text{round1}(H)$ (condition 4)

$w \leq \text{round2}(W)$ (condition 5)

$h \times w \leq$ (the maximum intra frame pixel number) (condition 6)

where H denotes the maximum number among vertical pixel numbers of pictures that can be decoded, W denotes the maximum number among horizontal pixel numbers of pictures that can be decoded, round1( ) denotes a value that is obtained by an operation of rounding an argument in parentheses to a multiple of the vertical pixel number in a macroblock serving as a unit for decoding a picture, and round2( ) denotes a value that is obtained by an operation of rounding an argument in parentheses to a multiple of the horizontal pixel number in the above-described macroblock.

According to a fifteenth aspect of the present invention, in the moving picture decoding method of the fourteenth aspect, round1( ) and round2( ) each denotes a value which is obtained by an operation of rounding an argument in parentheses to a multiple of 16.

According to a sixteenth aspect of the present invention, in the moving picture decoding method of the twelfth aspect, the maximum reference picture number for the target picture is determined by following formulae:

(the maximum reference picture number)=(the maximum storage pixel number)÷($h \times w$)−1 where h denotes the vertical pixel number in the target picture to be decoded, w denotes the horizontal pixel number in the target picture to be decoded, and the maximum storage pixel number denotes the total number of, the pixel numbers of the reference candidate pictures and the pixel number of the target picture to be decoded, these pictures being stored in a picture memory of the decoding apparatus.

According to a seventeenth aspect of the present invention, in the moving picture decoding method of the twelfth aspect, the maximum reference picture number for the target picture is determined by a following formula:

(the maximum reference picture number)=(the maximum storage pixel number)÷($h \times w$)−1−(the number of display waiting decoded pictures)

where h denotes the vertical pixel number in the target picture to be decoded, w denotes the horizontal pixel number in the target picture to be decoded, and the maximum storage pixel number is the total number of the pixel numbers of, the reference candidate pictures, the target picture to be decoded, and display waiting decoded pictures, these pictures being stored in a picture memory of the decoding apparatus.

According to an eighteenth aspect of the present invention, in the moving picture decoding method of the fourteenth aspect, the maximum vertical pixel number and the maximum horizontal pixel number are calculated using following two formulae:

$H=\text{sqrt}(h \times w \times N)$ $W=\text{sqrt}(h \times w \times N)$, where h denotes the vertical pixel number in the target picture, w denotes the horizontal pixel number in the target picture, H denotes the maximum number among vertical pixel numbers of pictures which can be decoded, W denotes the maximum number among horizontal pixel numbers of pictures which can be decoded, N denotes an arbitrary natural number, sqrt( ) denotes a positive square root of an argument in parentheses.

According to a nineteenth aspect of the present invention, in the moving picture decoding method of the eighteenth aspect, the natural number N is 8.

According to a twentieth aspect of the present invention, in the moving picture decoding method of the fourteenth aspect, the maximum vertical pixel number and the maximum horizontal pixel number are calculated using following two formulae:

$H$=(the maximum intra frame pixel number)÷(vertical pixel number calculation coefficient)

$W$=(the maximum intra frame pixel number)÷(horizontal pixel number calculation coefficient)

where H denotes the maximum number among vertical pixel numbers in pictures which can be decoded, and W denotes the maximum number among horizontal pixel numbers in pictures which can be decoded.

According to a twenty-first aspect of the present invention, in the moving picture decoding method of the fourteenth aspect, the maximum vertical pixel number and the maximum horizontal pixel number are decided with referring to a previously defined table.

According to a twenty-second aspect of the present invention, there is provided a data storage medium that contains a program for implementing a process of coding a moving picture, where the program makes a computer execute the coding process according to the moving picture coding method of any of the first to tenth aspects.

According to a twenty-third aspect of the present invention, there is provided a data storage medium that contains a program for implementing a process of decoding a code sequence corresponding to a moving picture, where the program makes a computer execute the decoding process according to the moving picture decoding method of any of the eleventh to twenty-first aspects.

As described above, according to the first aspect of the present invention, there is provided a method for coding a moving picture which consists of a plurality of pictures each consisting of a prescribed number of pixels, according to a selected coding level, including: a step of judging whether it is possible to code the moving picture, on the basis of the maximum number of intra frame pixels for a picture, which number conforms with the selected coding level; and a step of coding the moving picture that has been judged encodable in the judging step, for each picture, to generate a code sequence for the moving picture, in which the code sequence includes a code of a level identifier that identifies the maximum number of intra frame pixels for a picture that conforms with the selected coding level, and the maximum number of storage pixel number corresponding to the data amount that can be stored in a picture memory, which conforms with the selected coding level, and the vertical pixel number and the horizontal pixel number of a picture constituting the moving picture that has been judged encodable in the judgement step satisfy predetermined conditions dependent on the level identifier.

Therefore, memory areas in a coding apparatus and a decoding apparatus which correspond to a coding method in which there is no limitations on the capacity of the memory area can be designed.

In other words, according to the present invention, the maximum storage pixel number and the maximum intra frame pixel number can be set at optimal values which are selected from plural values which are defined stepwise, in accordance with specifications for the apparatus, thereby the capability/incapability of coding or decoding for a target moving picture as well as the maximum picture number that can be referred to at inter picture prediction coding, can be easily decided on the basis of conditional formulas and tables with utilizing the selected maximum storage pixel number and maximum intra frame pixel number. Thereby, indices associated with the design of the memory areas in the coding apparatus and the decoding apparatus are given, leading to an effective handling of the memory capacity with judging correctly the capability/incapability of the coding or decoding which is to be executed to the target moving picture.

According to the second aspect of the present invention, in the moving picture coding method of the first aspect, the coding step performs an inter picture prediction coding to a target picture to be coded, using a coded picture as a reference picture, where the maximum reference picture number that is the maximum number of reference candidate pictures serving as candidates for the reference picture, which pictures can be stored in the picture memory, is calculated on the basis of the vertical pixel number and the horizontal pixel number of the target picture as well as the level identifier. Therefore, the inter picture prediction coding can be carried out with effectively utilizing a picture memory.

According to the third aspect of the present invention, in the moving picture coding method of the first aspect, the vertical pixel number (h) and the horizontal pixel number (w) of a picture included in the moving picture that has been judged encodable satisfy all following conditions, i.e., (condition 1) to (condition 3):

$h \times w <=$(the maximum number of intra frame pixel number)      (condition 1)

$h <=$round1($H$)      (condition 2)

$w <=$round2($W$)      (condition 3)

where H denotes the maximum number among vertical pixel numbers in the picture which can be coded, W denotes the maximum number among horizontal pixel numbers in the picture which can be coded, round1( ) denotes a value that is obtained by an operation of rounding an argument in parentheses to a multiple of the vertical pixel number in a macroblock which is a unit for coding a picture, and round2( ) denotes a value that is obtained by an operation of rounding an argument in parentheses to a multiple of the horizontal pixel number in the macroblock. Therefore, the capability or incapability of coding of a moving picture as an input image can be judged with reference to the numbers of macroblocks in a picture as units of coding in the vertical and horizontal directions.

According to the fourth aspect of the present invention, in the moving picture coding method of the third aspect, round1( ) and round2( ) each denotes a value which is obtained by an operation of rounding an argument in parentheses to a multiple of 16. Therefore, the capability or incapability of the coding for a moving picture as an input image can be judged with reference to the numbers of macroblocks as units of coding in a picture in the vertical and horizontal directions, each macroblock being composed of 16 pixels and 16 pixels.

According to the fifth aspect of the present invention, in the moving picture coding method of the second aspect, the maximum reference picture number for the target picture is determined by a following formula:

(the maximum reference picture number)=(the maximum storage pixel number)÷(h×w)−1 where h denotes the vertical pixel number in the target picture, w denotes the horizontal pixel number in the target picture, and the maximum storage pixel number is the total number of the pixel numbers of the reference candidate pictures and of the target picture to be decoded, which pictures are stored in a picture memory in the decoding apparatus. Therefore, an area for storing decoded data of a target picture can be always kept in the picture memory of the decoding apparatus.

According to the sixth aspect of the present invention, in the moving picture coding method of the second aspect, the maximum reference picture number for the target picture is determined by a following formula:

(the maximum reference picture number)=(the maximum storage pixel number)÷(h×w)−1−(the number of display waiting decoded pictures)

where h denotes the vertical pixel number in the target picture, w denotes the horizontal pixel number in the target picture, and the maximum storage pixel number is the total number of the pixel numbers of, reference candidate pictures, the target picture to be decoded, and display waiting decoded pictures, which pictures are stored in a picture memory of the decoding apparatus. Therefore, the number of reference candidate pictures in a picture memory of a decoding apparatus can be changed according to the number of display waiting decoded pictures.

According to the seventh aspect of the present invention, in the moving picture coding method of the third aspect, the maximum vertical pixel number and the maximum horizontal pixel number are calculated using following two formulae:

$H=\text{sqrt}(h\times w\times N)$ $W=\text{sqrt}(h\times w\times N)$, where h denotes the vertical pixel number in the target picture, w denotes the horizontal pixel number in the target picture, H denotes the maximum number among the vertical pixel numbers over pictures which can be coded, W denotes the maximum number among the horizontal pixel numbers over the pictures which can be coded, N denotes an arbitrary natural number, and sqrt( ) denotes a positive square root of an argument in parentheses. Therefore, the difference between the vertical dimension and the horizontal dimension of the input image can be kept within a predetermined range.

According to the eighth aspect of the present invention, in the moving picture coding method of the seventh aspect, the natural number N is 8. Therefore, the ratio between the vertical dimension and the horizontal dimension of the input image can be kept within a range of 8:1 or smaller.

According to the ninth aspect of the present invention, in the moving picture coding method of the third aspect, the maximum vertical pixel number and the maximum horizontal pixel number are calculated using following two formulae:

$H=$(the maximum intra frame pixel number)÷(vertical pixel number calculation coefficient)

$W=$(the maximum intra frame pixel number)÷(horizontal pixel number calculation coefficient)

where H denotes the maximum vertical pixel number among pictures which can be coded, W denotes the maximum horizontal pixel number among pictures which can be coded, and the vertical pixel number calculation coefficient and the horizontal pixel number calculation coefficient are predetermined values. Therefore, the maximum vertical pixel number and the maximum horizontal pixel number can be calculated by simple operations.

According to the tenth aspect of the present invention, in the moving picture coding method of the third aspect, the maximum vertical pixel number and the maximum horizontal pixel number are decided with referring to a previously defined table. Therefore, the maximum vertical pixel number and the maximum horizontal pixel number can be decided without employing an arithmetic operation.

According to the eleventh aspect of the present invention, there is provided a method for decoding a code sequence corresponding to a moving picture which consists of plural pictures each consisting of a prescribed number of pixels, in accordance with a level identifier for identifying a selected coding level, which is extracted from the code sequence, including: a step of judging whether it is possible to decode the code sequence or not, on the basis of the maximum intra frame pixel number for a picture, which number is dependent on the coding level indicated by the level identifier, and the maximum storage pixel number which is an amount of data which can be stored in a picture memory and is dependent on the coding level; and a step of decoding the code sequence that has been judged decodable in the judgement step, for each picture, to generate image data for the moving picture, in which the vertical pixel number and the horizontal pixel number of a picture presented by the code sequence that has been judged decodable in the judgement step satisfy predetermined conditions which are provided according to the level identifier. Therefore, the capability or incapability of decoding in a decoding apparatus can be judged correctly, leading to an efficient handling of the storage capacity.

In other words, according to the present invention, the maximum storage pixel number and the maximum intra frame pixel number can be set at optimal values that are selected from plural values which are defined stepwise, in accordance with specifications of the apparatus, whereby the capability/incapability of coding or decoding of a target moving picture, and the maximum picture number that can be referred to at inter picture prediction coding can be decided on the basis of conditional formulas and tables, using the selected maximum storage pixel number and selected maximum intra frame pixel number.

Further, because the code sequence includes, as header information, an identifier of a coding level corresponding to the maximum storage pixel number and the maximum intra frame pixel number which have been selected on the coding end, the decoding apparatus can immediately determine the coding level on the basis of the identifier of the coding level.

According to the twelfth aspect of the present invention, in the moving picture decoding method of the eleventh aspect, the judgment step performs judgment of whether it is possible to decode the target code sequence or not, on the basis of the result of comparison between unique conditions provided in the decoding apparatus, and the maximum intra frame pixel number and the maximum storage pixel number both corresponding to the coding level indicated by the level identifier which is extracted from the code sequence. Therefore, it is possible to easily judge whether a code sequence that is inputted to a decoding apparatus can be decoded or not by the decoding apparatus.

According to the thirteenth aspect of the present invention, in the moving picture decoding method of the eleventh aspect, the decoding step subjects a target code sequence to an inter picture prediction decoding, using decoded pictures as reference pictures, and the maximum reference picture number which is the maximum number of reference candidate pictures serving as a candidate for a reference picture, which can be stored in the picture memory, is calculated on the basis of the vertical pixel number and the horizontal pixel number for the target picture as well as the level identifier. Therefore, the inter picture prediction decoding can be executed with effectively utilizing the picture memory.

According to the fourteenth aspect of the present invention, in the moving picture decoding method of the eleventh aspect, the vertical pixel number (h) and the horizontal pixel number (w) of a picture corresponding to the bit stream that has been judged decodable satisfy all following conditions, i.e., (condition 4) to (condition 6):

$h <= \text{round1}(H)$     (condition 4)

$w <= \text{round2}(W)$     (condition 5)

$h \times w <= $ (the maximum intra frame pixel number)     (condition 6)

where H denotes the maximum number among vertical pixel numbers of pictures that can be decoded, W denotes the maximum number among horizontal pixel numbers of pictures that can be decoded, round1( ) denotes a value that is obtained by an operation of rounding an argument in parentheses to a multiple of the vertical pixel number in a macroblock serving as a unit for decoding a picture, and round2( ) denotes a value that is obtained by an operation of rounding an argument in parentheses to a multiple of the horizontal pixel number in the above-described macroblock. Therefore, the capability or incapability of decoding for a moving picture as an input image can be judged with reference to the numbers of macroblocks as units of decoding in a picture in the vertical and horizontal directions.

According to the fifteenth aspect of the present invention, in the moving picture decoding method of the fourteenth aspect, round1( ) and round2( ) each denotes a value which is obtained by an operation of rounding an argument in parentheses to a multiple of 16. Therefore, the capability/incapability of decoding for a moving picture as an input image can be judged with reference to the numbers of macroblocks as units of decoding in a picture in the vertical and horizontal directions, each macroblock being composed of 16 pixels×16 pixels.

According to the sixteenth aspect of the present invention, in the moving picture decoding method of the twelfth aspect, the maximum reference picture number for the target picture is determined by following formulae:

(the maximum reference picture number)=(the maximum storage pixel number)÷(h×w)−1 where h denotes the vertical pixel number in the target picture to be decoded, w denotes the horizontal pixel number in the target picture to be decoded, and the maximum storage pixel number denotes the total number of, the pixel numbers of the reference candidate pictures and the pixel number of the target picture to be decoded, these pictures being stored in a picture memory of the decoding apparatus. Therefore, an area for storing decoded data of a target picture can be always kept in a picture memory of a decoding apparatus.

According to the seventeenth aspect of the present invention, in the moving picture decoding method of the twelfth aspect, the maximum reference picture number for the target picture is determined by a following formula:

(the maximum reference picture number)=(the maximum storage pixel number)÷(h×w)−1−(the number of display waiting decoded pictures)

where h denotes the vertical pixel number in the target picture to be decoded, w denotes the horizontal pixel number in the target picture to be decoded, and the maximum storage pixel number is the total number of the pixel numbers of, the reference candidate pictures, the target picture to be decoded, and display waiting decoded pictures, these pictures being stored in a picture memory of the decoding apparatus. Therefore, the number of reference candidate pictures can be changed according to the number of display waiting decoded pictures in a picture memory of a decoding apparatus.

According to the eighteenth aspect of the present invention, in the moving picture decoding method of the fourteenth aspect, the maximum vertical pixel number and the maximum horizontal pixel number are calculated using following two formulae:

$H = \text{sqrt}(h \times w \times N)$ $W = \text{sqrt}(h \times w \times N)$ where h denotes the vertical pixel number in the target picture, w denotes the horizontal pixel number in the target picture, H denotes the maximum number among vertical pixel numbers of pictures which can be decoded, W denotes the maximum number among horizontal pixel numbers of pictures which can be decoded, N denotes an arbitrary natural number, sqrt( ) denotes a positive square root of an argument in parentheses. Therefore, a difference between the vertical dimension and the horizontal dimension of an input image can be kept within a predetermined range.

According to the nineteenth aspect of the present invention, in the moving picture decoding method of the eighteenth aspect, the natural number N is 8. Therefore, the ratio between the vertical dimension and the horizontal dimension of an input image can be kept within a range of 8:1 or smaller.

According to the twentieth aspect of the present invention, in the moving picture decoding method of the fourteenth aspect, the maximum vertical pixel number and the maximum horizontal pixel number are calculated using following two formulae:

$H=$(the maximum intra frame pixel number)÷(vertical pixel number calculation coefficient)

$W=$(the maximum intra frame pixel number)÷(horizontal pixel number calculation coefficient)

where H denotes the maximum number among vertical pixel numbers in pictures which can be decoded, and W denotes the maximum number among horizontal pixel numbers in pictures which can be decoded. Therefore, the maximum vertical pixel number and the maximum horizontal pixel number can be calculated by simple operations.

According to the twenty-first aspect of the present invention, in the moving picture decoding method of the fourteenth aspect, the maximum vertical pixel number and the maximum horizontal pixel number are decided with referring to a previously defined table. Therefore, the maximum vertical pixel number and the maximum horizontal pixel number can be decided without employing arithmetic operations.

According to the twenty-second aspect of the present invention, there is provided a data storage medium that contains a program for implementing a process of coding a moving picture, where the program makes a computer execute the coding process according to the moving picture coding method of any of the first to tenth aspects. Therefore, by loading a program for implementing a coding process for a moving picture on a computer, it is possible to perform the handling of a memory area in a coding apparatus efficiently, thereby facilitating the design of the apparatus.

According to the twenty-third aspect of the present invention, there is provided a data storage medium that contains a program for implementing a process of decoding a code sequence corresponding to a moving picture, where the program makes a computer execute the decoding process according to the moving picture decoding method of any of the eleventh to twenty-first aspects. Therefore, by loading a program for implementing a process for decoding a moving picture on a computer, it is possible to perform the handling of a memory area in a decoding apparatus efficiently, thereby facilitating the design of the apparatus.

BRIEF DESCRIPTION OF THE DRAWINGS

FIGS. 14(*a*), 14(*b*), and 14(*c*) showing bit streams Bsa, Bsb, and Bsc, which are generated by the moving picture coding apparatuses 10*a*, 10*b*, and 10*c* according to the first, second, and third embodiments, respectively.

FIG. 15 is a diagram showing a table T1 that defines correspondence between the level identifier and a pair of the maximum intra frame pixel number and the maximum storage pixel number, which is employed in the moving picture coding apparatus 10*a* according to the first embodiment.

FIG. 16 are diagram showing tables which are employed in the moving picture coding apparatus 10*a* according to the first embodiment; FIG. 16(*a*) showing a table T1*a* that defines correspondence between the level identifier and the maximum intra frame pixel number, and FIG. 16(*b*) showing a table T1*b* that defines correspondence between the level identifier and the maximum storage pixel number.

FIG. 17 are diagram showing tables which are employed in the second embodiment; FIG. 17(*a*) showing a table T2 that defines correspondence between the identification number and a pair of the vertical pixel number calculation coefficient and the horizontal pixel number calculation coefficient, FIG. 17(*b*) showing a table T2*a* that defines correspondence between the identification number and the horizontal pixel number calculation coefficient, and FIG. 17(*c*) showing a table T2*b* that defines correspondence between the identification number and the vertical pixel number calculation coefficient.

FIG. 18 are diagram showing tables which are employed in the third embodiment, FIG. 18(*a*) showing a table T3 that defines correspondence between the identification number and a pair of the maximum vertical pixel number and the maximum horizontal pixel number, FIG. 18(*b*) showing a table T3*a* that defines correspondence between the identification number and the maximum horizontal pixel number, and FIG. 18(*c*) showing a table T3*b* that defines correspondence between the identification number and the maximum vertical pixel number.

FIG. 20 is a diagram for explaining an application of the moving picture coding apparatus and the moving picture decoding apparatus according to any of the above embodiments, and shows a contents supply system 1100 for providing contents distribution services.

BEST MODE FOR CARRYING OUT THE INVENTION

Hereinafter, embodiments of the present invention will be described.

Embodiment 1

Figure 1:
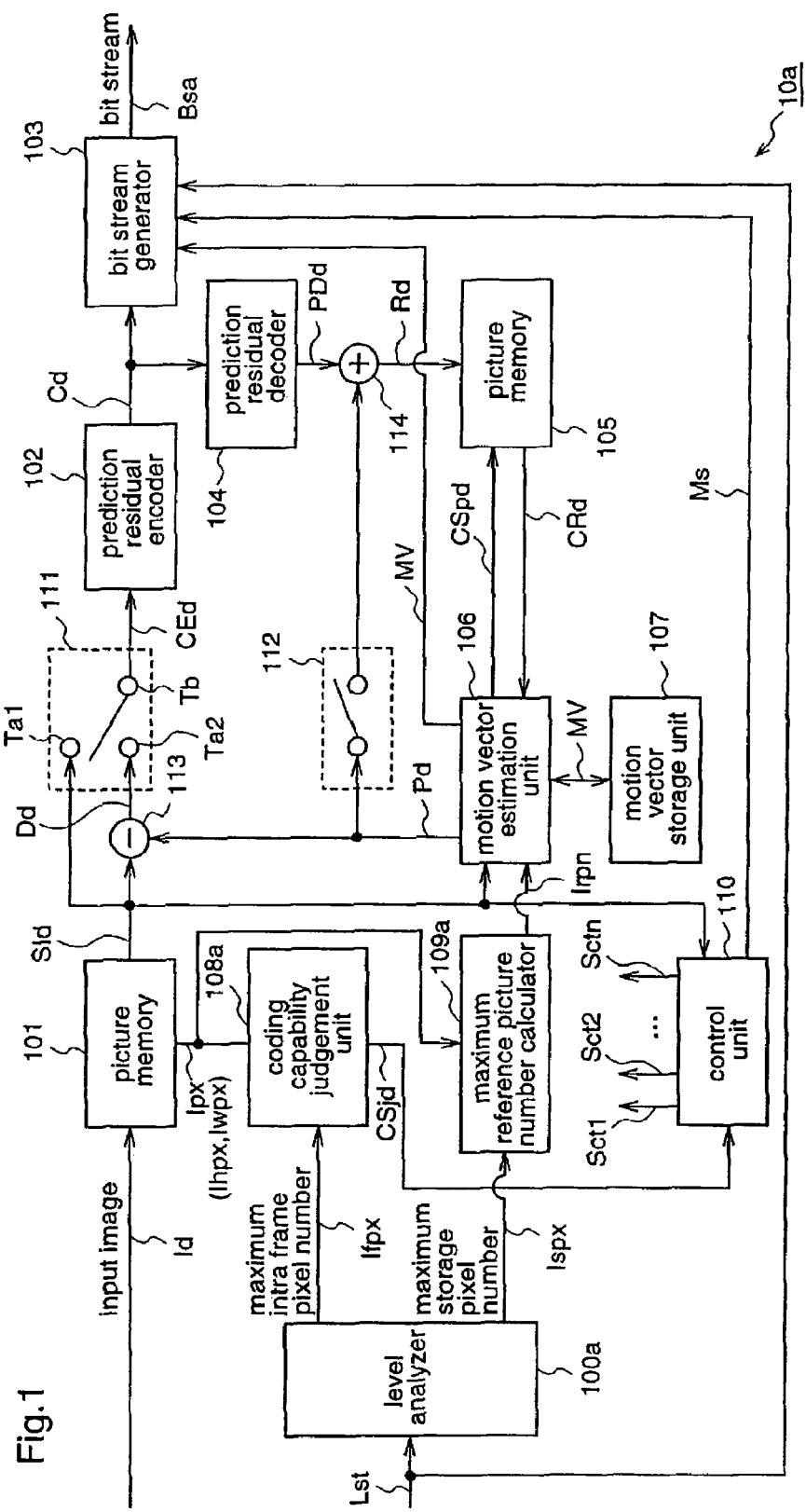
FIG. 1 is a block diagram for explaining a moving picture coding apparatus 10*a* according to a first embodiment of the present invention.

FIG. 1 is a block diagram explaining a moving picture coding apparatus 10a according to a first embodiment of the present invention.

The moving picture coding apparatus 10a according to the first embodiment divides plural pictures that constitute a moving picture, into predetermined data processing units, i.e., blocks, respectively, and encodes image data of each picture for each block. It is assumed here that the block is a macroblock which is composed of 16 vertical pixels×16 horizontal pixels.

More specifically, this moving picture coding apparatus 10a includes a picture memory 101 that stores input data Id of a input moving picture which is inputted picture by picture, and outputs stored data SId block by block; a difference calculator 113 that calculates a difference between the image data SId of a target block to be coded, which is outputted from the picture memory 101 and predictive data Pd of the target block, and outputs prediction residual data Dd of the target block; and a prediction residual encoder 102 that compressively encodes the image data SId or prediction residual data Dd of the target block. Here, in the picture memory 101, a process for reordering image data of pictures which are inputted in the display order, to be arranged in the picture coding order is carried out on the basis of the relationship between the target picture and a picture to be referred to, i.e., reference picture at the prediction coding. The picture memory 101 outputs information indicating the size of an input image, i.e., input image size information Ipx, and this input image size information Ipx is composed of vertical pixel number information Ihpx indicating the number (h) of vertical pixels in the input image and horizontal pixel number information Iwpx indicating the number (w) of horizontal pixels in the input image.

The moving picture coding apparatus 10a includes a prediction residual decoder 104 that decompressively decodes output coded data Cd from the prediction residual encoder 102, and outputs differential data of the target block (hereinafter, referred to as decoded differential data) PDd; an adder 114 that adds the decoded differential data PDd of the target data and the predictive data Pd of the target block, and outputs image data of the target block (hereinafter, referred to as decoded data) Rd; and a picture memory 105 that stores the decoded data Rd and outputs the stored decoded data Rd as data CRd of a candidate for picture to be referred to at the coding of the target block, i.e., reference candidate picture, in accordance with a picture designation signal CSpd.

The moving picture coding apparatus 10a includes a motion estimation unit 106 that estimates a motion vector MV for the target block on the basis of the output data, i.e., image data of the target block SId from the picture memory 101 and the output data, i.e., data of a reference candidate picture CRd from the picture memory 105, and generates predictive data Pd for the target block on the basis of the estimated motion vector MV; and a motion vector storage unit 107 that stores the motion vector MV for the target block, which has been estimated by the motion vector estimation unit 106. The motion estimation unit 106 performs the motion estimation for estimating a motion vector for target block, with referring to an optimal picture among plural reference candidate pictures as well as referring to motion vectors for processed blocks that are located around the target block. Here, the optimal picture among the plural reference candidate pictures is decided on the basis of the coding efficiency or the like.

The moving picture coding apparatus 10a includes a selector switch 111 that selects one of the output data SId from the picture memory 101 and the output data Dd from the difference calculator 113 and outputs selected data CEd, and an ON/OFF switch 112 that is provided between the motion vector estimation unit 106 and the adder 114. Here, the selector switch 111 has two input terminals Ta1 and Ta2 and one output terminal Tb, and the output terminal Tb is connected to one of the two input terminals Ta1 and Ta2 in accordance with a switch control signal.

The moving picture coding apparatus 10a according to the first embodiment includes a level analyzer 100a that outputs information indicating the maximum intra frame pixel number that can be coded (Nfpx) (hereinafter, referred to as maximum intra frame pixel number information) Ifpx and information indicating the maximum storage pixel number which can be stored in a picture memory of a decoding apparatus (Nspx) (hereinafter, referred to as maximum storage pixel number information) Ispx, on the basis of a level identifier signal indicating a coding level, i.e., level signal Lst, which is inputted by a user operation. This level analyzer 100a has information of a table T1 as shown in FIG. 15. The table T1 shows correspondence between values of the level identifier, and the maximum intra frame pixel numbers and the maximum storage pixel numbers.

The moving picture coding apparatus 10a includes a judgement unit, i.e., coding capability judgment unit 108a that judges whether coding of an input image is possible or not on the basis of the maximum intra frame pixel number information Ifpx from the level analyzer 100a and input picture size information Ipx from the picture memory 101, and outputs a signal indicating the judgment result, i.e., judgment result signal CSjd. The moving picture coding apparatus 10a includes a calculator, i.e., maximum reference picture number calculator 109a that calculates the number of reference candidate pictures, i.e., maximum reference picture number Nrpn which can be referred to at the inter picture prediction coding on the basis of the maximum storage pixel number information Ispx and the input image size information Ipx, and outputs information, i.e., maximum reference picture number information Irpn indicating the calculated number Nrpn.

The moving picture coding apparatus 10a further includes a bit stream generator 103 that variable-length-codes the output coded data Cd from the prediction residual encoder 102, then adds codes corresponding to the motion vector MV, a mode signal Ms, and the level signal Lst to a bit stream obtained by the variable length coding, and outputs an obtained bit stream Bsa.

The moving picture coding apparatus 10a further includes a control unit 110 that controls operations of the respective components of the moving picture coding apparatus 10a, in accordance with control signals Sct1, Sct2, . . . , Sctn, on the basis of the judgement result signal CSjd and the image data SId from the picture memory 101. The control unit 110 decides a coding mode according to the image data SId from the picture memory 101, and outputs a mode signal Ms indicating the decided mode, as well as controls the switches 111 and 112 according to the decided coding mode, by predetermined signals. The control unit 110 further controls operations of the prediction residual encoder 102, the prediction residual decoder 104, the bit stream generator 103, the motion vector estimation unit 106, and the like, in accordance with the control signals Sct1, Sct2, . . . , Sctn, according to the judgment result signal CSjd. That is, the control unit 110 controls the prediction residual encoder 102, the prediction residual decoder 104, the bit stream generator 103, the motion vector estimation unit 106, and the like, for performing coding of an input image when the judgment result signal CSjd indicates that it is possible to encode the input image, while controls the prediction residual encoder 102, the prediction residual decoder 104, the bit stream generator 103, the motion vector estimation unit 106, and the like, for not performing coding of an input image when the judgment result signal CSjd indicates that it is impossible to encode the input image.

Figure 14A:
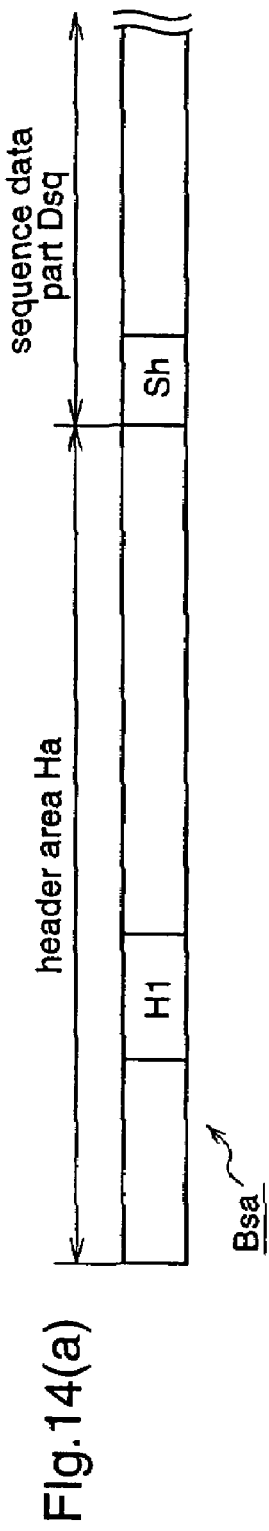
FIG. 14 are diagram for explaining data structures of bit streams which are generated by the moving picture coding apparatus according to the above embodiments.

FIG. 14(a) shows a data structure of a bit stream Bsa corresponding to an input image.

The bit stream Bsa is composed of a header area Ha that contains various header information, and a sequence data part Dsq that contains coded data, i.e., a bit stream corresponding to image data of each picture.

A code H1 corresponding to the level identifier signal, i.e., level signal Lst is included in the header area Ha of the bit stream Bsa, as one kind of the header information. Further, a sequence header Sh indicating the size of an input image, i.e., the number of vertical pixels in the input image (hereinafter, referred to as input image vertical pixel number) (h) and the number of horizontal pixels in the input image (hereinafter, referred to as input image horizontal pixel number) (w) is included in the sequence data part Dsp of the bit stream Bsa.

Figure 2:
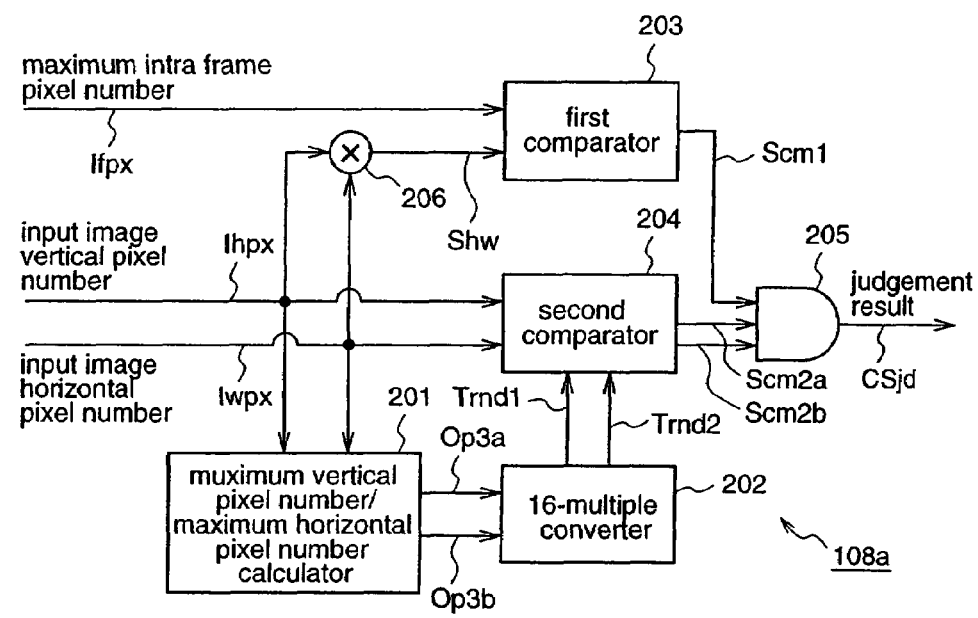
FIG. 2 is a block diagram illustrating a specific construction of a coding capability judgment unit 108*a* in the moving picture coding apparatus 10*a* according to the first embodiment.

FIG. 2 is a diagram illustrating a specific construction of the coding capability judgment unit 108a.

The coding capability judgment unit 108a includes a multiplier 206 that calculates the product (Phw) of the input image vertical pixel number (h) and the input image horizontal pixel number (w) on the basis of the input pixel vertical pixel number information Ihpx and the input pixel horizontal pixel number information Iwpx, and outputs a multiplication signal Shw indicating the result of the multiplication; and a first comparator 203 that compares the product (Phw) and the maximum intra frame pixel number Nfpx on the basis of the multiplication signal Shw and the maximum intra frame pixel number information Ifpx, and outputs a first comparison result signal Scm1 indicating the result of comparison.

The coding capability judgment unit 108a includes a calculator, i.e., maximum vertical pixel number/maximum horizontal pixel number calculator 201 that calculates the maximum vertical pixel number (H) and the maximum horizontal pixel number (W) which can be processed, on the basis of the input image vertical pixel number information Ihpx and the input image horizontal pixel number information Iwpx, and outputs information Op3a and Op3b indicating the operation results; and a 16-multiple converter 202 that performs a rounding operation for rounding the maximum vertical pixel number (H) and the maximum horizontal pixel number (W) to multiples of 16 on the basis of the operation result information Op3a and Op3b from the calculator 201, and outputs rounding information Trnd1 indicating a multiple of 16 to which the maximum vertical pixel number (H) is rounded (round1(H)) and rounding information Trnd2 indicating a multiple of 16 to which the maximum horizontal pixel number (W) is rounded (round2(H)).

The coding capability judgment unit 108a includes a second comparator 204 that performs comparison between the input image vertical pixel number (h) and the maximum vertical pixel number (H) (vertical pixel number comparison) and comparison between the input image horizontal pixel number (w) and the maximum horizontal pixel number (W) (horizontal pixel number comparison) on the basis of the pixel number information Ihpx and Iwpx, and the rounding information Trnd1 and Trnd2, and outputs a comparison result signal Scm2a indicating the result of the vertical pixel number comparison, and a comparison result signal Scm2b indicating the result of the horizontal pixel number comparison; and an AND unit 205 that takes an AND operation of the three comparison result signals Scm1, Scm2a and Scm2b, and outputs the operation result signal CSjd indicating the result of AND operation.

Figure 3:
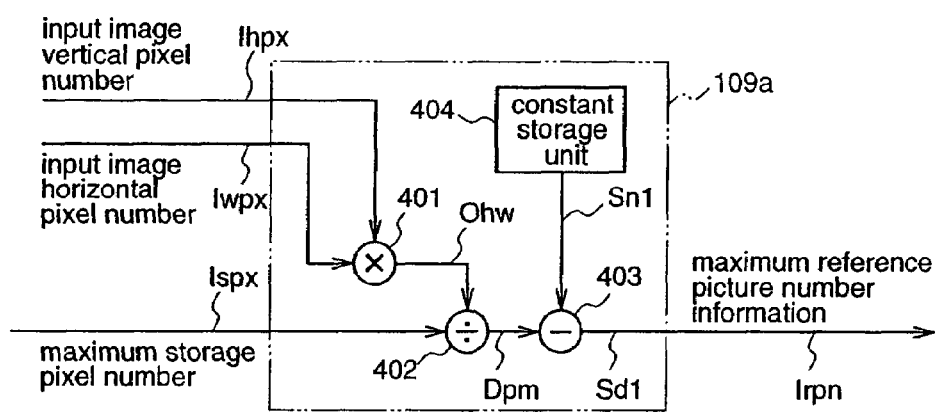
FIG. 3 is a block diagram illustrating a specific construction of a maximum reference picture number calculation unit 109*a* in the moving picture coding apparatus 10*a* according to the first embodiment.

FIG. 3 is a diagram illustrating a specific construction of the maximum reference picture number calculator 109a.

The maximum reference picture number calculator 109a includes a multiplier 401 that calculates the total number of pixels in one frame (Phw=h×w) corresponding to the size of the input image on the basis of the input image vertical pixel number information Ihpx and the input image horizontal pixel number information Iwpx, and outputs an operation output Ohw indicating the result of calculation; and a divider 402 that divides the maximum storage pixel number (Nspx) by the total pixel number in one frame (h×w) on the basis of the operation output Ohw and the maximum storage pixel number information Ispx, and outputs an operation output signal Dpm indicating the result of division (Nspx/(h×w)). The maximum reference picture number calculator 109a further includes a constant storage unit 404 that retains a numeric value signal Sn1 indicating the number of pictures to be coded, i.e., one picture, and outputs the numeric value signal Sn1; and a subtractor 403 that outputs a subtraction output signal Sd1 indicating a value obtained by subtracting 1 from the division result (Nspx/(h×w) i.e., Nspx/(h×w)−1.

Next, the operation will be described hereinafter.

In the moving picture coding apparatus 10a according to the first embodiment, before performing a coding of an input image, a level required is selected from a plurality of coding levels which are previously established and are employed as coding conditions, on the basis of the construction of a memory or the like in the moving picture coding apparatus 10a, and the construction of a memory or the like in a moving picture decoding apparatus to which coded data are supplied. More specifically, the coding level selection is performed by the user with referring to the table T1, and the level signal Lst indicating the level identifier corresponding to the selected level is inputted to the moving picture coding apparatus 10a by the user operation.

In this case, a specific maximum intra frame pixel number (Nfpx) and maximum storage pixel number (Nspx) are set for each coding level. The table T1 in FIG. 15 shows eight coding levels, which correspond to values (1) to (8) of the level identifier, respectively. Further, the values (1) to (8) of the level identifier are correlated with specific values of the maximum intra frame pixel number (Nfpx) and specific values of the maximum storage pixel number (Nspx), respectively.

The maximum intra frame pixel number (Nfpx) indicates the size of a picture constituting an input image, i.e., input moving picture, which can be coded by the moving picture coding apparatus 10a and can decoded by a moving picture decoding apparatus to which the coded data are supplied, and this is the maximum value possibly taken by the product of the number of vertical pixels (h) and the number of horizontal pixels (w) in the picture. More specifically, the maximum intra frame pixel number indicates the maximum value of the number of pixels per picture.

The maximum storage pixel number (Nspx) indicates the number of pixels corresponding to the amount of image data which can be stored in a picture memory in a decoding apparatus associated with the moving picture coding apparatus 10a. In other words, the maximum storage pixel number (Nspx) is the number of pixels equivalent to the maximum amount of image data which can be stored in the picture memory. For example, data of pictures such as reference candidate pictures, decoded pictures that wait for being displayed, and a picture to be decoded are stored in the picture memory of the moving picture decoding apparatus that decodes a bit stream from the moving picture coding apparatus 10, and the maximum storage pixel number is equal to the total number of the pixels in these pictures.

In this moving picture coding apparatus 10a, when the selection of the coding level is performed by the user operation, the level selection signal Lst is inputted to the level analyzer 100a. Then, the level analyzer 100a refers to the table T1 (see FIG. 15) held therein, and outputs the maximum intra frame pixel number information Ifpx and the maximum storage pixel number information Ispx adaptively to the coding level indicated by the level signal Lst, which is selected by the user. The maximum intra frame pixel number information Ifpx is inputted to the coding capability judgment unit 108a, and the maximum storage pixel number information Ispx is inputted to the maximum reference picture number calculator 109a.

When image data Id of a moving picture, i.e., input image is inputted to the picture memory 101 in picture units in the order of display time, image data corresponding to each picture is successively stored in the picture memory 101, and the stored image data SId is outputted from the picture memory 101 in units of blocks, i.e., macroblocks that constitute the picture, in the order of coding. At this time, the information indicating the size of the input image, i.e., input image size information Ipx is outputted from the picture memory 101 to the coding capability judgment unit 108a and the maximum reference picture number calculator 109a.

Here, for example, the macroblock is a block in which the number of horizontal pixels (hereinafter, referred to as horizontal pixel number) is 16, and the number of vertical pixels (hereinafter, referred to as vertical pixel number) is 16 (16×16 pixel block). Then, the coding process in the moving picture coding apparatus is performed in units of blocks. Further, as described above, the input image size information Ipx is composed of the information Ihpx indicating the number of vertical pixels (h) in the input image and the information Iwpx indicating the number of horizontal pixels (w) in the input image.

Then, the coding capability judgment unit 108a judges whether the input image is encodable on the basis of the vertical pixel number information Ihpx and the horizontal pixel number information Iwpx of the input image included in the input image size information Ipx, which is outputted from the picture memory 101, and the maximum intra frame pixel number information Ifpx outputted from the level analyzer 100a, and outputs a signal indicating the judgment result, i.e., judgment result signal CSjd to the control unit 110.

The control unit 110 controls the respective units in the moving picture coding apparatus 10a for performing coding of the image data SId from the picture memory 101 in accordance with control signals Sct1, Sct2, . . . , Sctn, when the judgment result signal CSjd indicates that the input image is encodable, while controlling the respective units in the moving picture coding apparatus 10a for not performing coding of the image data SId from the picture memory 101 in accordance with the control signals Sct1, Sct2, . . . , Sctn, when the judgement result signal CSjd indicates that it is impossible to code the input image.

Further, the control unit 110 switches between a mode for performing inter picture prediction coding for image data and a mode for performing intra picture prediction coding for image data, on the basis of the image data SId from the picture memory 101, when the judgment result signal CSjd indicates that the input image is encodable. When the control unit 110 selects the mode for performing the inter picture prediction coding of image data, it controls the switch 111 so that the output terminal Tb is connected to the second input terminal Ta2, and controls the switch 112 so as to be brought into conduction, by a predetermined control signal. On the other hand, when the control unit 110 selects a mode for performing intra picture prediction coding of image data, the control unit 110 controls the switch 111 so that the output terminal Tb is connected to the first input terminal Ta1, and controls the switch 112 so as to be brought out of conduction, by a predetermined control signal.

The maximum reference picture number calculator 109a calculates the number of reference candidate pictures which can be referred to at the inter picture prediction coding (hereinafter, referred to as a maximum reference picture number) (Nrpn), on the basis of the maximum storage pixel number information Ispx, the input image vertical pixel number information Ihpx, and the input image horizontal pixel number information Iwpx, and outputs information indicating the calculated number (Nrpn), i.e., reference picture maximum number information Irpn.

Hereinafter, the operation in a case where the inter picture prediction coding is selected will be described.

The image data SId of a macroblock, which has been read from the picture memory 101 is input to the motion vector estimation unit 106. At this time, decoded image data Rd corresponding to coded pictures are stored in the picture memory 105 as image data of reference candidate pictures, and a required picture among the reference candidate pictures in the picture memory 105 is designated as a reference picture by the picture designation signal CSpd from the motion vector estimation unit 106. The motion vector estimation unit 106 employs image data of the designated reference candidate picture as image data CRd of the reference picture, to perform a process for estimating a motion vector MV for the target macroblock to be coded. Image data of a reference image corresponding to the target macroblock, which is decided by the obtained motion vector MV is inputted to the difference calculator 113 as predictive data Pd for the target macroblock.

The difference calculator 113 calculates a difference between the image data SId of the target macroblock and the predictive data Pd to generate prediction residual image data Dd, and then the prediction residual encoder 102 encodes the prediction residual image data Dd and outputs prediction residual coded data Cd.

Then, the prediction residual decoder 104 decodes the prediction residual coded data Cd, and outputs prediction residual image data PDd obtained by the decoding, to the adder 114. The adder 114 adds the prediction residual image data PDd from the prediction residual decoder 104 and the predictive data Pd from the motion vector estimation unit 106, and then the image data Rd obtained by the addition is stored in the picture memory 105.

The bit stream generator 103 generates a bit stream corresponding to the prediction residual coded data Cd that is outputted from the prediction residual encoder 102, and outputs the generated bit stream together with a code corresponding to the motion vector MV from the motion vector estimation unit 106, a code corresponding to a mode signal Ms from the control unit 110, and a code corresponding to the level signal Lst, as a bit stream Bsa. As shown in FIG. 14(*a*), the code H1 corresponding to the level signal Lst is included in the header area Ha of the bit stream Bsa, and the image information that is generated by the coding in units of macroblocks, the code corresponding to the motion vector, and the code corresponding to the mode signal are included in the sequence data part Dsp, together with the sequence header Sh. The sequence header Sh includes a code corresponding to the information Ipx that indicates the number of vertical pixels (h) and the number of horizontal pixels (2) of the input image.

Next, the operation in a case where intra picture prediction coding is selected will be briefly described.

In this case, the image data SId outputted from the picture memory 101 is inputted to the prediction residual encoder 102 through the switch 111, and then encoded by the encoder 102 to be inputted to the bit stream generator 103.

The bit stream generator 103 generates a bit stream corresponding to the coded data Cd outputted from the encoder 102, and outputs the generated bit stream together with the code corresponding to the mode signal Ms from the control unit 110 and the code corresponding to the level signal Lst, as a bit stream Bsa (see FIG. 14(*a*)).

The prediction residual decoder 104 decodes the coded data Cd outputted from the prediction residual encoder 102, and stores the prediction residual image data PDd obtained by the decoding in the picture memory 105 through the adder 114 as it is, as the image data Rd.

Next, a specific operation of the coding capability judgment unit 108*a* in the moving picture coding apparatus 10*a* will be described with reference to FIG. 2.

The coding capability judgment unit 108*a* in the moving picture coding apparatus 10*a* according to the first embodiment judges the capability of coding for an input image in accordance with following conditional formulae: (formula 1), (formula 2a), (formula 2b), (formula 3a), and (formula 3b).

$$h \times w <= Nfpx \quad \text{(formula 1)}$$

$$h <= round1(H) \quad \text{(formula 2a)}$$

$$w <= round2(W) \quad \text{(formula 2b)}$$

$$H = sqrt(h \times w \times N) \quad \text{(formula 3a)}$$

$$W = sqrt(h \times w \times N) \quad \text{(formula 3b)}$$

Here, Nfpx designates the maximum intra frame pixel number, h designates the number of vertical pixels in a target picture to be coded, w designates the number of horizontal pixels in the target picture, H designates the maximum number of vertical pixels of an input image, which can be coded by the moving picture coding apparatus 10*a*, W designates the maximum number of horizontal pixels of an input image, which can be coded by the moving picture coding apparatus 10*a*, and N designates an arbitrary natural number. Further, round1( ) is a sign that designates the result of an operation for rounding the value of an argument in parentheses to a multiple of the vertical pixel number in a macroblock, i.e., the unit of coding, round2( ) is a sign that designates the result of an operation for rounding the value of an argument in parentheses to a multiple of the horizontal pixel number in the macroblock, i.e., the unit of coding, sqrt( ) is a sign that designates the square root of an argument in parentheses.

Initially, the coding capability judgment unit 108*a* performs the operation indicated by (formula 1) on the basis of the vertical pixel number information Ihpx and the horizontal pixel number information Iwps of the input image included in the input image size information Ipx that is outputted from the picture memory 101. More specifically, multiplication for obtaining the product (h×w) of the vertical pixel number (h) and the horizontal pixel number (w) in the input image is carried out by the multiplier 206, and further comparison between the multiplication result (h×w) and the maximum intra frame pixel number (Nfpx) is performed by the first comparator 203 on the basis of a signal Shw indicating the result of the multiplication and the maximum intra frame pixel number information Ifpx. The comparison result signal Scm1 indicating the result of the comparison is outputted from the first comparator 203 to the AND unit 205.

Next, in the coding capability judgment unit 108*a*, the maximum vertical pixel number/maximum horizontal pixel number calculator 201 calculates the maximum number of vertical pixels (H) and the maximum number of horizontal pixels (W) indicated by (formula 3a) and (formula 3b) on the basis of the vertical pixel number information Ihpx and the horizontal pixel number information Iwpx for the input image.

Here, (formula 3a) and (formula 3b) show that the maximum vertical pixel number (H) and the maximum horizontal pixel number (W) are both a positive square root of a value that is obtained by multiplying the product of the vertical pixel number (h) and the horizontal pixel number (w) of the input image, by N. For example, when N=8, (formula 3a) suggests that the maximum vertical pixel number (H) is decided so that the ratio between the vertical pixel number and the horizontal pixel number is less than 8:1, and (formula 3b) suggests that the maximum horizontal pixel number (W) is decided so that the ratio between the vertical pixel number and the horizontal pixel number is less than 1:8.

The operation result signals Op3*a* and Op3*b* indicating the maximum vertical pixel number (H) and the maximum horizontal pixel number (W) which are obtained by the maximum vertical pixel number/maximum horizontal pixel number calculator 201 are inputted to the 16-multiple converter 202, and the 16-multiple converter 202 rounds the maximum vertical pixel number (H) and the maximum horizontal pixel number (W) to a multiple of 16, respectively, by an operation, such as omission, raising, or half-adjust. The 16-multiple converter 202 outputs rounding operation information Trnd1 indicating a value, i.e., round1(H) that is obtained by rounding the maximum vertical pixel number (H) to a multiple of 16, and rounding operation information Trnd2 indicating a value (round2(H)) that is obtained by rounding the maximum horizontal pixel number (W) to a multiple of 16, to the second comparator 204. Further, the second comparator 204 performs comparison between the input image vertical pixel number (h) and the maximum vertical pixel number (H) (hereinafter, referred to as vertical pixel number comparison) and comparison between the input image horizontal pixel number (w) and the maximum horizontal pixel number (W) (hereinafter, referred to as horizontal pixel number comparison), on the basis of the pixel number information Ihpx and Iwpx and the rounding operation information Trnd1 and Trnd2, and outputs the comparison result signal Scm2*a* indicating the result of the vertical pixel number comparison and the comparison result signal Scm2*b* indicating the result of the horizontal pixel number comparison to the AND unit 205.

In this first embodiment, the rounding operation for the maximum vertical pixel number (H) and the maximum horizontal pixel number (W) by the 16-multiple converter 202 is a processing of rounding these pixel numbers to multiples of 16. However, the value "16" in the rounding operation corresponds to the number of pixels that constitute one side of a macroblock as the unit for coding, and thus in a case where the number of pixels that constitute one side of a macroblock is not 16, the rounding operation rounds the maximum vertical pixel number and the maximum horizontal pixel number to multiples of a value corresponding to the number of pixels that constitute one side of a macroblock, which is a value other than 16, is performed. When the rounding operation rounds the maximum vertical pixel number and the maximum horizontal pixel number to multiples of a value corresponding to the number of pixels that constitute one side of a macroblock, i.e., a value other than 16, the number of macroblocks in a frame corresponding to an input image that can be coded, or the number of macroblocks in the horizontal or vertical direction with respect to the frame is uniquely decided, whereby mapping of image data in the picture memory or the like can be performed efficiently.

Then, the AND unit 205 takes an AND of the comparison result signal Scm1 outputted from the first comparator 203 and the comparison result signals Scm2a and Scm2b outputted from the second comparator 204, and outputs a signal, i.e., judgment result signal CSjd indicating a final result of the judgment as to coding capability.

Next, a specific operation of the maximum reference picture number calculator 109a in the moving picture coding apparatus 10a will be described with reference to FIG. 3.

The maximum reference picture number calculator 109a in the moving picture coding apparatus 10a according to the first embodiment calculates the maximum number of reference candidate pictures to be employed at inter picture prediction coding on the basis of an operation shown by following (formula 4).

$$Nrpn=Nspx \div (h \times w)-1 \qquad \text{(formula 4)}$$

Here, h denotes the number of vertical pixels in an input image, i.e., target picture to be coded, and w denotes the number of horizontal pixels in the input image, i.e., target picture to be coded. Nrpn denotes the maximum number of reference pictures, and Nspx denotes the maximum number of storage pixels. In this first embodiment, the maximum storage pixel number Nspx is the maximum value for the total numbers of pixels in reference pictures and a target picture to be decoded, whose image data are stored in a picture memory of a moving picture decoding apparatus that decodes the bit stream Bsa outputted from the moving picture coding apparatus 10a.

The maximum reference picture number calculator 109a calculates the total number of pixels (h×w) in one frame, as the size of the input image, on the basis of the input image vertical pixel number information Ihpx and the input image horizontal pixel number information Iwpx. That is, the multiplier 401 multiplies the number of vertical pixels in the input image(h), which is indicated by the input image vertical pixel number information Ihpx, by the number of horizontal pixels (w) indicated by the input image horizontal pixel number information Iwpx, and outputs an operation output Ohw indicating the multiplication result (h×w).

Further, the divider 402 divides the maximum storage pixel number (Nspx) by the multiplication result (h×w) on the basis of the operation output Ohw from the multiplier 401 and the maximum storage pixel number information Ispx from the level analyzer 100a, and outputs an operation output signal Dpm indicating the result of division (Nspx/(h×w)).

The subtractor 403 subtracts 1 from the division result (Nspx/(h×w)) on the basis of the operation output signal Dpn from the divider 402 and the numeric value information Sn1 from the constant storage unit 404, and outputs a subtraction output signal Sd1 indicating the result of subtraction (Nspx/(h×w)−1).

The reason why the subtractor 403 subtracts 1 from the division result (Nspx/(h×w)) is that decoded image data of a picture to be decoded must be stored in a picture memory of the decoding apparatus, in addition to the image data of reference candidate pictures which are employed at the inter picture prediction coding in the decoding apparatus.

As described above, the moving picture coding apparatus 10a according to the first embodiment includes the level analyzer 100a that decides the maximum number of intra frame pixels (Nfpx) which can be coded and the maximum number of storage pixels (Nspx) which can be stored in the picture memory of the decoding apparatus, on the basis of the level signal Lst indicating a coding level that is designated by the user, thereby judging whether the input image is encodable or not, on the basis of the maximum intra frame pixel number (Nfpx) and the input image size, i.e., the vertical pixel number Nhpx and the horizontal pixel number Nwpx, and calculating the number of reference candidate pictures, i.e., reference picture maximum number Nrpn which can be referred to at the inter picture prediction coding. Therefore, a decoding apparatus to which a bit stream from the moving picture coding apparatus 10a is supplied can always decode the bit stream satisfactorily, thereby performing inter picture prediction decoding corresponding to the inter picture prediction coding on the coding end. Accordingly, it is possible to design the memory areas in the coding apparatus as well as in the decoding apparatus which are compliant with a coding method which has no restraint on the capacity of the memory area.

In this first embodiment, as a table that defines the correspondence between the plural coding levels, i.e., values of the level identifier, and the maximum intra frame pixel number and the maximum storage pixel number, the table T1 in which the coding levels, i.e., values of the level identifier are correlated with pairs of the maximum intra frame pixel number and the maximum storage pixel number (see FIG. 15) is employed. However, a table T1a in which values of the level identifier are correlated with the maximum intra frame pixel numbers (FIG. 16(a)) and a table T1b in which values of the level identifier are correlated with the maximum storage pixel numbers (FIG. 16(b)) may be employed.

Further, in this first embodiment, the decision of the coding level, i.e., value of the level identifier by the user is performed with reference to the Table T1 shown in FIG. 15, while the decision of the coding level by the user may be performed by utilizing following (formula 5), in place of the table T1 shown in FIG. 15.

$$\text{(Level identifier value)}=transA(\text{maximum intra frame pixel number, maximum storage pixel number}) \qquad \text{(formula 5)}$$

Here, transA( ) is a sign that indicates an operation of giving a value of the level identifier, using the maximum intra frame pixel number and the maximum storage pixel number as arguments. According to (formula 5), when the user designates the maximum intra frame pixel number and the maximum storage pixel number of the input image to be coded by the moving picture coding apparatus 10a, the corresponding value of the level identifier is decided.

Further, following (formula 6a) and (formula 6b) may be employed in place of the table T1a indicating the correspondence between the level identifier value and the maximum intra frame pixel number (FIG. 16(a)) and the table T1b indicating the correspondence between the level identifier value and the maximum storage pixel number (FIG. 16(b)).

$$\text{(Level identifier value)}=transAa(\text{the maximum intra frame pixel number}) \qquad \text{(formula 6a)}$$

$$\text{(Level identifier value)}=transAb(\text{the maximum storage pixel number}) \qquad \text{(formula 6b)}$$

Here, transAa( ) is a sign indicating an operation for giving a value of the level identifier, using the maximum intra frame pixel number as an argument. According to (formula 6a), when the user designates the maximum intra frame pixel number of the input image which can be coded by the moving picture coding apparatus, the corresponding value of the level identifier is decided.

Further, transAb( ) is a sign indicating an operation for giving a value of the level identifier, using the maximum storage pixel number as an argument. According to (formula 6b), when the user designates the maximum storage pixel number of the input image which can be coded by the moving picture coding apparatus, the corresponding value of the level identifier is decided.

According to the moving picture coding apparatus of the first embodiment, the maximum storage pixel number is a total number of pixels in pictures, corresponding to the highest amount of image data that can be stored in the picture memory of the decoding apparatus to which a bit stream is supplied. However, in place of the maximum storage pixel number, the memory capacity itself, which is required by the picture memory of the decoding apparatus may be employed.

In this first embodiment, the maximum storage pixel number Nspx is the maximum value of the total number of pixels in all storage pictures whose image data are stored in the picture memory of the moving picture decoding apparatus that decodes a bit stream that is obtained from the moving picture coding apparatus 10a. The description has been given, taking the case where the reference pictures and the target picture to be decoded are the storage pictures as an example, but the maximum storage pixel number may be defined not to include the number of pixels in the target picture to be decoded.

In this case, following (formula 7a) is employed in place of above (formula 4).

$$Nrpn=Nspx \div (h \times w) \quad \text{(formula 7a)}$$

Here, h denotes the number of vertical pixels in a target picture to be coded, w denotes the number of horizontal pixels in the target picture, Nrpn denotes the maximum number of reference pictures, and Nspx denotes the maximum number of stored pixels.

In the maximum reference picture number calculator 109a shown in FIG. 3, the maximum reference picture number is decided without executing the process of subtracting 1 from the division result (Nspx/(h×w)).

Embodiment 2

Figure 4:
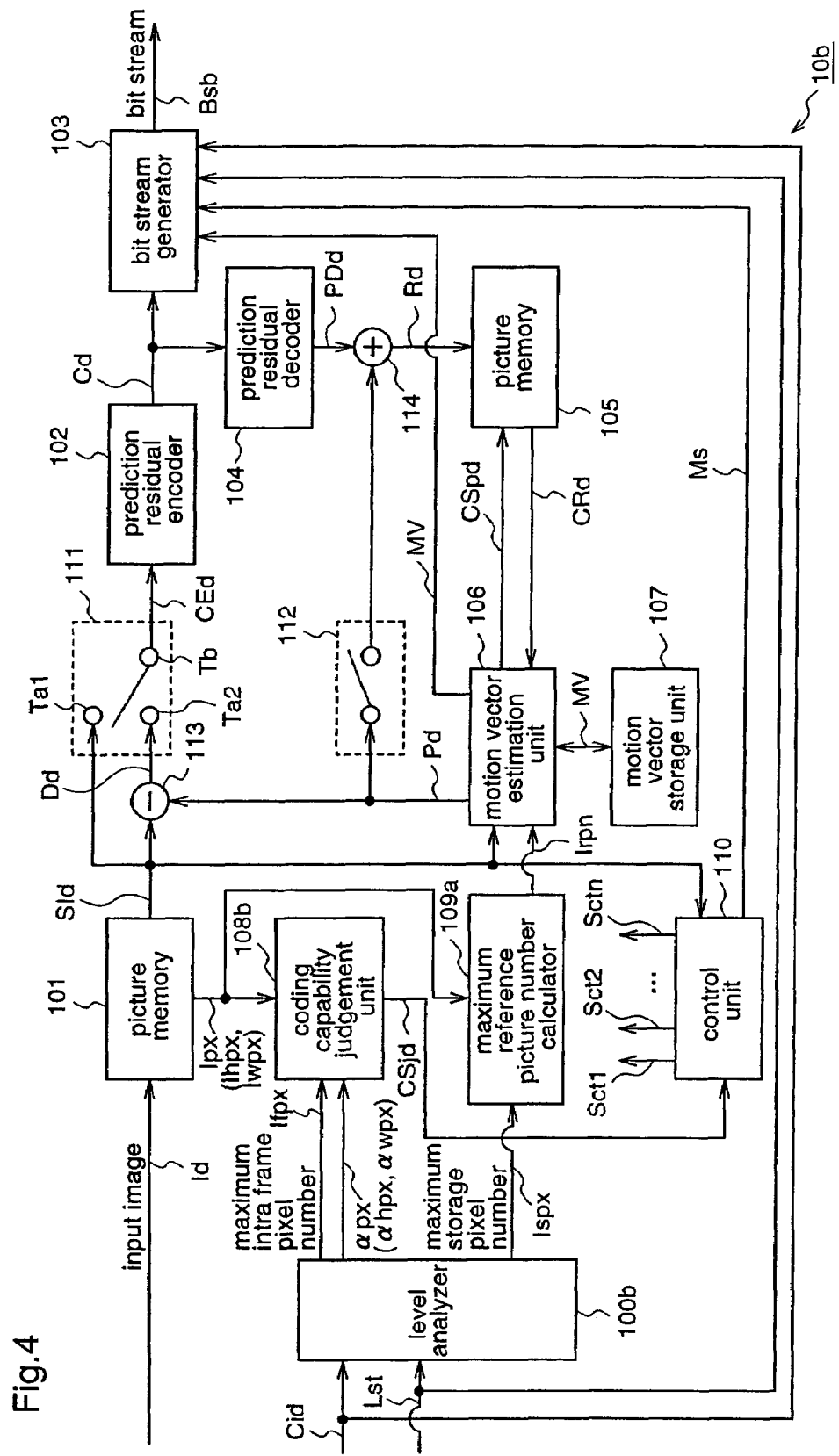
FIG. 4 is a block diagram for explaining a moving picture coding apparatus 10*b* according to a second embodiment of the present invention.

FIG. 4 is a block diagram for explaining a moving picture coding apparatus 10b according to a second embodiment of the present invention.

The moving picture coding apparatus 10b according to the second embodiment has, in place of the level analyzer 100a and the coding capability judgment unit 108a of the moving picture coding apparatus 10a of the first embodiment, a level analyzer 100b that outputs pixel number calculation coefficient information αpx, as well as the maximum intra frame pixel number Ifpx and the maximum storage pixel number information Ispx, on the basis of the level signal Lst and an identification number signal Cid which are inputted; and a coding capability judgment unit 108b that judges whether the input image is encodable or not on the basis of the maximum intra frame pixel number information Ifpx, the pixel number calculation coefficient information αpx, and the input image size information Ipx. Here, the identification number Cid indicates a value of the identification number decided under the control by the user, and this identification number is employed to identify a specific value of the pixel number calculation coefficient as an additional coding condition. The level analyzer 100b includes information of the table T1 shown in FIG. 15 and a table T2 shown in FIG. 17(a). The table T1 shows correspondence between the value of the level identifier, and the maximum intra frame pixel number and the maximum storage pixel number. The table T2 shows correspondence between the value of the identification number, and the vertical pixel number calculation coefficient (Nαhpx) and the horizontal pixel calculation coefficient (Nαwpx). Further, pixel number calculation coefficient information αpx is composed of information indicating the vertical pixel number calculation coefficient (Nαhpx) (hereinafter, referred to as vertical pixel number calculation coefficient information) αhpx and information indicating the horizontal pixel number calculation coefficient (Nαwps) (hereinafter, referred to as horizontal pixel number calculation coefficient information) αwpx. The bit stream generator 103 of the moving picture coding apparatus 10b subjects output data, i.e., coded data Cd from the prediction residual coding unit 102 to variable length coding, and outputs a bit stream Bsb that is obtained by adding codes corresponding to the motion vector MV, the mode signal Ms, the level signal Lst, and the identification number signal Cid, to the bit stream obtained by the variable length coding.

The constructions of the components other than the moving picture coding apparatus 10b according to the second embodiment are the same as those of the moving picture coding apparatus 10a according to the first embodiment.

Figure 14B:
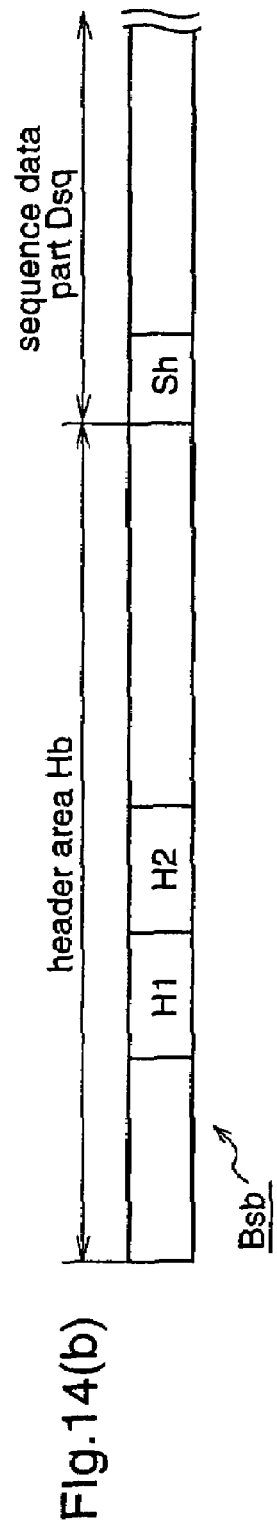

FIG. 14(b) shows a data structure of a bit stream Bsb corresponding to an input image.

The bit stream Bsb is composed of a header area Hb that contains various kinds of header information, and a sequence data part Dsq that contains coded data, i.e., bit stream corresponding to image data of each picture.

In the header area Hb of the bit stream Bsb, a code H1 corresponding to a signal of the level identifier, i.e., level signal Lst and a code H2 corresponding to the identification number signal Cid are included as the header information. Further, in the sequence data part Dsq of the bit stream Bsb, a sequence header Sh indicating the size of the input image, i.e., the input image vertical pixel number (h) and the input image horizontal pixel number (w) is included. To be more specific, the code H2 is obtained by coding the identification number signal Cid that indicates the value of the identification number for identifying the vertical pixel number calculation coefficient (Nαhpx) and the horizontal pixel number calculation coefficient (Nαwpx), as shown in FIG. 17(a).

Figure 5:
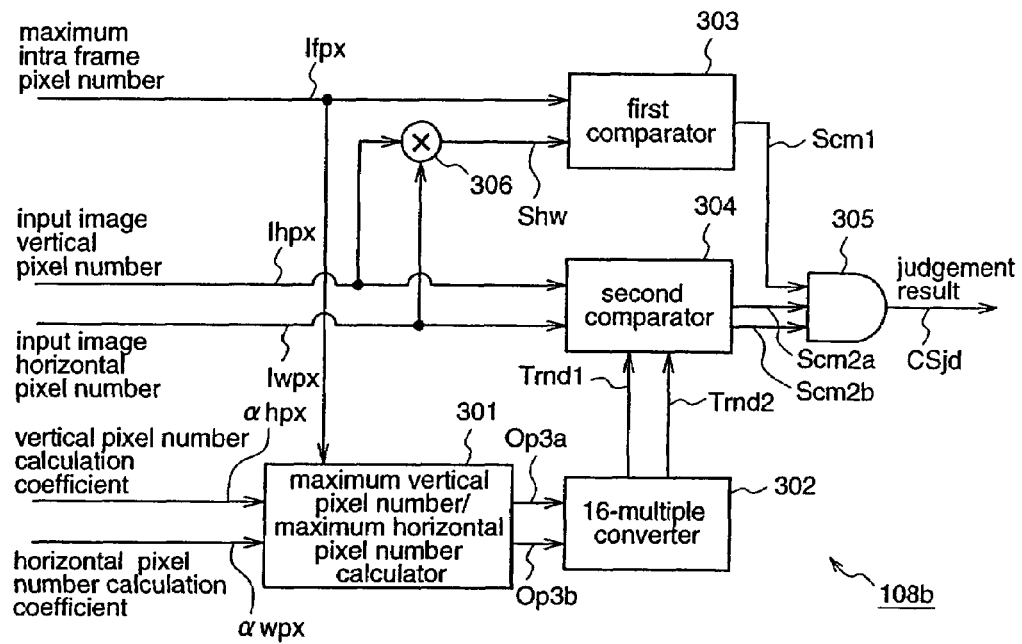
FIG. 5 is a block diagram illustrating a specific construction of a coding capability judgment unit 108*b* in the moving picture coding apparatus 10*b* according to the second embodiment.

FIG. 5 is a diagram illustrating a specific construction of the coding capability judgment unit 108b.

This coding capability judgment unit 108b has, in place of the maximum vertical pixel number/maximum horizontal pixel number calculator 201 of the coding capability judgment unit 108a according to the first embodiment, a calculator, i.e., maximum vertical pixel number/maximum horizontal pixel number calculator 301 that calculates the maximum number of vertical pixels (H) and the maximum number of horizontal pixels (W) which can be processed, on the basis of the maximum intra frame pixel number information Ifpx, the vertical pixel number calculation coefficient information αhpx, and the horizontal pixel number calculation coefficient information αwpx, and outputs information Op3a and Op3b indicating the calculation results. Therefore, the multiplier 306, the first comparator 303, the second comparator 304, the 16-multiple converter 302, and the AND unit 305 in the coding capability judgment unit 108b are the same as the multiplier 208, the first comparator 203, the second comparator 204, the 16-multiple converter 202, and the AND unit 205 in the coding capability judgment unit 108a according to the first embodiment.

Next, the operation will be described.

The operation of the moving picture coding apparatus 10b according to the second embodiment is different from that of the moving picture coding apparatus 10a according to the first embodiment only in the operations of the level analyzer 100b, the coding capability judgment unit 108b, and the bit stream generator 103.

Thus, the operations of the level analyzer 100b, the coding capability judgment unit 108b, and the bit stream generator 103 will be mainly described hereinafter.

For the moving picture coding apparatus 10b of the second embodiment, before the coding for an input image is performed, a required level is selected from among plural preset coding levels which are employed as coding conditions, on the basis of the construction of the memory and the like in the moving picture coding apparatus 10b, and the construction of a memory and the like in a moving picture decoding apparatus to which coded data are to be supplied, and further a required level of plural identification numbers, which are employed as additional coding conditions is selected. More specifically, the selection of the coding level is performed by the user with referring to the table T1, and the level signal Lst indicating the level identifier corresponding to the selected level is inputted to the moving picture coding apparatus 10b by the user operation. Further, the selection of the level of the identification number is performed by the user with referring to the table T2, and the identification number signal Cid indicating the identification number corresponding to the selected level is inputted to the moving picture coding apparatus 10b by the user operation.

Here, the coding level, the maximum intra frame pixel number, and the maximum storage pixel number are the same as those in the first embodiment. The table T2 shown in FIG. 17(a) sets four levels of the identification number, and the respective levels of the identification number correspond to values (1)~(4) of the identification numbers, respectively. The values (1)~(4) of the identification number are correlated with specific values of the vertical pixel number calculation coefficient (Nαhpx), and specific values of the horizontal pixel number calculation coefficient (Nαwpx), respectively.

According to the moving picture coding apparatus 10b, when the level signal Lst and the identification number signal Cid which are inputted under the control by the user are supplied to the level analyzer 100b, the level analyzer 100b refers to table T1 (FIG. 15) and table T2 (FIG. 17(a)) which are held therein, to output the maximum intra frame pixel number information Ifpx and the maximum storage pixel number information Ispx corresponding to the coding level indicated by the level signal Lst, which has been selected by the user, and further output the pixel number calculation coefficient information αpx corresponding to the level of the identification number indicated by the identification number signal Cid, which has been selected by the user. The maximum intra frame pixel number information Ifpx and the pixel number calculation coefficient information αpx is inputted to the coding capability judgment unit 108b, and the maximum storage pixel number information Ispx is inputted to the maximum reference picture number calculator 109a.

When image data Id of a moving picture (input image) is inputted to the picture memory 101 in units of pictures in the display order, image data corresponding to each picture is successively stored in the picture memory 101, and the stored image data SId is outputted from the picture memory 101 in units of blocks, i.e., macroblocks that constitute the picture in the order of coding. At this time, information indicating the size of the input image, i.e., input image size information Ipx is outputted from the picture memory 101 and inputted to the coding capability judgment unit 108b and the maximum reference picture number calculator 109a.

Then, the coding capability judgment unit 108b judges whether the input image is encodable or not on the basis of the input image size information Ipx from the picture memory 101, and the maximum intra frame pixel number information Ifpx and the pixel number calculation coefficient information αpx from the level analyzer 100b, and outputs a signal indicating the judgment result, i.e., judgment result signal CSjd to the control unit 110.

When the judgment result signal CSjd indicates that the input image is encodable, the control unit 110 switches between a mode for performing inter picture prediction coding for image data and a mode for performing intra picture prediction coding for image data, on the basis of the image data SId from the picture memory 101, and outputs control signals for respective units. The respective units of the moving picture coding apparatus 10b are controlled in accordance with the control signals Sct1, Sct2, . . . , Sctn corresponding to the judgment result signal CSjd, from the control unit 110, like in the first embodiment.

The maximum reference picture number calculator 109a calculates the maximum number of reference pictures (Nrpn) on the basis of the maximum storage pixel number information Ispx, and the input image vertical pixel number information Ihpx and horizontal pixel number information Iwpx, and outputs information, i.e., reference picture maximum number information Irpn indicating the calculated number (Nrpn).

In this second embodiment, when the inter picture prediction coding mode is selected, the inter picture prediction coding for the input image is performed in the same manner as in the first embodiment, and when the intra picture prediction coding mode is selected, the intra picture prediction coding for the input image is performed in the same manner as in the first embodiment.

In this second embodiment, however, when the inter picture prediction coding mode is selected, the bit stream generator 103 generates a bit stream corresponding to prediction residual coded data Cd that is outputted from the prediction residual encoder 102, and outputs the generated bit stream together with a code corresponding to the motion vector MV from the motion vector estimation unit 106, a code corresponding to the mode signal Ms from the control unit 110, a code corresponding to the level signal Lst, and a code corresponding to the identification number signal Cid, as a bit stream Bsb (see FIG. 14(b)). When the intra picture prediction coding mode is selected, the bit stream generator 103 generates a bit stream corresponding to coded data Cd that is outputted from the encoder 102, and outputs the generated bit stream together with the code corresponding to the mode signal Ms from the control unit 110, the code corresponding to the level signal Lst, and the code corresponding to the identification number signal Cid, as a bit stream Bsb (see FIG. 14(b)).

Next, a specific operation of the coding capability judgment unit 108b of the moving picture coding apparatus 10b will be described with reference to FIG. 5.

In the coding capability judgment unit 108b of the moving picture coding apparatus 10b according to the second embodiment, the capability of the coding for an input image is judged on the basis of the following conditional formulae (formula 1), (formula 2a), (formula 2b), (formula 8a), and (formula 8b).

$$H = Nfpx \div N\alpha hpx \quad \text{(formula 8a)}$$

$$W = Nfpx \div N\alpha wpx \quad \text{(formula 8b)}$$

Here, Nfpx denotes the maximum number of intra frame pixels, H denotes the maximum number of vertical pixels in an input image, which can be coded by the moving picture coding apparatus 10b, and W denotes the maximum number of horizontal pixels in the input image, which can be coded by the moving picture coding apparatus 10b. Nαhpx denotes a vertical pixel number calculation coefficient, and Nαwpx denotes a horizontal pixel number calculation coefficient.

Initially, like the coding capability judgment unit 108a according to the first embodiment, the coding capability judgment unit 108b performs the operation indicated by (formula 1) on the basis of the input image vertical pixel number information Ihpx and horizontal pixel number information Iwpx included in the input image size information Ipx, which is outputted from the picture memory 101. More specifically, multiplication for obtaining the product (h×w) of the number of vertical pixels (h) and the number of horizontal pixels (w) in the input image is carried out by the multiplier 306, and comparison between the multiplication result (h×w) and the maximum intra frame pixel number (Nfpx) is carried out by the first comparator 303. The first comparator 303 outputs a comparison result signal Scm1 indicating the result of comparison to the AND unit 305.

Then, in the coding capability judgment unit 108b, the maximum vertical pixel number/maximum horizontal pixel number calculator 301 calculates the maximum number of vertical pixels (H) indicated by (formula 8a) and the maximum number of horizontal pixels indicated by (formula 8b) on the basis of the maximum intra frame pixel number information Ifpx, the vertical pixel number calculation coefficient information αhpx, and the horizontal pixel number calculation coefficient information αwps.

Here, (formula 8a) and (formula 8b) indicate that the maximum vertical pixel number (H) and the maximum horizontal pixel number (W) are obtained by dividing the maximum intra frame pixel number (Nfpx) by the vertical pixel number calculation coefficient (Nαhpx) and the horizontal pixel number calculation coefficient (Nαwpx), respectively.

The operation result signals Op3a and Op3b indicating the maximum vertical pixel number (H) and the maximum horizontal pixel number (W) which are obtained by the maximum vertical pixel number/maximum horizontal pixel number calculator 301 are inputted to the 16-multiple converter 302, and the 16-multiple converter 302 performs a rounding process for the maximum vertical pixel number (H) and the maximum horizontal pixel number (W), in the same manner as in the 16-multiple converter 202 according to the first embodiment. Then, the 16-multiple converter 302 outputs rounding operation information Trnd1 indicating a value (round1(H)) that is obtained by rounding the maximum vertical pixel number (H) to a multiple of 16, and rounding operation information Trnd2 indicating a value (round2(H)) that is obtained by rounding the maximum horizontal pixel number (W) to a multiple of 16, to the second comparator 304.

Further, the second comparator 304 performs comparison between the input image vertical pixel number (h) and the maximum vertical pixel number (H) (vertical pixel number comparison) and comparison between the input image horizontal pixel number (w) and the maximum horizontal pixel number (W) (horizontal pixel number comparison), on the basis of the pixel number information Ihpx and Iwpx, and the rounding operation information Trnd1 and Trnd2, and outputs a comparison result signal Scm2a indicating the result of the vertical pixel number comparison, and a comparison result signal Scm2b indicating the result of the horizontal pixel number comparison, to the AND unit 305.

Then, the AND unit 305 takes an AND of the comparison result signals Scm1, Scm2, and Scm2b which are outputted from the comparators 303 and 304, and outputs a signal CSjd indicating the final result of the judgement as to the coding cap ability/incapability.

As described above, the moving picture coding apparatus 10b of the second embodiment includes the level analyzer 100b that decides the maximum number of intra frame pixels (Nfpx) which can be coded and the maximum number of storage pixels (Nspx) which can be stored in a picture memory of a decoding apparatus in accordance with the level signal (signal of the level identifier) Lst that is inputted by the user operation, and further decides the pixel calculation coefficient information αpx indicating the vertical pixel number calculation coefficient (Nαhpx) and the horizontal pixel number calculation coefficient (Nαwpx) on the basis of the identification number signal Cid that is inputted by the user operation, thereby judging whether coding of an input image is possible or not, and calculating the number of reference candidate pictures which can be referred to at the inter picture prediction coding (reference picture maximum number) Nrpn, on the basis of the maximum intra frame pixel number (Nfpx), the vertical pixel number calculation coefficient (Nαhpx), the horizontal pixel number calculation coefficient (Nαwpx), and the input image size (the number of vertical pixels (h) and the number of horizontal pixels (w)). Therefore, a decoding apparatus to which a bit stream from the moving picture coding apparatus 10b is to be supplied always can decode the bit stream satisfactorily, whereby picture prediction decoding depending on the picture prediction coding on the coding end can be performed. Thereby, it is possible to design memory areas in the coding apparatus and the decoding apparatus corresponding to a coding method in which there is no restraint on the capacity of the memory area.

Further, in this second embodiment, the maximum number of vertical pixels (H) and the maximum number of horizontal pixels (W) are obtained by dividing the maximum intra frame pixel number (Nfpx) by the vertical pixel number calculation coefficient (Nαhpx) and the horizontal pixel number calculation coefficient (Nαwpx), respectively. Therefore, the processes for obtaining the maximum vertical pixel number (H) and the maximum horizontal pixel number (W) are facilitated as compared to the first embodiment.

In this second embodiment, the level identifier corresponding to the maximum intra frame pixel number (Nfpx) and the maximum storage pixel number (Nspx), and the identification number corresponding to the vertical pixel number calculation coefficient (Nαhpx) and the horizontal pixel number calculation coefficient (Nαwpx) are parameters indicating independent coding conditions, respectively, while the identification number may be correlated with the value of the level identifier.

In this case, when the coding level is decided, specific numeric values of the vertical pixel number calculation coefficient (Nαhpx) and the horizontal pixel number calculation coefficient (Nαwpx) as well as specific numeric values of the maximum intra frame pixel number (Nfpx) and the maximum storage pixel number (Nspx) are decided on the basis of the value of the level identifier that indicates the decided level. More specifically, when the level signal Lst indicating the coding level that is decided by the user is inputted to the level analyzer 100b, the level analyzer 100b outputs the information Ifps and Ispx indicating the maximum intra frame pixel number (Nfpx) and the maximum storage pixel number (Nspx) according to the level signal (level identifier) Lst, and further outputs pixel number calculation coefficient information αpx on the basis of the identification number signal corresponding to the level identifier. Further, the bit stream Bsb contains only the code H1 corresponding to the level signal Lst, and thus the code H2 corresponding to the identification number signal Cid is not transmitted to the decoding end.

In this second embodiment, the moving picture coding apparatus transmits the code H1 of the level signal Lst corresponding to the maximum intra frame pixel number (Nfpx) and the maximum storage pixel number (Nspx), which has been selected by the user, and the code H2 of the identification number signal Cid corresponding to the vertical pixel number calculation coefficient (Nαhpx) and the horizontal pixel number calculation coefficient (Nαwpx), which has been selected by the user, to the decoding end. However, the moving picture coding apparatus may encode the pixel number calculation coefficient information αpx indicating arbitrary vertical pixel number calculation coefficient (Nαhpx) and horizontal pixel number calculation coefficient (Nαwpx) which are decided by the user, and output the encoded pixel number calculation coefficient information αpx to the decoding end, in place of the code H2 of the identification number signal Cid.

In this case, the maximum intra frame pixel number (Nfpx) and the maximum storage pixel number (Nspx) are set at specific values corresponding to the level identifier that indicates the selected coding level on the basis of the Table T1, while specific values of the vertical pixel number calculation coefficient (Nαhpx) and the horizontal pixel number calculation coefficient (Nαwpx) are arbitrarily set by the user. That is, when the level signal Lst indicating the decided coding level is inputted to the level analyzer 100b under the control of the user, the level analyzer 100b outputs the information Ifpx indicating the maximum intra frame pixel number (Nfpx) that is decided on the basis of the table T1 in accordance with the level signal Lst, to the coding capability judgment unit 108b, and outputs the information Ispx indicating the maximum storage pixel number (Nspx) that is decided on the basis of the table T1, to the maximum reference picture calculator 109a. The bit stream Bsb contains the code H1 corresponding to the level signal Lst and the code corresponding to the pixel number calculation coefficient information αpx, and accordingly the code H1 corresponding to the level signal Lst and the code corresponding to the pixel number calculation coefficient information αpx are transmitted to the decoding end.

Further, in this second embodiment, the table T2 in which plural identification numbers are correlated with pairs of the vertical pixel number calculation coefficient and the horizontal pixel number calculation coefficient (FIG. 17(a)) is employed as the table that defines the correspondence between plural identification numbers, and the vertical pixel number calculation coefficient and horizontal pixel number calculation coefficient. However, in place of the table T2, a table T2a in which the values of the identification number are correlated with the vertical pixel number calculation coefficients (FIG. 17(b)) and a table T2b in which the values of the identification number are correlated with the horizontal pixel number calculation coefficients (FIG. 17(c)) may be employed.

Further, in this second embodiment, the decision of the identification number by the user is performed with referring to the table T2 as shown in FIG. 17(a), while the decision of the identification number by the user may be performed using a following (formula 9), in place of the table T2 shown in FIG. 17(a).

(identification number)=transB(vertical pixel number calculation coefficient, horizontal pixel number calculation coefficient) (formula 9)

Here, trans B( ) is a sign indicating an operation for obtaining the value of the identification number, using the vertical pixel number calculation coefficient and the horizontal pixel number calculation coefficient as arguments.

Further, in place of the table T2a that defines the correspondence between the values of the identification number and the vertical pixel number calculation coefficients (FIG. 17(b)) and the table T2b that defines the correspondence between the values of the identification number and the horizontal pixel number calculation coefficients (FIG. 17(c)), following (formula 9a) and (formula 9b) may be employed.

(Value of the identification number)=transBa(vertical pixel number calculation coefficient) (formula 9a)

(Value of the identification number)=transBb(horizontal pixel number calculation coefficient) (formula 9b)

Here, transBa( ) is a sign that indicates an operation for obtaining a value of the identification number, using the vertical pixel number calculation coefficient as an argument. According to the (formula 9a), when the user designates the vertical pixel number calculation coefficient for the input image that can be coded by the moving picture coding apparatus, the corresponding value of the identification number is decided.

Further, transBb( ) is a sign that indicating an operation for obtaining a value of the identification number, using the horizontal pixel number calculation coefficient as an argument. According to the (formula 9b), when the user designates the horizontal pixel number calculation coefficient for the input image that can be coded by the moving picture coding apparatus, the corresponding value of the identification number is decided.

In the above first embodiment, the maximum number of vertical pixels (H) and the maximum number of horizontal pixels (W) are obtained by the (formula 1), (formula 2a), (formula 2b), (formula 3a), and (formula 3b), while in this second embodiment, the maximum number of vertical pixels (H) and the maximum number of horizontal pixels (W) are obtained by the (formula 1), (formula 2a), (formula 2b), (formula 8a), and (formula 8b). However, the method for obtaining the maximum vertical pixel number (H) and the maximum horizontal pixel number (W) are not limited to those described in the first and second embodiments.

Embodiment 3

Figure 6:
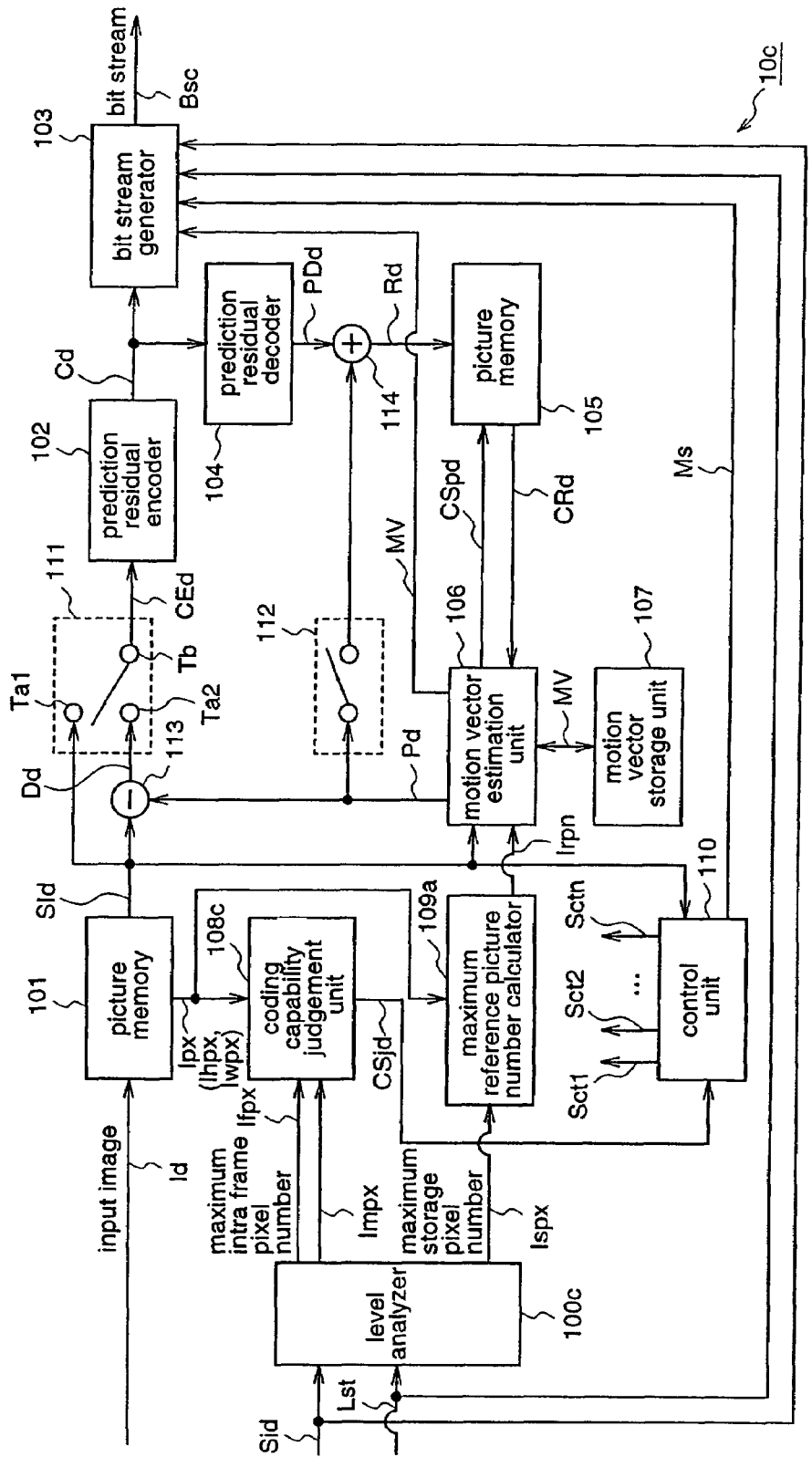
FIG. 6 is a block diagram for explaining a moving picture coding apparatus 10*c* according to a third embodiment of the present invention.

FIG. 6 is a block diagram for explaining a moving picture coding apparatus 10c according to a third embodiment of the present invention.

The moving picture coding apparatus 10c of the third embodiment has, in place of the level analyzer 100a and the coding capability judgment unit 108a of the moving picture coding apparatus 10a according to the first embodiment, a level analyzer 100c that outputs information indicating the maximum image size (maximum image size information) Impx together with the maximum intra frame pixel number information Ifpx and the maximum storage pixel number information Ispx, in accordance with the inputted level signal Lst and identification number signal Sid, and a coding capability judgment unit 108c that judges whether coding of the input image is possible or not on the basis of the maximum intra frame pixel number information Ifpx, the maximum image size information Impx, and the input image size information Ipx.

Here, the identification number signal Sid indicates a value of the identification number decided by the user's operation, and the identification number identifies a specific value of the maximum image size as an additional coding condition. The level analyzer 100c includes the information of the table T1 shown in FIG. 15, and information of a table T3 shown in FIG. 18(a). The table T1 defines correspondence between the value of the identification number, and the maximum intra frame pixel number and the maximum storage pixel number. The table T3 shows correspondence between the value of the identification number, and the maximum vertical pixel number (H) and horizontal pixel maximum number (W). Further, the maximum image size information Impx is composed of information indicating the maximum number (H) of vertical pixels (vertical pixel maximum number information) Imhpx, and information indicating the maximum number (W) of horizontal pixels (horizontal pixel maximum number information) Imwpx. The bit stream generator 103 of the moving picture coding apparatus 10c variable-length-codes the output data (coded data) Cd from the prediction residual encoder 102, and outputs a bit stream Bsc that is obtained by adding codes corresponding to the motion vector MV, the mode signal Ms, the level signal Lst, and the identification number signal Sid, to a bit stream obtained by the variable length coding.

Constructions of the other components of the moving picture coding apparatus 10c according to the third embodiment are the same as those of the moving picture coding apparatus 10a of the first embodiment.

Figure 14C:
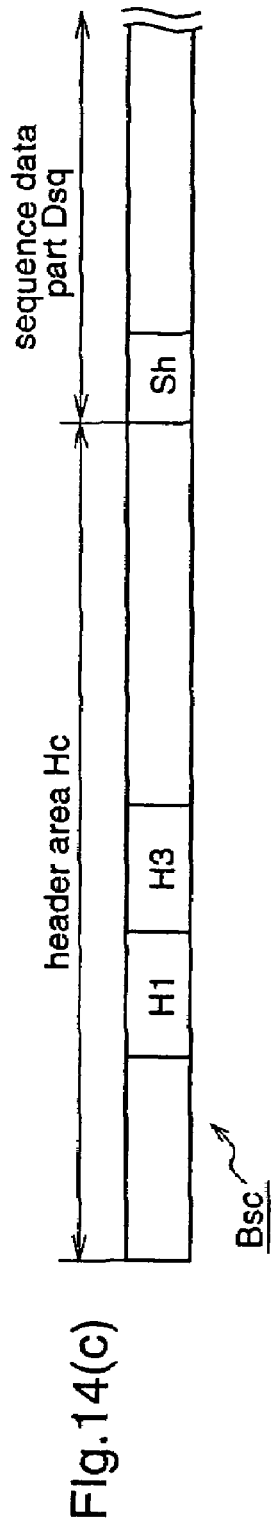

FIG. 14(c) shows a data structure of the bit stream Bsc corresponding to an input image.

The bit stream Bsc is composed of a header area Hc that contains various kinds of header information, and a sequence data part Dsq that contains coded data (a bit stream) corresponding to image data of each picture.

In the header area Hc of the bit stream Bsc, a code H1 corresponding to the level identifier and a code H3 corresponding to the identification number signal Sid are included as header information. Further, in the sequence data part Dsq of the bit stream Bsc, a sequence header Sh indicating the size of the input image, i.e., the input image vertical pixel number and the input image horizontal pixel number are included. More specifically, the code H3 is obtained by encoding the identification number signal Sid that indicates a value of the identification number for identifying the maximum vertical pixel number and the maximum horizontal pixel number as shown in FIG. 18(a).

Figure 7:
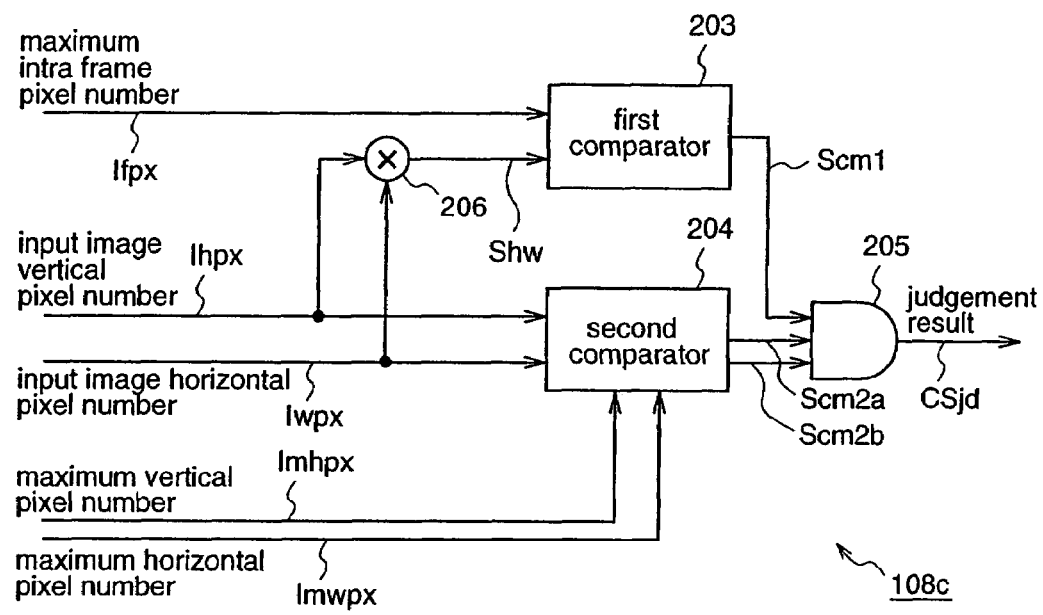
FIG. 7 is a block diagram illustrating a specific construction of a coding capability judgment unit 108*c* in the moving picture coding apparatus 10*c* according to the third embodiment.

FIG. 7 is a diagram illustrating a specific construction of the coding capability judgment unit 108c.

The coding capability judgment unit 108c is constituted only by the multiplier 206, the first comparator 203, the second comparator 204, and the AND unit 205 of the coding capability judgment unit 108a according to the first embodiment. In place of the outputs Trnd1 and Trnd2 from the 16-multiple converter 202 in the coding capability judgment unit 108a according to the first embodiment, the maximum vertical pixel number information Imhpx indicating the maximum number of vertical pixels (H) and the maximum horizontal pixel number information Imwpx indicating the maximum number of horizontal pixels (W) is inputted from the level analyzer 100c to the second comparator 204 as information indicating the maximum image size (maximum image size information) Impx.

Next, the operation will be described.

The operation of the moving picture coding apparatus 10c according to the third embodiment is different from the operation of the moving picture coding apparatus 10a of the first embodiment only in the operations of the level analyzer 100c, the coding capability judgment unit 108c, and the bit stream generator 103.

For the moving picture coding apparatus 10c according to the third embodiment, before the coding of an input image is performed, a required level is selected from plural preset coding levels to be employ as coding conditions, on the basis of the constructions of the memory or the like in the moving picture coding apparatus 10c, and a construction of a memory or the like in the moving picture decoding apparatus to which coded data are supplied, and further a predetermined level is selected from among plural levels of the identification number, which are employed as additional coding conditions. To be more specific, the selection of the coding level is performed by the user with referring to the table T1, and the level signal (level identifier) Lst indicating the selected level is inputted to the moving picture coding apparatus 10c under the control of the user. The selection of the level of the identification number is performed by the user with referring to the table T3, and the identification number signal Sid indicating the identification number corresponding to the selected level is inputted to the moving picture coding apparatus 10c under the control of the user.

Here, the coding level, the maximum intra frame pixel number, and the maximum storage pixel number are identical to those of the first embodiment. In addition, the table T3 shown in FIG. 18(a) defines four levels of the identification number, and these levels of the identification number correspond to values (1)~(4) of the identification number, respectively. The values (1)~(4) of the identification number are correlated with specific values of the maximum vertical pixel number (H) and the maximum horizontal pixel number (W), respectively.

In the moving picture coding apparatus 10c, when the level signal Lst and the identification number signal Sid which are inputted by the user' operation are supplied to the level analyzer 100c, the level analyzer 100c refers to the table T1 (FIG. 15) and the table T3 (FIG. 18(a)) which are held therein, and outputs the maximum intra frame pixel number information Ifpx and the maximum storage pixel number information Ispx corresponding to the coding level indicated by the level signal Lst, which has been selected by the user, and further outputs the maximum image size information Imps corresponding to the level of the identification number indicated by the identification number signal Sid, which has been selected by the user. The maximum intra frame pixel number information Ifpx and the maximum image size information Impx is inputted to the coding capability judgment unit 108c, and the maximum storage pixel number information Ispx is inputted to the maximum reference picture calculator 109a.

Then, when image data Id of a moving picture (input image) is inputted to the picture memory 101 in units of pictures in the display order, image data corresponding to each picture are successively stored in the picture memory 101, and the stored image data Sid are outputted from the picture memory 101 in units of blocks (macroblocks) that constitute the picture in the coding order. At this time, information indicating the size of the input data (input image size information) Ipx is outputted from the picture memory 101 to the coding capability judgment unit 108c and the maximum reference picture calculator 109a.

Then, the coding capability judgment unit 108c judges whether coding of the input image is possible or not, on the basis of the input image size information Ipx outputted from the picture memory 101, and the maximum intra frame pixel number information Ifpx and the maximum image size information Impx outputted from the level analyzer 100c, and outputs a signal indicating the judgement result (judgement result signal) CSjd to the control unit 110.

When the judgement result signal CSjd indicates that the coding of the input image is possible, the control unit 110 performs switching between a mode of performing inter picture prediction coding for image data and a mode of performing intra picture prediction coding for image data, on the basis of the image data SId from the picture memory 101, and outputs control signals for the respective components. The respective components of the moving picture coding apparatus 10c are controlled in accordance with control signals Sct1, Sct2, . . . , Sctn from the control unit 110 according to the judgement result signal CSjd, like in the first embodiment.

Further, the maximum reference picture calculator 109a calculates the maximum number of reference pictures (Nrpn) on the basis of the maximum storage pixel number information Ispx, the input image vertical pixel number information Ihpx, and the input image horizontal pixel number information Iwpx, and outputs information indicating the calculated number (Nrpn) (reference picture maximum number information) Irpn.

In this third embodiment, when the inter picture prediction coding mode is selected, the inter picture prediction coding for the input image is performed in the same manner as the first embodiment, while when the intra picture prediction coding mode is selected, the intra picture prediction coding for the input image is performed in the same manner as the first embodiment.

In the third embodiment, however, when the inter picture prediction coding mode is selected, the bit stream generator 103 generates a bit stream corresponding to prediction residual coded data Cd that is outputted from the prediction residual encoder 102, and outputs the generated bit stream together with a code corresponding to the motion vector MV from the motion vector estimation unit 106, a code corresponding to the mode signal Ms from the control unit 110, a code corresponding to the level signal Lst, and a code corresponding to the identification number signal Sid, as a bit stream Bsc (see FIG. 14(c)). When the intra picture prediction coding mode is selected, the bit stream generator 103 generates a bit stream corresponding to the coded data Cd that is outputted from the encoder 102, and outputs the generated bit stream together with a code corresponding to the mode signal Ms from the control unit 110, a code corresponding to the level signal Lst, and a code corresponding to the identification number signal Sid, as a bit stream Bsc (see FIG. 14(c)).

Next, a specific operation of the coding capability judgment unit 108c in the moving picture coding apparatus 10c will be described with reference to FIG. 7.

The coding capability judgment unit 108c of the moving picture coding apparatus 10c according to the third embodiment judges whether coding of an input image is possible or not, on the basis of the above-mentioned conditional formulas (formula 1), (formula 2a), and (formula 2b). In other words, the maximum number of vertical pixels (H) and the maximum number of horizontal pixels (W) are obtained on the basis of the (formula 1), (formula 2a), (formula 2b), and the information of the table T3 shown in FIG. 18(a). More specifically, in this third embodiment, the level analyzer 100c includes the table T3 as shown in FIG. 18(a) and, in the coding capability judgment unit 108c of the third embodiment, the information Imhpx and Imwpx indicating the maximum vertical pixel number (H) and the maximum horizontal pixel number (W), which is outputted from the level analyzer 100c on the basis of the table T3, is directly input to the second comparator 204.

Then, the second comparator 204 performs comparison between the input image vertical pixel number (h) and the maximum vertical pixel number (H) (i.e., vertical pixel number comparison), and comparison between the input image horizontal pixel number (w) and the maximum horizontal pixel number (W) (i.e., horizontal pixel number comparison), and outputs a comparison result signal Scm2a indicating the result of the vertical pixel number comparison, and a comparison result signal Scm2b indicating the result of the horizontal pixel number comparison to the AND unit 205.

As described above, the moving picture coding apparatus 10c of the third embodiment includes the level analyzer 100c that decides the maximum number of intra frame pixels (Nfpx) which can be coded and the maximum number of storage pixels (Nspx) which can be stored in a picture memory of a decoding apparatus, in accordance with the level signal (level identifier signal) Lst that is inputted under the control of the user, and decides the maximum number of vertical pixels (H) and the maximum number of horizontal pixels (W) in accordance with the identification number signal Sid that is inputted under the control of the user, thereby judging whether coding of the input image is possible or not on the basis of the maximum intra frame pixel number (Nfpx), the maximum vertical pixel number (H), the maximum horizontal pixel number (W), and the input image size (the number of vertical pixels (h) and the number of horizontal pixels (w)), and calculating the number of reference candidate pictures (reference picture maximum number) Nrpn which can be referred to at the inter picture prediction coding. Therefore, the decoding apparatus to which a bit stream from the moving picture coding apparatus 10c is supplied can always decode the bit stream satisfactorily, whereby picture prediction decoding corresponding to the picture prediction coding on the coding end can be performed. Accordingly, memory areas in the coding apparatus and the decoding apparatus corresponding to a coding method in which there is no restraint on the capacity of the memory area can be designed.

In this third embodiment, the values indicated by the information Impx that is supplied from the level analyzer 100c are employed as the maximum vertical pixel number (H) and the maximum horizontal pixel number (W). Therefore, the process for obtaining the maximum vertical pixel number (H) and the maximum horizontal pixel number (W) is facilitated as compared to the first embodiment.

In this third embodiment, the level identifier corresponding to the maximum intra frame pixel number (Nfpx) and the maximum storage pixel number (Nspx), and the identification number corresponding to the maximum vertical pixel number (H) and the maximum horizontal pixel number (W) are used as parameters that indicate independent coding conditions, respectively. However, the values of the identification number may be correlated with the values of the level identifier.

In this case, specific values of the maximum intra frame pixel number (Nfpx) and the maximum storage pixel number (Nspx) are values which are decided on the basis of the table T1 according to the level identifier that indicates the selected coding level, and further specific values of the maximum vertical pixel number (H) and the maximum horizontal pixel number (W) are values which are decided on the basis of the table T3 according to the identification number that is correlated with the selected coding level. That is, when the level signal Lst indicating the decided coding level is inputted to the level analyzer 100c under the control of the user, the level analyzer 100c outputs the information Ifpx and Ispx indicating the maximum intra frame pixel number (Nfpx) and the maximum storage pixel number (Nspx) in accordance with the level signal Lst, and further outputs the maximum image size information Impx on the basis of the identification number corresponding to the level identifier. In addition, the bit stream Bsc includes only the code H1 corresponding to the level signal Lst, and thus the code H3 corresponding to the identification number signal Sid is not transmitted to the decoding end.

In this third embodiment, the moving picture coding apparatus transmits the code of the level signal Lst corresponding to the maximum intra frame pixel number (Nfpx) and the maximum storage pixel number (Nspx) which have been selected by the user, and the code H3 of the identification number signal Sid corresponding to the maximum vertical pixel number (H) and the maximum horizontal pixel number (W) which have been selected by the user, to the decoding end. However, the moving picture coding apparatus may encode the maximum image size information Impx indicating the maximum vertical pixel number (H) and the maximum horizontal pixel number (W) which have been arbitrarily decided by the user, to transmit the coded maximum pixel number information to the decoding end, in place of the code H3 of the identification number signal Sid.

In this case, specific values of the maximum intra frame pixel number (Nfpx) and the maximum storage pixel number (Nspx) are values which are decided on the basis of the table T1 according to the level identifier that indicates the selected coding level, while specific values of the maximum vertical pixel number (H) and the maximum horizontal pixel number (W) are arbitrarily decided by the user. That is, when the level signal Lst indicating the decided coding level is input to the level analyzer 100c under the control of the user, the level analyzer 100c outputs the information Ifpx indicating the maximum intra frame pixel number (Nfpx) that is selected from the table T1 in accordance with the level signal Lst, to the coding capability judgment unit 108c, and outputs the information Ispx indicating the maximum storage pixel number (Nspx) that is selected from the table T1, to the maximum reference picture calculator 109a. Further, the maximum image size information Impx indicating specific values of the maximum vertical pixel number (H) and the maximum horizontal pixel number (W) which have been decided by the user is inputted directly from outside to the coding capability judgment unit 108c. In addition, the bit stream Bsc includes the code H1 corresponding to the level signal Lst and the code corresponding to the maximum image size information Impx, and thus the code H1 corresponding to the level signal Lst and the code corresponding to the maximum image size information Impx are transmitted to the decoding end.

Further, in this third embodiment, the table T3 in which plural values of the identification number are correlated with pairs of the maximum vertical pixel number and the maximum horizontal pixel number (FIG. 18(a)) is employed as a table that defines correspondence between plural values of the identification number, and the maximum vertical pixel number and maximum horizontal pixel number. However, a table T3a in which values of the identification number are correlated with the maximum vertical pixel numbers (H) (FIG. 18(b)), and a table T3b in which values of the identification number are correlated with the maximum horizontal pixel numbers (W) (FIG. 18(c)) may be employed in place of the table T3. Further, it goes without saying that the number of combinations of the maximum vertical pixel number and the maximum horizontal pixel number in the tables T3, T3a, and T3b, and their values are not limited to those shown in FIGS. 18(a) to 18(c).

Further, in the descriptions of the first to third embodiments, limitations on the number of vertical pixels and the number of horizontal pixels in an input image that can be coded are imposed by the (formula 2a) and (formula 2b), while the limitation the size of the input image that can be coded may be imposed by limiting only one of the number of vertical pixels and the number of horizontal pixels.

Further, it is also possible to judge whether the coding of an input image is possible or not, only on the basis of comparison between the maximum intra frame pixel number, and the numbers of vertical and horizontal pixels in the input image as indicated by the (formula 1), without utilizing the (formula 2a), (formula 2b), (formula 3a), (formula 3b), (formula 8a), and (formula 8b) which have been employed in any of the above-mentioned embodiments.

In the third embodiment, the decision of the value of the identification number is performed by the user with referring to the table T3 shown in FIG. 18(a), but the decision of the identification number may be performed by the user using a following (formula 10), in place of the table T3 shown in FIG. 18(a).

(Identification number)=transC(the maximum number of vertical pixels, the maximum number of horizontal pixels)  (formula 10)

Here, transC is a sign that indicates an operation for obtaining an identification number, using the maximum number of vertical pixels and the maximum number of horizontal pixels as arguments. According to the (formula 10), when the maximum number of vertical pixels and the maximum number of horizontal pixels in the input image which can be coded by the moving picture coding apparatus are designated by the user, the corresponding value of the identification number is decided.

Further, following (formula 10a) and (formula 10b) may be employed in place of the table T3a indicating the correspondence between values of the identification number and the maximum vertical pixel numbers (FIG. 18(b)) and the table T3b indicating the correspondence between values of the identification number and the maximum horizontal pixel numbers (FIG. 18(c)).

(Identification number)=transCa(the maximum number of vertical pixels)  (formula 10a)

(Identification number)=transCb(the maximum number of horizontal pixels)  (formula 10b)

Here, transCa( ) is a sign indicating an operation for obtaining a value of the identification number, using the maximum number of vertical pixels as an argument. According to the (formula 10a), when the user designates the maximum number of vertical pixels in the input image which can be coded by the moving picture coding apparatus, the corresponding value of the identification number is decided.

Further, transCb( ) is a sign indicating an operation for obtaining a value of the identification number, using the maximum number of horizontal pixels as an argument. According to the (formula 10b), when the user designates the maximum number of horizontal pixels in the input image which can be coded by the moving picture coding apparatus, the corresponding value of the identification number is decided.

Embodiment 4

Figure 8:
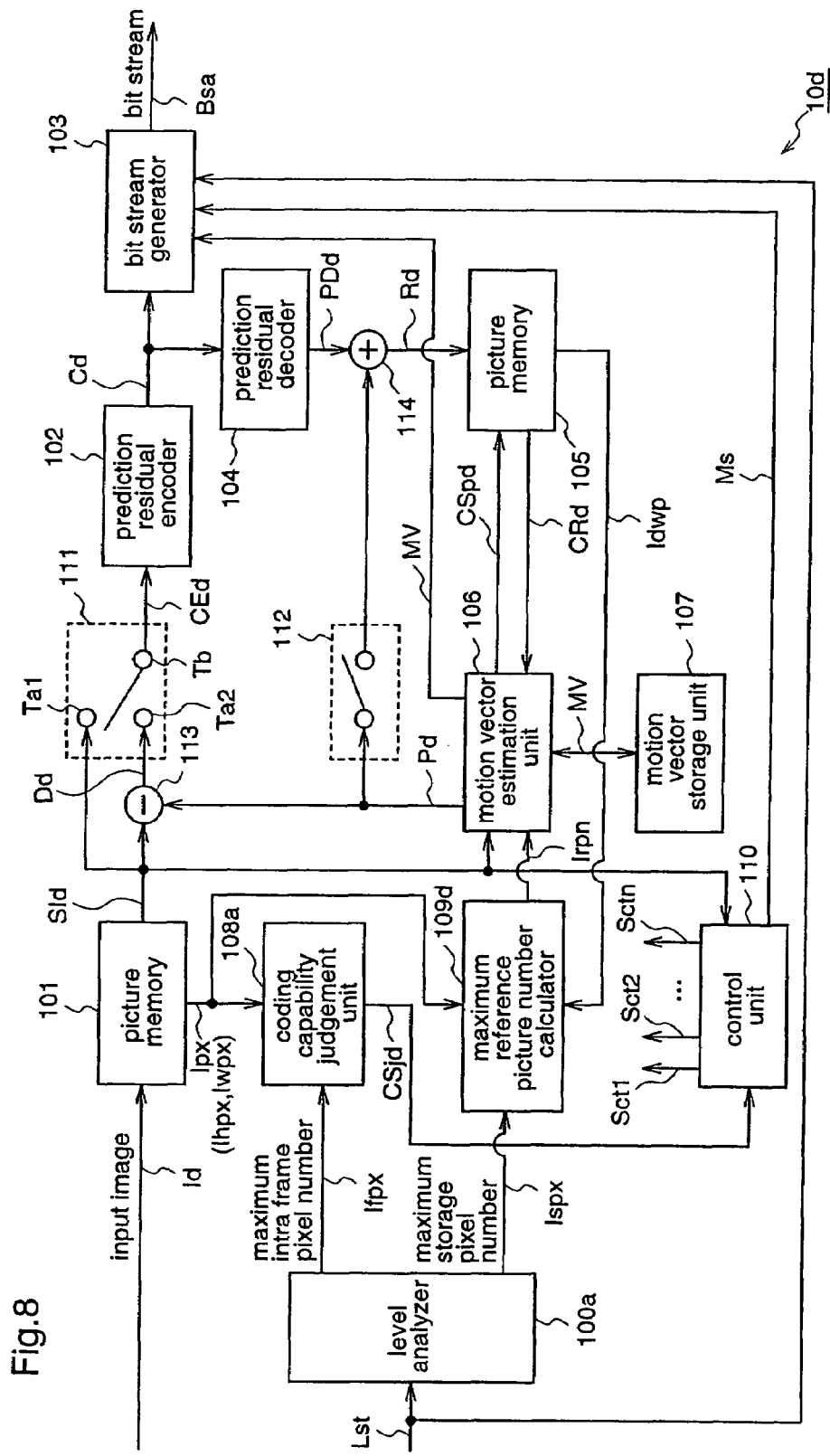
FIG. 8 is a block diagram for explaining a moving picture coding apparatus 10*d* according to a fourth embodiment of the present invention.

FIG. 8 is a block diagram for explaining a moving picture coding apparatus 10d according to a fourth embodiment of the present invention.

The moving picture coding apparatus 10d of the fourth embodiment has, in place of the maximum reference picture calculator 109a of the moving picture coding apparatus 10a according to the first embodiment, a maximum reference picture calculator 109d that calculates the maximum number of reference pictures (Nrpn) on the basis of the size information Ipx for an input image (input image vertical pixel number information Ihpx and input image horizontal pixel number information Iwpx), the maximum storage pixel number information Ispx, and display waiting pixel number information Idwp, and outputs information indicating the calculated value (Nrpn) (i.e., reference picture maximum number information) Irpn.

Here, the display waiting pixel number information Idwp is information that indicates the number of display wait pictures. The display wait pictures are previously decoded pictures that are not employed as reference pictures, as described above with reference to FIG. 26, and image data of the pictures are stored in a picture memory of a decoding apparatus until they are displayed. Further, the control of the picture memory according to the fourth embodiment is performed adaptively to the control of a picture memory in a decoding apparatus, so that image data of a picture that is not employed as a reference picture is deleted from the picture memory immediately after display of the picture is finished.

Constructions of other components in the moving picture coding apparatus 10d according to the fourth embodiment are the same as those in the moving picture coding apparatus 10a of the first embodiment.

Figure 9:
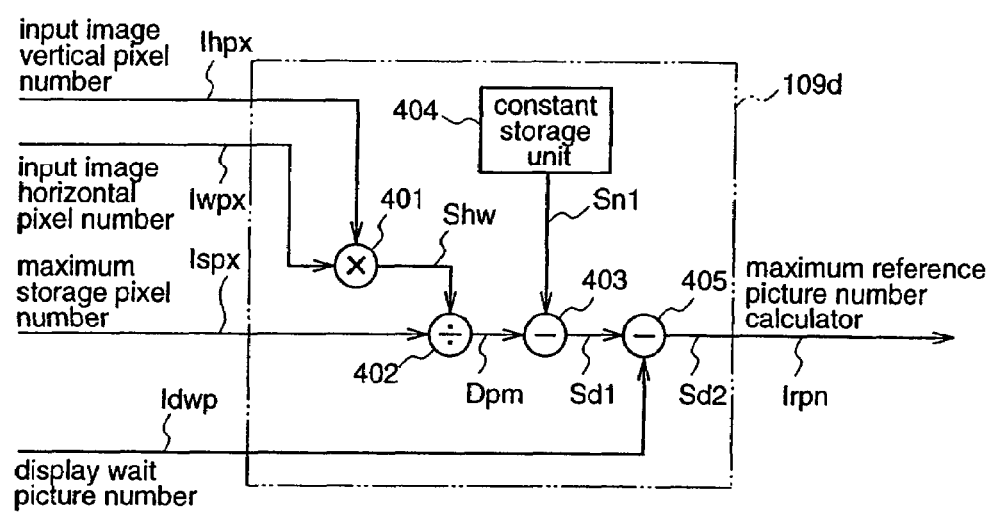
FIG. 9 is a block diagram illustrating a specific construction of a maximum reference picture number calculation unit 109*d* in the moving picture coding apparatus 10*d* according to the fourth embodiment.

FIG. 9 is a diagram illustrating a specific construction of the maximum reference picture calculator 109d.

This maximum reference picture calculator 109d includes, in addition to the multiplier 401, the divider 402, the subtractor 403, and the constant storage unit 404 in the maximum reference picture calculator 109a according to the first embodiment, a subtractor 405 that subtracts the number of display wait pictures (Ndwp) in the picture memory from the number of pictures indicated by the operation output Sd1 from the subtractor 403, on the basis of the picture number information Idwp from the picture memory 105, and outputs an output signal Sd2 from the subtractor 405 as reference picture maximum number information Irpn.

Next, its operation will be described.

The operation of the moving picture coding apparatus 10d according to the fourth embodiment is different from that of the moving picture coding apparatus 10a according to the first embodiment only in the operation of the maximum reference picture calculator 109d.

Thus, only the operation of the maximum reference picture calculator 109d will be described hereinafter with reference to FIG. 9.

The maximum reference picture calculator 109d of the moving picture coding apparatus 10d according to the fourth embodiment calculates the maximum number of reference candidate pictures which are employed at the inter picture prediction coding, according to an operation indicated by a following (formula 11).

$$Nrpn = Nspx \div (h \times w) - 1 - Ndwp \quad \text{(formula 11)}$$

Here, h designates the number of vertical pixels in the input image (target picture to be coded), and w designates the number of horizontal pixels in the input image (the target picture). Nrpn designates the maximum number of reference pictures, Nspx designates the maximum number of storage pixels, and Ndwp designates the number of display waiting decoded pictures. In this fourth embodiment, the maximum storage pixel number Nspx is the maximum value of the total number of pixels corresponding to all storage pictures whose image data are stored in a picture memory of a moving picture decoding apparatus that decodes a bit stream obtained by the moving picture coding apparatus 10d. The storage pictures are reference pictures, a target picture to be decoded, and display waiting decoded pictures.

The maximum reference picture calculator 109d calculates the total number of pixels in one frame (h×w), corresponding to the size of the input image on the basis of input image vertical pixel number information Ihpx and input image horizontal pixel number information Iwpx. More specifically, the multiplier 401 multiplies the number of vertical pixels (h) in the input image, which is indicated by the input image vertical pixel number information Ihpx, by the number of horizontal pixels (w), which is indicated by the input image horizontal pixel number information Iwpx, and outputs an operation output Shw indicating the multiplication result (h×w).

The divider 402 divides the maximum storage pixel number (Nspx) by the multiplication result (h×w) on the basis of the operation output Shw from the multiplier 401 and the maximum storage pixel number information Ispx from the level analyzer 100a, and outputs an operation output signal Dpm indicating the division result (Nspx/(h×w)).

The subtractor 403 subtracts 1 from the division result (Nspx/(h×w)) on the basis of the output signal Dpm from the divider 402 and the numeric value information Sn1 from the constant storage unit 404, and outputs a subtraction output signal Sd1 indicating the subtraction result (Nspx/(h×w)−1).

Further, the subtractor 405 subtracts the number of display wait pictures (Ndwp) from the subtraction result (Nspx/(h×w)−1) on the basis of the subtraction output signal Sd1, and the picture number information Idwp from the picture memory, thereby deciding the maximum number of reference pictures.

The reason why the subtractors 403 and 405 subtracts 1 and the number of display wait pictures (Ndwp) from the division result (Nspx/(h×w)), respectively, is that decoded image data of a target picture to be decoded and display wait pictures, as well as image data of reference candidate pictures which are employed at the inter picture prediction decoding must be stored in the picture memory of the decoding apparatus.

As described above, the moving picture coding apparatus 10d of the fourth embodiment includes the level analyzer 100a that decides the maximum number of intra frame pixels (Nfpx) which can be coded and the maximum number of storage pixels (Nspx) which can be stored in the picture memory of the decoding apparatus, on the basis of the level signal LSt that indicates a coding level designated by the user, thereby performing the judgement as to whether the coding of an input image is possible or not on the basis of the maximum intra frame pixel number (Nfpx) and the input image size (the number of vertical pixels Nhpx and the number of horizontal pixels Nwpx), and calculating the number of reference candidate pictures which can be referred to at the inter picture prediction coding (reference picture maximum number) Nrpn. Therefore, a decoding apparatus to which a bit stream from the moving picture coding apparatus 10b is supplied can always decode the bit stream satisfactorily, whereby picture prediction decoding corresponding to picture prediction coding on the coding end can be performed. Accordingly, memory areas of the coding apparatus and the decoding apparatus that are compliant with a coding method in which there is no restraint on the capacity of the memory areas can be designed.

In this fourth embodiment, the maximum number of reference pictures which are stored in the picture memory is decided in view of the number of display wait pictures (Ndwp), whereby the picture memory in which image data of reference candidate pictures are stored can be efficiently employed according to the status of the processing for image data.

In the fourth embodiment, the maximum storage pixel number Nspx is the maximum value of the total number of pixels corresponding to all storage pictures whose image data are stored in a picture memory of a moving picture decoding apparatus that decodes a bit stream obtained by the moving picture coding apparatus 10d, and the storage pictures are reference pictures, a target picture to be decoded, and display waiting decoded pictures. However, it is possible to define the maximum storage pixel number not to include the number of pixels corresponding to the target picture to be decoded.

In this case, a following (formula 11a) is employed in place of the (formula 11).

$$Nrpn = Nspx \div (h \times w) - Ndwp \quad \text{(formula 11a)}$$

Thus, the maximum reference picture calculator 109d shown in FIG. 9 decides the maximum number of reference pictures, without performing the operation of subtracting 1 from the division result (Nspx/(h×w)).

Here, h designates the number of vertical pixels in a target picture to be coded, w designates the number of horizontal pixels in the target picture, Nrpn designates the maximum number of reference pictures, Nspx designates the maximum number of storage pixels, and Ndwp designates the number of display wait pictures.

In this fourth embodiment, the control of the picture memory is performed adaptively to the control of a picture memory in the decoding apparatus for deleting image data of pictures which are not employed as reference pictures from the picture memory immediately after the display of the pictures is finished. However, the image data of pictures which are not employed as reference pictures may be deleted at a time other than immediately after the display as described in the fourth embodiment.

For example, the control of the picture memory according to the fourth embodiment may be performed adaptively to the control of the picture memory in the decoding apparatus for deleting image data of a picture which is stored in the picture memory but is not used as a reference picture, from the picture memory after the display time of one picture expires after the picture has been displayed.

Embodiment 5

Figure 10:
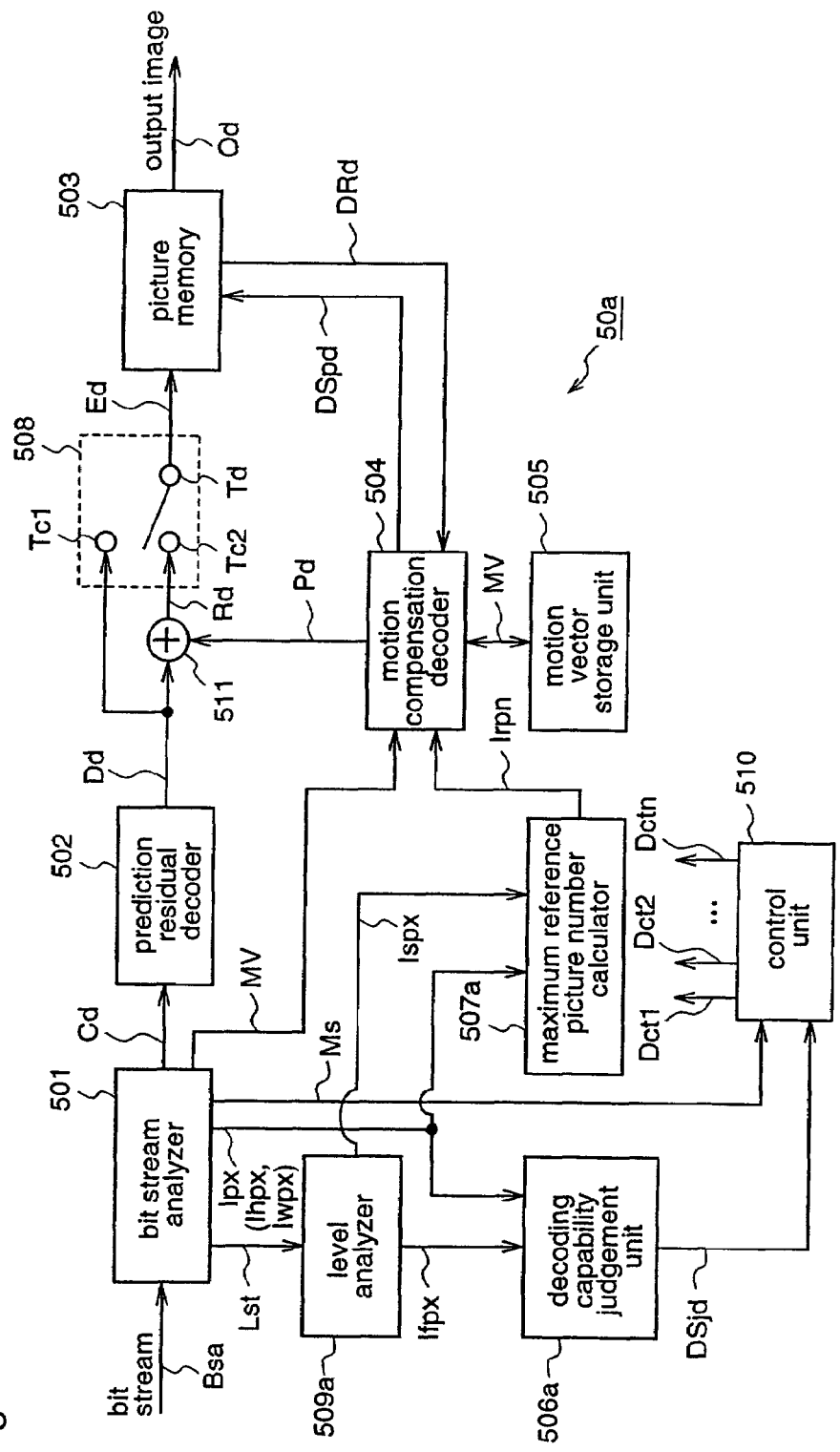
FIG. 10 is a block diagram for explaining a moving picture decoding apparatus 50*a* according to a fifth embodiment of the present invention.

FIG. 10 is a block diagram for explaining a moving picture decoding apparatus 50a according to a fifth embodiment of the present invention.

The moving picture decoding apparatus 50a according to the fifth embodiment receives a bit stream corresponding to plural pictures that constitute a moving picture, and decodes the bit stream in predetermined data processing units, i.e., in units of blocks. More specifically, this moving picture decoding apparatus 50a decodes a bit stream Bsa (see FIG. 14(a)) generated by the moving picture coding apparatus 10a according to the first embodiment. Here, the block is a macroblock that is composed of 16 vertical pixels×16 horizontal pixels.

That is, this moving picture decoding apparatus 50a includes a bit stream analyzer 501 that analyzes an inputted bit stream Bsa, and outputs various kinds of header information that is stored in a header area Ha of the bit stream Bsa, and data stored in a sequence data part Dsq of the bit stream Bsa. Here, a level identifier H1 is included in the header area Ha as one kind of header information. In addition, the sequence data part Dsq contains a sequence header Sh, and further contains information Ms of a coding mode, coded data Cd, information MV of a motion vector, and the like, corresponding to each macroblock. Further, information indicating the size of an input image that has been a target of the coding process on the coding end (input image size information) Ipx is included in the sequence header Sh. This input image size information Ipx is composed of information Ihpx indicating the number of vertical pixels (Nhpx) of the input image, and information Iwpx indicating the number of horizontal pixels (Nwpx) of the input image.

The moving picture decoding apparatus 50a includes a prediction residual decoder 502 that decompressively decodes coded data Cd from the bit stream analyzer 501, and outputs decoded residual data Dd of the target block; an adder 511 that adds the decoded residual data Dd of the target block and predictive data Pd for the target block, and outputs image data of the target block (hereinafter, referred to as decoded data) Rd; and a picture memory 503 that temporarily stores one of the output data Dd from the prediction residual decoder 502 and the output data Rd from the adder 511, and outputs the stored decoded data Ed as data DRd of a picture that is to be referred to at the decoding of the target block in accordance with a picture designation signal DSpd. Here, in the picture memory 503, image data of decoded pictures which are arranged in the order of decoding are reordered in the order of display. The image data of the decoded pictures which have been reordered in the order of display are outputted from the picture memory 503 in units of pictures, as image data Od of the output image.

The moving picture decoding apparatus 50a includes a motion compensation decoder 504 that generates predictive data Pd for the target block on the basis of a motion vector MV from the bit stream analyzer 501 and the output data (reference candidate picture data) DRd from the picture memory 503; and a motion vector storage unit 505 that stores the motion vector MV of a block, which has been supplied to the motion compensation decoder 504.

The moving picture decoding apparatus 50a includes a selector switch 508 that selects one of the output data Dd from the prediction residual decoder 502 and the output data Rd from the adder 511, and outputs the selected data as selection data Ed. Here, the selector switch 508 has two input terminals Tc1 and Tc2, and one output terminal Td. In accordance with a switch control signal, the output terminal Td is connected to one of the two input terminals Tc1 and Tc2.

The moving picture decoding apparatus 50a of the fifth embodiment includes a level analyzer 509a that outputs information indicating the maximum number of intra frame pixels which can be decoded (Nfpx) (i.e., the maximum intra frame pixel number information) Ifpx, and information indicating the number of pixels corresponding to the maximum image data which can be stored in the picture memory of the decoding apparatus (the maximum storage pixel number (Nspx)) (i.e., the maximum storage pixel number information) Ispx, in accordance with a level signal (level identifier) Lst indicating a coding level from the bit stream analyzer 501. This level analyzer unit 509 includes information of the table T1 shown in FIG. 15. The table T1 defines correspondence between the level identifier value, and the maximum intra frame pixel number and storage pixel maximum number.

The moving picture decoding apparatus 50a includes a judgement unit (decoding capability judgment unit) 506a that judges whether decoding of the inputted bit stream is possible or not, on the basis of the maximum intra frame pixel number information Ifpx that is outputted from the level analyzer 509a and information indicating the number of vertical pixels (h) and the number of horizontal pixels (w) of the input image (input image size information) Ipx, which is outputted from the bit stream analyzer 501, and outputs a signal indicating the judgement result (judgement result signal) DSjd. The moving picture decoding apparatus 50a further includes a calculator (maximum reference picture calculator) 507a that calculates the number of reference candidate pictures (reference picture maximum number) Nrpn which can be referred to at inter picture prediction decoding, on the basis of the maximum storage pixel number information Ispx and the input image size information Ipx, and outputs information Irpn indicating the calculated number Nrpn (reference picture maximum number).

The moving picture decoding apparatus 50a further includes a control unit 510 that controls operations of the respective components of the moving picture decoding apparatus 50a with control signals Dct1, Dct2, . . . , Dctn, on the basis of the judgement result signal DSjd and the coding mode information Ms from the bit stream analyzer 501. This control unit 510 controls the switch 508 with a predetermined control signal, according to the coding mode indicated by the mode signal Ms from the bit stream analyzer 501. The control unit 510 further controls operations of the prediction residual decoder 502, the motion compensation decoder 504, and the like with the control signals Dct1, Dct2, . . . , Dctn, on the basis of the judgement result signal DSjd. That is, when the judgement result signal DSjd indicates that decoding of the inputted bit stream Bsa is possible, the control unit 510 controls the prediction residual decoder 502, the motion compensation decoder 504, and the like, for executing the decoding of the inputted bit stream Bsa. On the other hand, when the judgement result signal DSjd indicates that decoding of the inputted bit stream Bsa is impossible, the control unit 510 controls the prediction residual decoder 502, the motion compensation decoder 504, and the like, for not executing the decoding of the inputted bit stream Bsa.

A specific construction of the decoding capability judgment unit 506a in the moving picture decoding apparatus 50a according to the fifth embodiment is the same as that of the coding capability judgment unit 108a in the moving picture coding apparatus 10a according to the first embodiment as shown in FIG. 2.

A specific construction of the maximum reference picture calculator 507a in the moving picture decoding apparatus 50a according to the fifth embodiment is the same as that of the maximum reference picture calculator 109a in the moving picture coding apparatus 10a according to the first embodiment as shown in FIG. 3.

Next, its operation will be described.

When the bit stream Bsa is inputted to the moving picture decoding apparatus 50a, initially the bit stream analyzer 501 analyzes the bit stream Bsa to extract various kinds of information such as the coding mode information Ms, motion vector information MV, and coded data Cd, from the bit stream Bsa. At that time, the bit stream analyzer 501 simultaneously extracts various kinds of header information included in the header area Ha of the bit stream Bsa, and outputs the header information to the level analyzer 509a, the decoding capability judgment unit 506, and the maximum reference picture calculator 507a.

The level analyzer 509a decides the maximum number of intra frame pixels (Nfpx) and the maximum number of storage pixels (Nspx) with referring to the table T1 (FIG. 15) that is retained therein, in accordance with the level signal Lst corresponding to one kind of header information H1 included in the header area Ha, and outputs maximum intra frame pixel number information Ifpx and storage pixel maximum number information Ispx. The maximum intra frame pixel number information Ifpx is inputted to the decoding capability judgment unit 506a, and the maximum storage pixel number information Ispx is inputted to the maximum reference picture calculator 507a.

Then, the decoding capability judgment unit 506a judges whether decoding for the inputted bit stream Bsa is possible or not, on the basis of the maximum intra frame pixel number information Ifpx from the level analyzer 509a, and the input image size information Ipx (input image vertical pixel number information Ihpx and horizontal pixel number information Iwpx) that has been extracted from the sequence header Sh of the bit stream Bsa by the bit stream analyzer 501, and outputs a signal indicating the result of judgement (judgement result signal) DSjd to the control unit 510.

When the judgement result signal DSjd indicates that the decoding of the inputted bit stream Bsa is possible, the control unit 510 controls the respective components of the moving picture decoding apparatus 50a in accordance with the control signals Dct1, Dct2, . . . , Dctn, for executing the decoding of the inputted bit stream Bsa, while when the judgement result signal DSjd indicates that the decoding of the inputted bit stream Bsa is impossible, the control unit controls the respective components of the moving picture decoding apparatus 50a in accordance with the control signals Dct1, Dct2, . . . , Dctn, for not executing the decoding of the inputted bit stream Bsa.

When the judgement result signal DSjd indicates that the decoding of the inputted bit stream Bsa is possible, the control unit 510 performs switching between a mode of performing inter picture prediction decoding for the bit stream Bsa and a mode of performing intra picture prediction decoding for the bit stream Bsa according to the coding mode indicated by the mode signal Ms from the bit stream analyzer 501.

Then, when the mode of performing the inter picture prediction decoding is selected by the control unit 510, the switch 508 is controlled by a predetermined control signal from the control unit 510, so that the output terminal Td is connected to the second input terminal Tc2. On the other hand, when the mode of performing the intra picture prediction decoding is selected by the control unit 510, the switch 508 is controlled by a predetermined control signal from the control unit 510, so that the output terminal Td is connected to the first input terminal Tc1.

Further, the maximum reference picture calculator 507a calculates the number of reference candidate pictures which can be referred to at the inter picture prediction decoding (reference picture maximum number) Nrpn on the basis of the maximum storage pixel number information Ispx, and the vertical pixel number information Ihpx and horizontal pixel number information Iwpx of the input image, and outputs information indicating the calculated number Nrpn (reference picture maximum number information) Irpn to the motion compensation decoder 504.

Hereinafter, the operation in the case where the inter picture prediction decoding mode is selected will be initially described.

When the motion vector information MV that has been extracted from the bit stream Bsa by the bit stream analyzer 501 is inputted to the motion compensation decoder 504, the motion compensation decoder 504 performs motion compensation for the target macroblock on the basis of the reference picture maximum number information Irpn from the maximum reference picture calculator 507a, and the motion vectors MV of decoded macroblocks and the motion vector MV of the target macroblock which are stored in the motion vector storage unit 505, with referring to a predetermined reference picture, and outputs predictive data Pd corresponding to the target block, to the adder 511. At this time, decoded image data Ed corresponding to the decoded pictures are stored in the picture memory 503, as image data of reference candidate pictures, and a required picture among the reference candidate pictures is specified in the picture memory 503 as the reference picture in accordance with a picture designation signal DSpd from the motion compensation decoder 504.

Coded data Cd that has been extracted from the bit stream Bsa by the bit stream analyzer 501 is decoded by the prediction residual decoder 502, and prediction residual image data Dd that has been obtained by the decoding is outputted to the adder 511.

The adder 511 performs addition between the prediction residual image data Dd from the prediction residual decoder 502 and the predictive data Pd from the motion compensation decoder 504, and outputs image data Rd that is obtained by the addition to the picture memory 503 via the switch 508. Then, the image data Rd of the target picture to be decoded is written to the picture memory 503 as decoded data in units of macroblocks.

Then, image data of decoded pictures which are arranged in the order of decoding are reordered in the order of display, and outputted from the picture memory 503 as image data Od of an output image in units of pictures.

Next, the operation in the case where the intra picture prediction decoding mode is selected will be briefly described.

In this case, the coded data Cd extracted from the bit stream Bsa by the bit stream analyzer 501 are decoded by the prediction residual decoder 502, and prediction residual image data Dd obtained by the decoding is stored in the picture memory 503 as it is as decoded data Rd via the switch 508.

Next, specific operations of the decoding capability judgment unit 506a and the maximum reference picture calculator 507a in the moving picture decoding apparatus 50a will be briefly described.

The decoding capability judgment unit 506a of the moving picture decoding apparatus 50a according to the fifth embodiment judges whether the decoding of the inputted bit stream is possible or not, according to the above-mentioned conditional formulae (formula 1), (formula 2a), (formula 2b), (formula 3a), and (formula 3b), like the coding capability judgment unit 108a of the moving picture coding apparatus 10a according to the first embodiment.

More specifically, the decoding capability judgment unit 506a performs the operation indicated by (formula 1) on the basis of the input image vertical pixel number information Ihpx and horizontal pixel number information Iwpx included in the input image size information Ipx that has been outputted from the bit stream analyzer 501. In other words, the multiplication for obtaining the product (h×w) of the number of vertical pixels (h) and the number of horizontal pixels (w) in the input image is performed, and then comparison between the multiplication result (h×w) and the maximum intra frame pixel number (Nfpx) (i.e., intra frame pixel number comparison) is performed. Next, the decoding capability judgment unit 506a calculates the maximum number of vertical pixels (H) and the maximum number of horizontal pixels (W) as indicated by the (formula 3a) and (formula 3b), respectively, on the basis of the input image vertical pixel number information Ihpx and horizontal pixel number information Iwps.

Here, the (formula 3a) and (formula 3b) indicate that the maximum vertical pixel number (H) and the maximum horizontal pixel number (W) are respectively the positive square root of a value that is obtained by multiplying the product of the vertical pixel number (h) and the horizontal pixel number (w) of the input image, by N. For example when N=8, the (formula 3a) suggests that the maximum number of vertical pixels are decided so that the ratio between the number of vertical pixels and the number of horizontal pixels is smaller than 8:1, and the (formula 3b) suggests that the maximum number of horizontal pixels are decided so that the ratio between the number of vertical pixels and the number of horizontal pixels is smaller than 1:8.

The decoding capability judgment unit 506a further performs an operation such as omission, raising, or half-adjust, for the maximum number of vertical pixels (H) and the maximum number of horizontal pixels (W) to be rounded to a multiple of 16, respectively, and then performs comparison between the input image vertical pixel number (h) and the rounded maximum number of vertical pixels (H) (vertical pixel number comparison), and comparison between the input image horizontal pixel number (w) and the rounded maximum number of horizontal pixels (W) (horizontal pixel number comparison).

Then, on the basis of the results of the intra frame pixel number comparison, the vertical pixel number comparison, and the horizontal pixel number comparison, the final judgement as to the capability/incapability of decoding is performed.

The maximum reference picture calculator 507a of the moving picture coding apparatus 50a according to the fifth embodiment calculates the maximum number of reference candidate pictures which are employed at the inter picture prediction decoding, according to the operation indicated by the (formula 4).

The maximum reference picture calculator 507a calculates the total number of pixels in one frame (h×w) as the size of the input image, on the basis of the vertical pixel number information Ihpx and the horizontal pixel number information Iwpx for the input image from the bit steam analyzer 501.

Further, the maximum reference picture calculator 507a performs an operation of dividing the maximum storage pixel number (Nspx) by the multiplication result (h×w), and further performs an operation of subtracting 1 from the division result (Nspx/(h×w)), thereby obtaining the subtraction result (Nspx/(h×w)−1) as the maximum number of reference pictures.

As described above, the moving picture decoding apparatus 50a of the fifth embodiment includes the level analyzer 509a that decides the maximum number of intra frame pixels (Nfpx) which can be decoded and the maximum number of storage pixels (Nspx) which can be stored in the picture memory 503 in accordance with the level signal Lst indicating the level identifier, which has been extracted from the bit stream Bsa by the bit stream analyzer 501, thereby judging whether decoding of the inputted bit stream Bsa is possible or not on the basis of the maximum intra frame pixel number (Nfpx) and the input image size (vertical pixel number Nfpx and horizontal pixel number Nwpx), and calculating the number of reference candidate pictures which can be referred to at the inter picture prediction decoding (reference picture maximum number) Nrpn. Therefore, a bit stream which can be decoded by the moving picture decoding apparatus among bit streams which have been supplied from the coding end can be determined by the level identifier, thereby satisfactorily performing picture prediction decoding corresponding to the picture prediction coding on the coding end. Thereby, it is possible to design a memory area in the decoding apparatus corresponding to the coding method in which there is no restraint on the capacity of the memory area.

In this fifth embodiment, the table T1 in which pairs of the maximum intra frame pixel number and the maximum storage pixel number are correlated with the coding levels (values of the level identifier) (see FIG. 15) is employed as a table that defines correspondence between the coding level, and the maximum intra frame pixel number and storage pixel maximum number. However, a table T1a that defines correspondence between the value of the level identifier and the maximum intra frame pixel number (FIG. 16(a)) and a table T1b that defines correspondence between the value of the level identifier and the maximum storage pixel number (FIG. 16(b)) may be employed in place of the table T1.

Embodiment 6

Figure 11:
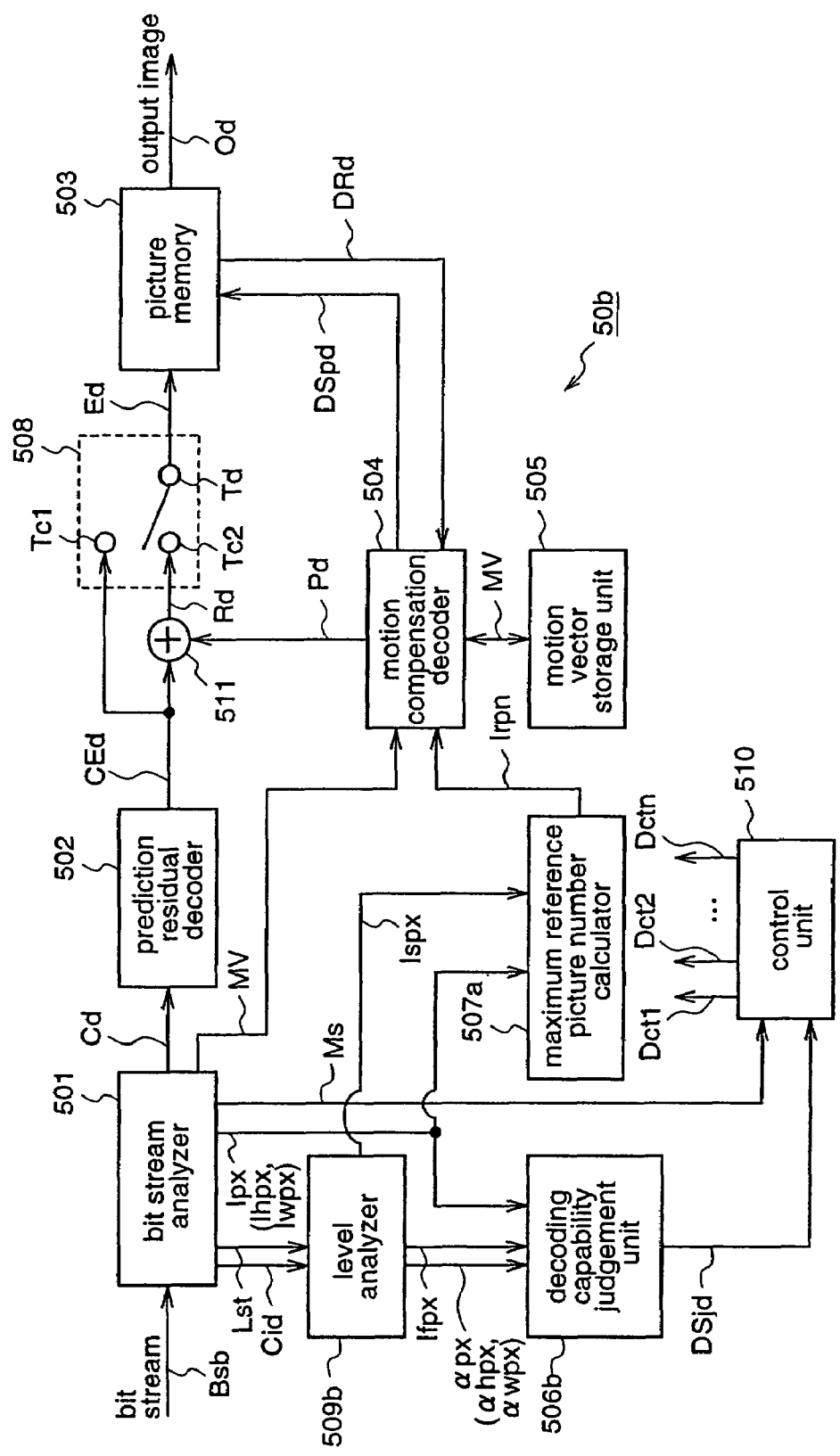
FIG. 11 is a block diagram for explaining a moving picture decoding apparatus 50*b* according to a sixth embodiment of the present invention.

FIG. 11 is a block diagram for explaining a moving picture decoding apparatus 50b according to a sixth embodiment of the present invention.

This moving picture decoding apparatus 50b according to the sixth embodiment receives a bit stream corresponding to plural pictures that constitute a moving picture, and decodes the bit stream in predetermined data processing units, i.e., in units of blocks. More specifically, the moving picture decoding apparatus 50b decodes a bit stream Bsb that is generated by the moving picture coding apparatus 10b according to the second embodiment (see FIG. 14(b)). Therefore, in this sixth embodiment, the bit stream analyzer 501 analyzes header information H1 and H2 to extract a level identifier Lst and an identification number signal Cid, and analyzes a sequence data part Dsq to extract information Ms of a coding mode, coded data Cd, motion vector information Mb, input image size information Ipx and the like, corresponding to each macroblock.

Further, the level analyzer 509b in the moving picture decoding apparatus 50b according to the sixth embodiment contains the tables T1 and T2, and outputs maximum intra frame pixel number information Ifpx and storage pixel maximum number information Ispx on the basis of the level signal Lst from the bit stream analyzer 501, as well as outputs pixel number calculation coefficient information αpx on the basis of the identification number signal Cid from the bit stream analyzer 501. A decoding capability judgment unit 506b according to the sixth embodiment judges whether decoding of an inputted bit stream Bsb is possible or not on the basis of the maximum intra frame pixel number information Ifpx and the pixel number calculation coefficient information αpx from the level analyzer 509b, and the input image size information Ipx from the bit stream analyzer 501. Here, the pixel number calculation coefficient information αpx is composed of information αhpx indicating a vertical pixel number calculation coefficient (Nαhxp), and information αwpx indicating a horizontal pixel number calculation coefficient (Nαwpx).

Constructions of the other components of the moving picture decoding apparatus 50b according to the sixth embodiment are the same as those of the moving picture decoding apparatus 50a according to the fifth embodiment.

A specific construction of the decoding capability judgment unit 506b in the moving picture decoding apparatus 50b according to the sixth embodiment is identical to that of the coding capability judgment unit 108b in the moving picture coding apparatus 100b according to the second embodiment as shown in FIG. 5.

Next, the operation will be described.

The operation of the moving picture decoding apparatus 50b according to the sixth embodiment is different from the operation of the moving picture decoding apparatus 50a according to the fifth embodiment only in the operations of the bit stream analyzer 501, the decoding capability judgment unit 506b, and the level analyzer 509b.

Then, the operations of the bit stream analyzer 501, the decoding capability judgment unit 506b, and the level analyzer 509b will be mainly described hereinafter.

When the bit stream Bsb is inputted to the moving picture decoding apparatus 50b, the bit stream analyzer 501 analyzes the bit stream Bsb, and extracts various kinds of information such as coding mode information Ms, motion vector information MV, and coded data Cd from the bit stream Bsb. At that time, various kinds of header information included in the header area Hb of the bit stream Bsb is simultaneously extracted, and inputted to the level analyzer 509b, the decoding capability judgment unit 506b, and the maximum reference picture calculator 507a.

The level analyzer 509b outputs maximum intra frame pixel number information Ifpx and storage pixel maximum number information Ispx in accordance with a level identifier (level signal) Lst corresponding to the header information (code) H1 in the header area Hb, with referring to the table T1 (FIG. 15) that is held therein. The level analyzer 509b outputs pixel number calculation coefficient information αpx (vertical pixel number calculation coefficient information αhpx and horizontal pixel number calculation coefficient information αwpx) in accordance with the identification number signal Cid corresponding to the header information (code) H2 in the header area Hb, with referring to the table T2 (FIG. 17(a)) that is held therein. The maximum intra frame pixel number information Ifpx and the pixel number calculation coefficient information αpx is inputted to the decoding capability judgment unit 506b, while the maximum storage pixel number information Ispx is inputted to the maximum reference picture calculator 507a.

Then, the decoding capability judgment unit 506b judges whether decoding of the inputted bit stream Bsb is possible or not, on the basis of the maximum intra frame pixel number information Ifpx and the pixel number calculation coefficient information αpx (vertical pixel number calculation coefficient information αhpx and horizontal pixel number calculation coefficient information αwpx) from the level analyzer 509b, and the input image size information Ipx (input image vertical pixel number information Ihpx and input image horizontal pixel number information Iwpx) extracted from the sequence header Sh by the bit stream analyzer 501, and outputs a signal indicating the judgement result (judgement result signal) DSjd to the control unit 510.

In this sixth embodiment, the decoding for the inputted bit stream Bsb is performed in accordance with the judgement result signal DSjd, in the same manner as the moving picture decoding apparatus 50a according to the fifth embodiment.

Next, a specific operation of the decoding capability judgment unit 506b in the moving picture decoding apparatus 50b will be briefly described.

The decoding capability judgment unit 506b of the moving picture decoding apparatus 50b according to the sixth embodiment judges the capability or incapability of the decoding for the inputted bit stream Bsb according to the above-mentioned conditional formulas (formula 1), (formula 2a), (formula 2b), (formula 8a), and (formula 8b).

Initially, the decoding capability judgment unit 506b performs the operation indicated by the (formula 1) on the basis of the input image size information Ipx (vertical pixel number information Ihpx and horizontal pixel number information Iwpx of the input image) that is outputted from the bit stream analyzer 501, like in the decoding capability judgment unit 506a according to the fifth embodiment. In other words, multiplication for obtaining the product (h×w) of the number of vertical pixels (h) and the number of horizontal pixels (w) in the input image is performed, and then comparison between the multiplication result (h×w) and the maximum intra frame pixel number (Nfpx) (i.e., intra frame pixel number comparison) is performed.

Next, the decoding capability judgment unit 506b calculates the maximum number of vertical pixels (H) and the maximum number of horizontal pixels (W) as indicated by the (formula 8a) and (formula 8b), on the basis of the intra frame pixel number information Ifpx and the pixel calculation coefficient information $\alpha$px (vertical pixel number calculation coefficient information $\alpha$hpx and horizontal pixel calculation coefficient information $\alpha$wpx).

Here, the (formula 8a) and (formula 8b) indicate that the maximum number of vertical pixels (H) and the maximum number of horizontal pixels (W) are obtained by dividing the maximum number of intra frame pixels (Nfpx) by the vertical pixel number calculation coefficient (N$\alpha$hpx) and the horizontal pixel number calculation coefficient (N$\alpha$wpx), respectively.

Further, the decoding capability judgment unit 506b rounds the maximum vertical pixel number (H) and the maximum horizontal pixel number (W) to a multiple of 16, respectively, by an operation such as omission, raising, or half-adjust, and performs comparison between the input image vertical pixel number (h) and the rounded vertical pixel maximum number (H) (i.e., vertical pixel number comparison), and comparison between the input image horizontal pixel number (w) and the rounded horizontal pixel maximum number (W) (i.e., horizontal pixel number comparison).

Then, the final judgement as to the capability or incapability of the decoding is performed on the basis of the results of the intra frame pixel number comparison, the vertical pixel number comparison, and the horizontal pixel number comparison.

As described above, the moving picture decoding apparatus 50b according to the sixth embodiment includes the level analyzer unit 509b that decides the maximum number of intra frame pixels (Nfpx) which can be decoded and the maximum number of storage pixels (Nspx) which can be stored in the picture memory 503, as well as the pixel number calculation coefficient (N$\alpha$px), on the basis of level identifier (level signal) Lst and the identification number signal Cid, which are extracted from the bit stream Bsb by the bit stream analyzer 501, thereby judging whether decoding of the inputted bit stream Bsb is possible or not on the basis of the maximum intra frame pixel number (Nfpx) and the pixel number calculation coefficient (N$\alpha$px) which are decided by the level analyzer 509b, and the input image size information Ipx included in the bit stream Bsb, and calculating the number of reference candidate pictures (reference picture maximum number) Nrpn which can be referred to at the inter picture prediction decoding. Therefore, a bit stream which can be decoded by the moving picture decoding apparatus among bit streams which have been supplied from the coding end is determined on the basis of the level identifier, whereby picture prediction decoding corresponding the picture prediction coding on the coding end can be satisfactorily performed. Accordingly, a memory area of the decoding apparatus that is adapted to the coding method in which there is no restraint on the capacity of the memory area can be designed.

In this sixth embodiment, the maximum number of vertical pixels (H) and the maximum number of horizontal pixels (W) are obtained by dividing the maximum intra frame pixel number (Nfpx) by the vertical pixel number calculation coefficient (N$\alpha$hpx) and the horizontal pixel number calculation coefficient (N$\alpha$wpx), respectively, whereby the process for obtaining the maximum number of vertical pixels (H) and the maximum number of horizontal pixels (W) can be facilitated as compared to the fifth embodiment.

Here, in the sixth embodiment, the level identifier corresponding to the maximum intra frame pixel number (Nfpx) and the maximum storage pixel number (Nspx), and the identification number corresponding to the vertical pixel number calculation coefficient (N$\alpha$hpx) and the horizontal pixel number calculation coefficient (N$\alpha$wpx) are parameters that indicate independent coding conditions, respectively. However, the value of the identification number may be correlated with the value of the level identifier.

In this case, specific values of the vertical pixel number calculation coefficient (N$\alpha$hpx) and the horizontal pixel number calculation coefficient (N$\alpha$wpx) are decided together with specific values of the maximum intra frame pixel number (Nfpx) and the maximum storage pixel number (Nspx) on the basis of the level signal Lst indicating the level identifier, with referring to the tables T1 and T2. That is, when the level signal Lst from the bit stream analyzer 501 is inputted to the level analyzer 509b, the level analyzer 509b outputs information Ifpx and Ispx indicating the maximum intra frame pixel number (Nfpx) and the maximum storage pixel number (Nspx), respectively, with reference to the table T1 on the basis of the level signal Lst, and further outputs pixel number calculation coefficient information $\alpha$px on the basis of the identification number corresponding to the level identifier, with reference to the table T2. In this case, the bit stream Bsb includes only the code H1 corresponding to the level signal Lst, and thus the identification number signal Cid corresponding to the code H2 is not outputted from the bit stream analyzer 501 to the level analyzer 509b.

According to this sixth embodiment, the moving picture decoding apparatus analyzes the code H1 of the level identifier corresponding to the maximum intra frame pixel number (Nfpx) and the maximum storage pixel number (Nspx), and the code H2 of the identification number corresponding to the vertical pixel number calculation coefficient (N$\alpha$hpx) and the horizontal pixel number calculation coefficient (N$\alpha$wpx), then obtains the maximum intra frame pixel number (Nfpx) and the maximum storage pixel number (Nspx) with reference to the table T1 on the basis of the level identifier obtained by the analysis of the code H1, and further obtains the vertical pixel number calculation coefficient (N$\alpha$hpx) and the horizontal pixel number calculation coefficient (N$\alpha$wpx) with reference to the table T2 on the basis of the identification number signal Cid obtained by the analysis of the code H2. However, the moving picture decoding apparatus may analyze a code that is obtained by coding pixel number calculation coefficient information $\alpha$px indicating arbitrary vertical pixel number calculation coefficient (N$\alpha$hpx) and horizontal pixel number calculation coefficient (N$\alpha$wpx), which are decided by the user, and directly obtain the pixel number calculation coefficient information $\alpha$px by the analysis of the code.

In this case, the decision of specific values for the maximum intra frame pixel number (Nfpx) and the maximum storage pixel number (Nspx) is performed with reference to the table T1, while the decision of specific values for the vertical pixel number calculation coefficient (N$\alpha$hpx) and the horizontal pixel number calculation coefficient (N$\alpha$wpx) is performed by the analysis of the code corresponding to the pixel number calculation coefficient information $\alpha$px, without referring to the table.

That is, when the level signal Lst from the bit stream analyzer 501 is inputted to the level analyzer 509b, the level analyzer 509b outputs information Ifpx indicating the maximum intra frame pixel number (Nfpx) decided with reference to the table T1, to the decoding capability judgment unit 506b, and outputs information Ispx indicating the maximum storage pixel number (Nspx) decided with reference to the table T1, to the maximum reference picture calculator 507a, in accordance with the level signal Lst. Further, the pixel number calculation coefficient information αpx indicating specific values of the vertical pixel number calculation coefficient (Nαhpx) and the horizontal pixel number calculation coefficient (Nαwpx), which are obtained by the analysis of the code by the bit stream analyzer 501 is directly inputted to the decoding capability judgment unit 506b.

Embodiment 7

Figure 12:
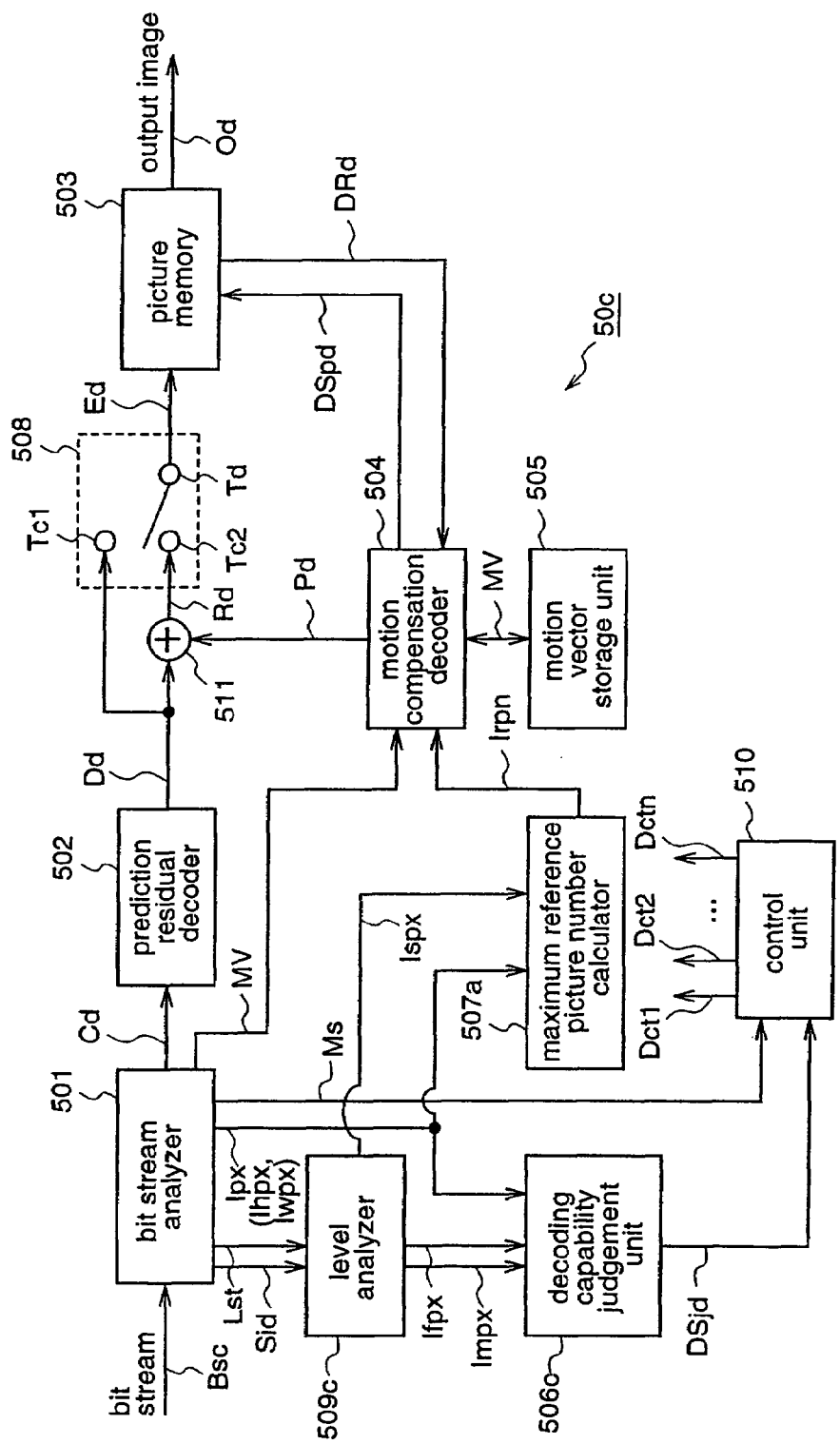
FIG. 12 is a block diagram for explaining a moving picture decoding apparatus 50*c* according to a seventh embodiment of the present invention.

FIG. 12 is a block diagram for explaining a moving picture decoding apparatus 50c according to a seventh embodiment of the present invention.

The moving picture decoding apparatus 50c according to the seventh embodiment receives a bit stream corresponding to plural pictures that constitute a moving picture, and decodes the bit stream in predetermined data processing units, i.e., in units of blocks. More specifically, this moving picture decoding apparatus 50c decodes a bit stream Bsc (FIG. 14(c)) that is generated by the moving picture coding apparatus 10c according to the third embodiment. Therefore, the bit stream analyzer 501 according to the seventh embodiment analyzes header information H1 and H3, to extract the level identifier Lst and the identification number signal Sid, and analyzes data in the sequence data part Dsq, to extract information corresponding each macroblock such as coding mode information Ms, coded data Cd, motion vector information MV, and input image size information Ipx.

The level analyzer 509c of the moving picture decoding apparatus 50c according to the seventh embodiment has the tables T1 and T3, and outputs maximum intra frame pixel number information Ifpx and storage pixel maximum number information Ispx on the basis of the level signal Lst outputted from the bit stream analyzer 501, as well as outputs maximum image size information Impx on the basis of the identification number signal Sid outputted from the bit stream analyzer 501. Further, the decoding capability judgment unit 506c according to the seventh embodiment judges whether decoding of the inputted bit stream Bsc is possible or not on the basis of the maximum intra frame pixel number information Ifpx and the maximum image size information Impx from the level analyzer 509c, and the input image size information Ipx from the bit stream analyzer 501. Here, the maximum image size information Impx is composed of information Imhpx indicating the maximum number of vertical pixels (H) and information Imwpx indicating the maximum number of horizontal pixels (W).

Constructions of the other components in the moving picture decoding apparatus 50c according to the seventh embodiment are the same as those in the moving picture decoding apparatus 50a according to the fifth embodiment.

Further, a specific construction of the decoding capability judgment unit 506c in the moving picture decoding apparatus 50c according to the seventh embodiment is identical to that of the coding capability judgment unit 108c in the moving picture coding apparatus 10c according to the third embodiment as shown in FIG. 7.

Next, the operation will be described.

When the bit stream Bsc is inputted to the moving picture decoding apparatus 50c, the bit stream analyzer 501 initially analyzes the bit stream Bsc, and extracts various kinds of information such as coding mode information Ms, motion vector information MV, and coded data Cd, from the bit stream Bsc. At that time, various kinds of header information included in the header area Hc of the bit stream Bsc are simultaneously extracted, and outputted to the level analyzer 509c, the decoding capability judgment unit 506c, and the maximum reference picture calculator 507a.

The level analyzer 509c refers to the table T1 (FIG. 15) that is held therein, and outputs maximum intra frame pixel number information Ifpx and storage pixel maximum number information Ispx in accordance with the level signal (level identifier signal) Lst corresponding to header information (code) H1 in the header area Hc. Further, the level analyzer 509c refers to the table T3 (FIG. 18(a)) that is held therein, and outputs maximum image size information Impx (vertical pixel maximum number information Imhpx and horizontal pixel maximum number information Imwpx) in accordance with an identification number signal Sid corresponding to header information (a code) H3 in the header area Hc. The maximum intra frame pixel number information Ifpx and the maximum image size information Impx is inputted to the decoding capability judgment unit 506c, while the maximum storage pixel number information Ispx is inputted to the maximum reference picture calculator 507a.

Then, the decoding capability judgment unit 506c judges whether decoding of the inputted bit stream Bsc is possible or not, on the basis of the maximum intra frame pixel number information Ifpx and the maximum image size information Impx (vertical pixel maximum number information Imhpx and horizontal pixel maximum number information Imwpx) from the level analyzer 509c, and the input image size information Ipx (input image vertical pixel number information Ihpx and input image horizontal pixel number information Iwpx) that has been extracted from the sequence header by the bit stream analyzer 501, and outputs a signal indicating the judgement result (judgement result signal) Dsjd to the control unit 510.

In this seventh embodiment, the decoding for the bit stream Bsc is performed in accordance with the judgement result signal DSjd in the same manner as the moving picture decoding apparatus 50a of the fifth embodiment.

Next, a specific operation of the decoding capability judgment unit 506c in the moving picture decoding apparatus 50c will be briefly described.

In the decoding capability judgment unit 506c in the moving picture decoding apparatus 50a according to the seventh embodiment, it is judged whether the decoding for the inputted bit stream Bsc is possible or not, according to the conditional formulas (formula 1), (formula 2a), and (formula 2b).

Initially, the decoding capability judgment unit 506c performs the operation indicated by the (formula 1) on the basis of the input image size information Ipx (vertical pixel number information Ihpx and horizontal pixel number information Iwpx) that is outputted from the bit stream analyzer 501, in the same manner as the decoding capability judgment unit 506a according to the fifth embodiment. That is, multiplication for obtaining the product (h×w) of the number of vertical pixels (h) and the number of horizontal pixels (w) in the input image is performed, and comparison between the multiplication result (h×w) and the maximum number of intra frame pixels (Nfpx) (i.e., intra frame pixel number comparison) is performed.

Then, on the basis of the maximum image size information Impx (vertical pixel maximum number information Imhpx and horizontal pixel maximum number information Imwpx), the decoding capability judgment unit 506c performs comparison between the input image vertical pixel number (h) and the maximum vertical pixel number (H) indicated by the maximum vertical pixel number information Imhpx (i.e., vertical pixel number comparison), and comparison between the input image horizontal pixel number (w) and the maximum horizontal pixel number (W) indicated by the maximum horizontal pixel number information Imwpx (i.e., horizontal pixel number comparison).

Then, the final judgement as to the capability or incapability of decoding is performed on the basis of the results of the intra frame pixel number comparison, the vertical pixel number comparison, and the horizontal pixel number comparison.

As described above, the moving picture decoding apparatus 50c according to the seventh embodiment includes the level analyzer 509c that decides the maximum number of intra frame pixels (Nfpx) which can be decoded and the maximum number of storage pixels (Nspx) which can be stored in the picture memory 503 and decides the maximum image size (Nmpx) as well as decides the maximum image size (Nmpx), on the basis of the level identifier (level signal) Lst and the identification number signal Sid, which are extracted from the bit stream Bsc by the bit stream analyzer 501, thereby judging whether the decoding for the inputted bit stream Bsc is possible or not on the basis of the maximum intra frame pixel number (Nfpx) and the maximum image size (Nmpx) which are decided by the level analyzer 509c, and the input image size information Ipx included in the bit stream Bsc, and calculating the number of reference candidate pictures which can be referred to at the inter picture prediction decoding (reference picture maximum number) Nrpn. Therefore, bit streams which can be decoded by the moving picture decoding apparatus among bit streams which have been supplied from the coding end can be determined on the basis of the level identifier, whereby picture prediction decoding corresponding to the picture prediction coding on the coding end can be satisfactorily performed. Accordingly, a memory area of a decoding apparatus that is adapted to the coding method in which there is no restraint on the capacity of the memory area can be designed.

In this seventh embodiment, the maximum number of vertical pixels (H) and the maximum number of horizontal pixels (W) are obtained on the basis of the maximum image size information Impx included in the bit stream Bsc. Therefore, the process for obtaining the maximum number of vertical pixels (H) and the maximum number of horizontal pixels (W) is facilitated as compared to the fifth embodiment.

In this seventh embodiment, the level identifier corresponding to the maximum intra frame pixel number (Nfpx) and the maximum storage pixel number (Nspx), and the identification number corresponding to the maximum number of vertical pixels (H) and the maximum number of horizontal pixels (W) are parameters that indicate independent coding conditions, respectively. However, values of the identification number can be correlated with values of the level identifier.

In this case, specific values of the maximum number of vertical pixels (H) and the maximum number of horizontal pixels (W) are decided together with specific values of the maximum number of intra frame pixels (Nfpx) and the maximum number of storage pixels (Nspx) in accordance with the level signal Lst indicating the level identifier with reference to the tables T1 and T3. That is, when the level signal Lst from the bit stream analyzer 501 is inputted to the level analyzer 509c, the level analyzer 509c outputs information Ifpx and Ispx indicating the intra frame maximum number (Nfpx) and the maximum storage pixel number (Nspx), respectively, with reference to the table T1 on the basis of the level signal Lst, and further outputs the maximum image size information Impx with reference to the table T3 on the basis of the identification number corresponding to the level identifier. In this case, the bit stream Bsc includes only the code Hc corresponding to the level signal Lst, and thus the identification number signal Sid corresponding to the code H3 is not outputted from the bit stream analyzer 501 to the level analyzer 509c.

Further, in the seventh embodiment, the moving picture decoding apparatus analyzes the code H1 of the level identifier corresponding to the maximum intra frame pixel number (Nfpx) and the maximum storage pixel number (Nspx), and the code H3 of the identification number corresponding to the maximum number of vertical pixels (H) and the maximum number of horizontal pixels (W), then obtains the inter-frame pixel maximum number (Nfpx) and the maximum storage pixel number (Nspx) from the table T1 on the basis of the level identifier obtained by the analysis of the code H1, and obtains the maximum number of vertical pixels (H) and the maximum number of horizontal pixels (W) from the table T3 on the basis of the identification number signal Sid obtained by the analysis of the code H3. However, the moving picture decoding apparatus may analyze a code that is obtained by coding the maximum image size information Impx indicating arbitrary vertical pixel maximum number (H) and horizontal pixel maximum number (W) which are decided by the user, and obtain the maximum image size information Impx directly by the analysis of the code.

In this case, decision of specific values of the intra frame maximum pixel number (Nfpx) and the maximum storage pixel number (Nspx) is performed on the basis of the table T1, while decision of specific values of the maximum vertical pixel number (H) and horizontal pixel maximum number (W) is performed by the analysis of the code corresponding to the maximum image size information Impx, without using any table.

In other words, when the level signal Lst from the bit stream analyzer 501 is inputted to the level analyzer 509c, the level analyzer 509c outputs information Ifpx indicating the maximum intra frame pixel number (Nfpx), which is decided on the basis of the table T1, to the decoding capability judgment unit 506c, and outputs information Ispx indicating the maximum storage pixel number (Nspx), which is decided on the basis of the table T1, to the maximum reference picture calculator 507a, in accordance with the level signal Lst. Further, the maximum image size information Impx indicating specific values of the maximum vertical pixel number (H) and the maximum horizontal pixel number (W), which is obtained by the analysis of the code in the bit stream analyzer 501 is directly inputted to the decoding capability judgment unit 506c.

Embodiment 8

Figure 13:
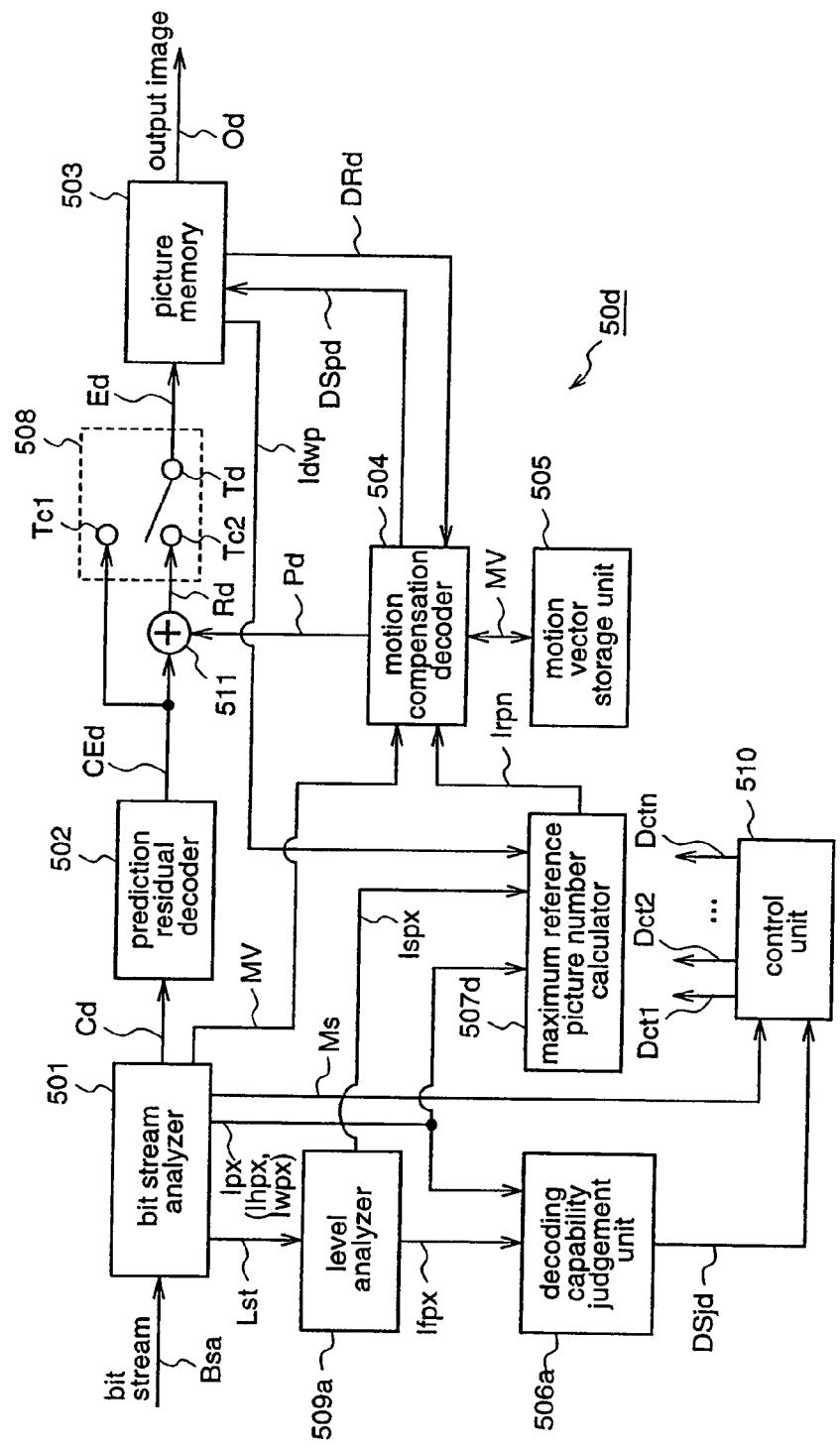
FIG. 13 is a block diagram for explaining a moving picture decoding apparatus 50*d* according to an eighth embodiment of the present invention.

FIG. 13 is a block diagram for explaining a moving picture decoding apparatus 50d according to an eighth embodiment of the present invention.

The moving picture decoding apparatus 50d of the eighth embodiment receives a bit stream corresponding to plural pictures that constitute a moving picture, and decodes the bit stream in predetermined data processing units, i.e., in units of blocks. More specifically, the moving picture decoding apparatus 50d decodes a bit stream Bsa (FIG. 14(a)) which is generated by the moving picture coding apparatus 10d according to the fourth embodiment. However, the bit stream generated by the moving picture coding apparatus 10d of the fourth embodiment has the same data structure as that of the bit stream generated by the moving picture coding apparatus 10a of the first embodiment, and accordingly the moving picture decoding apparatus 50d can also decode the bit stream generated by the moving picture coding apparatus 10a of the first embodiment.

That is, the moving picture decoding apparatus 50d according to the eighth embodiment has, in place of the maximum reference picture calculator 507a in the moving picture decoding apparatus 50a according to the fifth embodiment, a maximum reference picture calculator 507d that calculates the maximum number of reference pictures (Nrpn) on the basis of input image size information Ipx (input image vertical pixel number information Ihpx and input image horizontal pixel number information Iwpx), maximum storage pixel number information Ispx, display wait picture number information Idwp, and outputs information indicating the calculated value (Nrpn) (i.e., reference picture maximum number information) Irpn.

Figure 26A:
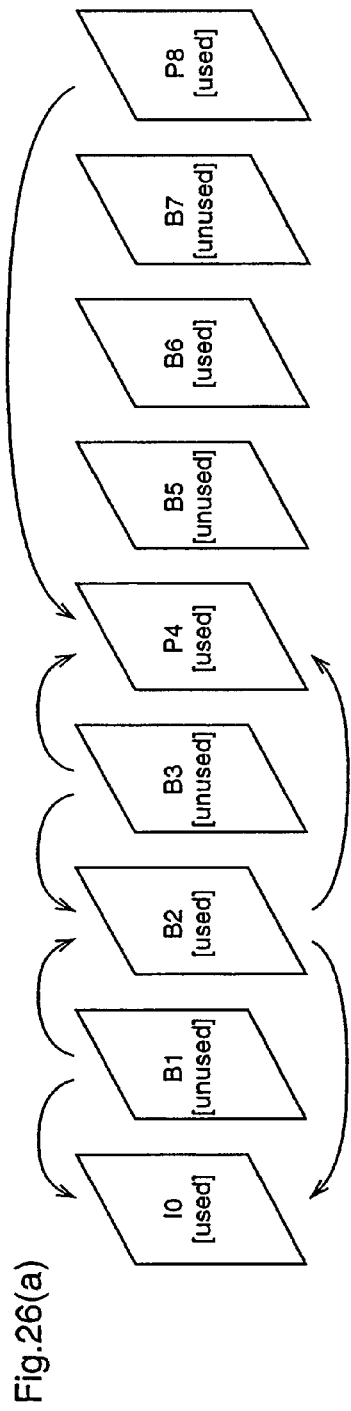
FIG. 26 are diagrams schematically showing the control for display wait pictures in the conventional coding method and decoding method, FIG. 26(*a*) showing pictures which are referred to ([used]) and pictures which are not referred to ([unused]), and FIG. 26(b) showing the relationship between the decoding timing and the coding timing of each picture.
Figure 26B:
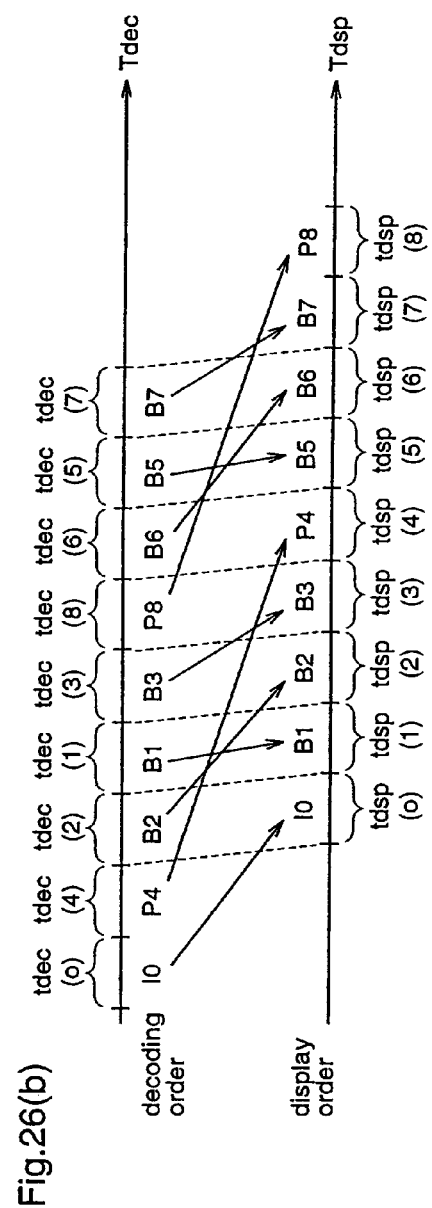

Here, the display wait picture number information Idwp is information that indicates the number of display wait pictures, and the display wait picture are decoded pictures which are not employed as reference pictures but whose image data are kept stored in a picture memory of the decoding apparatus until display of these pictures is performed, as described with reference to FIG. 26. Further, the control of the picture memory according to the eighth embodiment is performed so that image data of a picture that is not employed as the reference picture is deleted from the picture memory immediately after the display of the picture is finished.

Constructions of the other components in the moving picture decoding apparatus 50d according to the eighth embodiment are the same as those in the moving picture decoding apparatus 50a according to the fifth embodiment.

A specific construction of the maximum reference picture calculator 507d in the moving picture decoding apparatus 50d according to the eighth embodiment is identical to that of the maximum reference picture calculator 109d in the moving picture coding apparatus 10d according to the fourth embodiment, as shown in FIG. 9.

Next, its operation will be described.

The operation of the moving picture decoding apparatus 50d according to the eighth embodiment is different from the operation of the moving picture decoding apparatus 50a according to the fifth embodiment only in the operation of the maximum reference picture calculator 507d.

Hereinafter, only the operation of the maximum reference picture calculator 507d will be described.

The maximum reference picture calculator 507d of the moving picture decoding apparatus 50d according to the eighth embodiment calculates the maximum number of reference candidate pictures which are employed at the inter picture prediction decoding, according to the operation indicated by the (formula 11).

That is, in the maximum reference picture calculator 507d, the total number of pixels in one frame (h×w) as the size of the input image is calculated on the basis of the input image vertical pixel number information Ihpx and the input image horizontal pixel number information Iwpx.

Next, an operation of dividing the maximum storage pixel number (Nspx) by the multiplication result (h×w) is performed, and an operation of subtracting 1 from the division result (Nspx/(h×w)) is performed.

Then, the reference picture maximum number is decided by subtracting the number of display wait pictures (Ndwp) from the subtraction result (Nspx/(h×w)−1).

As described above, the moving picture decoding apparatus 50d according to the eighth embodiment includes the level analyzer 509a that decides the maximum number of intra frame pixels which can be decoded (Nfpx), and the maximum number of storage pixels which can be stored in the picture memory 503 (Nspx), on the basis of the level identifier indicated by the level signal Lst which is extracted from the bit stream Bsa by the bit stream analyzer 501, thereby performing judgement as to the capability or incapability of decoding for the inputted bit stream Bsa on the basis of the maximum intra frame pixel number (Nfpx) and the input image size (the number of vertical pixels Nhpx and the number of horizontal pixels Nwpx), as well as calculating the number of reference candidate pictures which can be referred to at the inter picture prediction decoding (reference picture maximum number) Nrpn. Therefore, a bit stream which can be decoded by the moving picture decoding apparatus, among bit streams supplied from the coding end can be determined by the level identifier, thereby satisfactorily performing picture prediction decoding corresponding to the picture prediction coding on the coding end. Accordingly, a memory area in the decoding apparatus corresponding to the coding method in which there is no restraint on the capacity of the memory area can be designed.

In this eighth embodiment, the maximum number of reference pictures which are stored in the picture memory is decided in view of the number of display wait pictures (Ndwp). Therefore, the picture memory in which image data of reference candidate pictures are stored can be efficiently utilized depending on the status of processing for image data.

Here, in the eighth embodiment, the control of the picture memory is performed so that image data of a picture which is not employed as a reference picture are deleted from the picture memory immediately after display of the picture is finished. However, the image data of a picture that is not employed as the reference picture may be deleted in timing other than immediately after the display as described in the eighth embodiment.

For example, the control of the picture memory in the eighth embodiment may be performed so that image data of a picture that is stored in the picture memory but is not employed as the reference picture are deleted from the picture memory after a display time of one picture expires after the picture has been displayed. In this case, the image data of the display wait picture are kept stored in the picture memory for a predetermined time period after the picture has been displayed.

Further, in the first to eighth embodiments, the moving picture coding apparatus or the moving picture decoding apparatus is implemented by hardware, while the moving picture coding apparatus or the moving picture decoding apparatus may be implemented by software. In this case, by recording a program for executing the coding processing or the decoding processing as described in any of the above embodiments, in a data storage medium such as a flexible disk, the moving picture coding apparatus or the moving picture decoding apparatus can be constructed in an independent computer system.

FIG. 19 are diagrams for explaining a system which implements the moving picture coding apparatus according to any of the first to fourth embodiments or the moving picture decoding apparatus according to any of the fifth to eighth embodiments, with a computer system, by utilizing a flexible disk that contains the program.

Figure 19A:
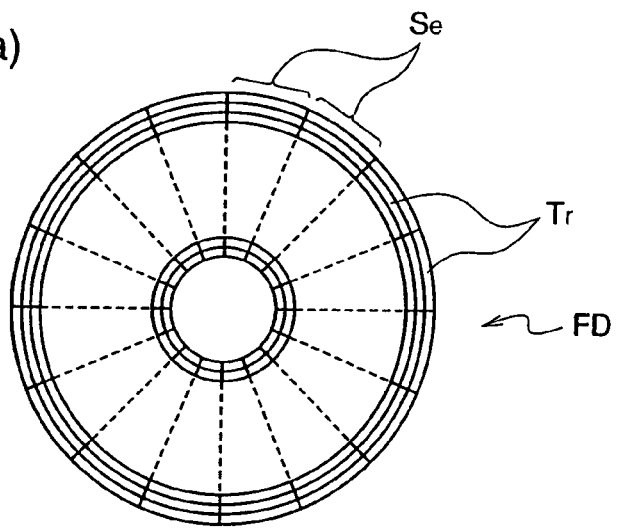
FIG. 19 are diagrams explaining a data storage medium that contains a program for implementing the moving picture coding apparatus or the moving picture decoding apparatus according to any of the above embodiments by a computer system (FIGS. 19(*a*) and 19(*b*)), and the computer system (FIG. 19(*c*)).
Figure 19B:
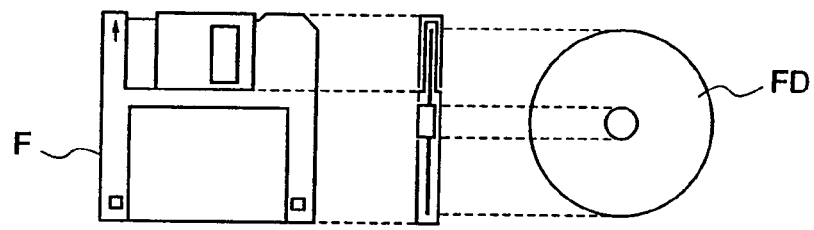

FIG. 19(b) shows the front view of a flexible disk, the cross-sectional view thereof, and a flexible disk body, and FIG. 19(a) shows an example of a physical format of the flexible disk as a storage medium body. To be specific, the flexible disk body FD is contained in the flexible disk case F. On the surface of the flexible disk body, plural tracks Tr are concentrically formed from the outer circumference toward the inner circumference. Each track Tr is divided into 16 sectors Se in the angular direction. Accordingly, in the flexible disk in which the above-described program is stored, data of the program are recorded in the sectors assigned onto the flexible disk body FD.

Figure 19C:
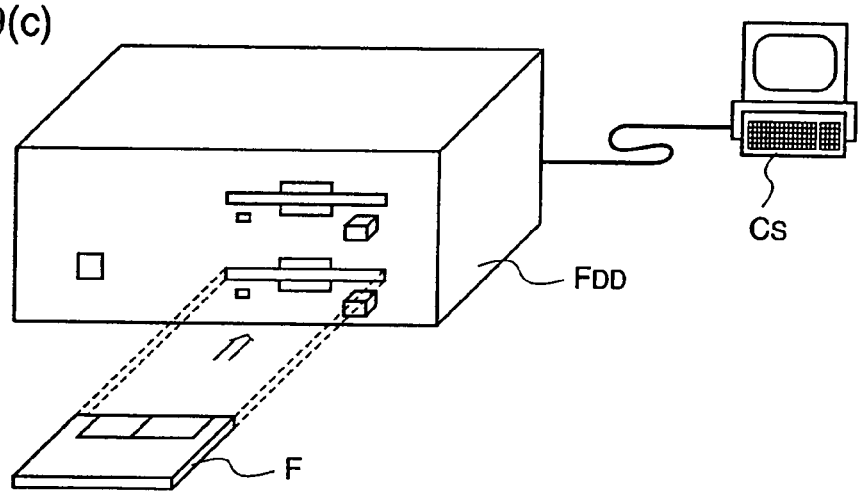

FIG. 19(c) shows a construction for recording or reproducing the program on/from the flexible disk FD. When the program is written in the flexible disk FD, data of the program supplied from a computer system Cs are written in the flexible disk FD via a flexible disk drive. When the moving picture coding apparatus or the moving picture decoding apparatus is constructed in the computer system Cs using the program recorded on the flexible disk, the program is read from the flexible disk by the flexible disk drive, and loaded onto the computer system.

While in the above description a flexible disk is employed as the data storage medium, an optical disk may be employed as the data storage medium. Also in this case, the moving picture coding apparatus or the moving picture decoding apparatus can be implemented by a computer system. Further, the data storage medium is not restricted to the optical disk and the flexible disk. Any medium, such as an IC card or a ROM cassette, may be employed so long as the program can be stored in the medium.

Hereinafter, applications of the moving picture coding apparatus or the moving picture decoding apparatus according to any of the aforementioned embodiments, and systems using the application will be described hereinafter.

FIG. 20 is a block diagram illustrating an entire construction of a contents provision system 1100 that provides contents distribution services.

A communication service providing area is divided into regions (cells) of desired size, and base stations 1107 to 1110 which are each fixed radio stations are established in the cells, respectively.

In this contents provision system 1100, various devices such as a computer 1111, a PDA (personal digital assistant) 1112, a camera 1113, a portable phone 1114, and a portable phone with a camera 1200 are connected, for example to the Internet 1101, through an Internet service provider 1102, a telephone network 1104, and the base stations 1107 to 1110.

The contents provision system 1100 is not restricted to a system including all of the plural devices shown in FIG. 20, but may be one including some of the plural devices shown in FIG. 20. Further, the respective devices may be connected directly to the telephone network 1104, not through the base stations 1107 to 1110 as the fixed radio stations.

The camera 1113 is a device that can take moving pictures of an object, like a digital video camera. The portable phone may be a portable phone set according to any of PDC (Personal Digital Communications) system, CDMA (Code Division Multiple Access) system, W-CDMA (Wideband-Code Division Multiple Access) system, and GSM (Global System for Mobile Communications) system, or PHS (Personal Handyphone System).

A streaming server 1103 is connected to the camera 1113 through the base station 1109 and the telephone network 1104. In this system, live distribution, based on coded data which are transmitted by the user, using the camera 1113 can be performed. The processing for coding data of taken pictures may be carried out by either the camera 1113 or the server that transmits the data. Moving picture data which are obtained by taking moving pictures of an object by means of the camera 1116 may be transmitted to the streaming server 1103 through the computer 1111. The camera 1116 is a device that can take still pictures or moving pictures of an object, such as a digital camera. In this case, coding of the moving picture data can be performed by either the camera 1116 or the computer 1111. Further, the coding processing is carried out by an LSI 1117 included in the computer 1111 or the camera 1116.

Image coding or decoding software may be stored in a storage medium (a CD-ROM, a flexible disk, a hard disk, or the like), which is a recording medium containing data that is readable by the computer 1111 or the like. Further, the moving picture data may be transmitted through the portable phone with a camera 1200. The moving picture data are data which have been coded by an LSI included in the portable phone 1200.

In this contents provision system 1100, contents whose pictures are taken by the user with the camera 1113 or camera 1116 (for example, live video of a music concert) are coded in the same manner as any of the aforementioned embodiments, and transmitted from the camera to the streaming server 1103. The contents data are subjected to streaming distribution from the streaming server 1103 to a requesting client.

The client may be any of the computer 1111, the PDA 1112, the camera 1113, the portable phone 1114 and the like, which can decode the coded data.

In this contents provision system 1100, the coded data can be received and reproduced on the client side. When the data are received, decoded, and reproduced in real time on the client side, private broadcasting can be realized.

The coding or decoding in the respective devices that constitute this system can be performed using the moving picture coding apparatus or the moving picture decoding apparatus according to any of the aforementioned embodiments.

A portable phone will be now described as an example.

Figure 21:
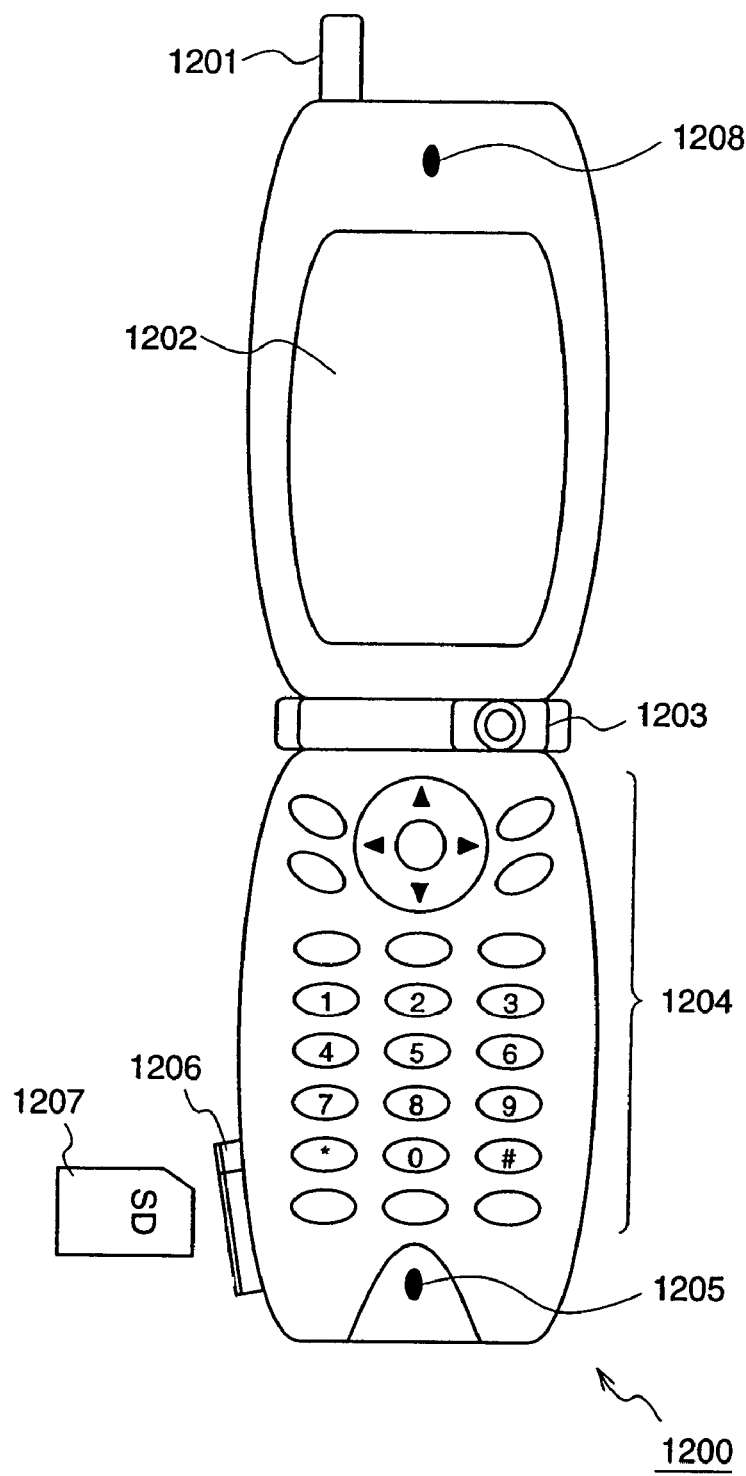
FIG. 21 is a diagram for explaining a portable phone 1200 that utilizes the moving picture coding apparatus and the moving picture decoding apparatus according to any of the above embodiments.

FIG. 21 is a diagram illustrating a portable phone 1200 that utilizes the moving picture coding apparatus and the moving picture decoding apparatus according to any of the aforementioned embodiments.

This portable phone 1200 includes an antenna 1201 for transmitting/receiving radio waves to/from the base station 1110, a camera unit 1203 that can take video or still pictures of an object, such as a CCD camera, and a display unit 1202 such as a liquid crystal display for displaying data of the video taken by the camera unit 1203 or video received through the antenna 1201.

The portable phone 1200 further includes a main body 1204 including plural control keys, a voice output unit 1208 for outputting voices such as a speaker, a voice input unit 1205 for inputting voices such as a microphone, a storage medium 1207 for retaining coded data or decoded data such as data of taken moving pictures or still pictures, or data, moving picture data or still picture data of received e-mail, and a slot unit 1206 which enables the storage medium 1207 to be attached to the portable phone 1200.

The storage medium 1207 contains a flash memory element as a type of EEPROM (Electrically Erasable and Programmable Read Only Memory) that is an electrically programmable and erasable non-volatile memory contained in a plastic case, like a SD card.

The portable phone 1200 will be described more specifically with reference to FIG. 22.

The portable phone 1200 has a main control unit 1241 that performs general control for the respective units of the main body including the display unit 1202 and the control key 1204.

The portable phone 1200 further includes a power supply circuit 1240, an operation input control unit 1234, an image coding unit 1242, a camera interface unit 1233, a LCD (Liquid Crystal Display) control unit 1232, an image decoding unit 1239, a multiplexing/demultiplexing unit 1238, a recording/reproduction unit 1237, a modulation/demodulation unit 1236, and an audio processing unit 1235. The respective units of the portable phone 1200 are connected to each other via a synchronization bus 1250.

The power supply circuit 1240 supplies power from a battery pack to the respective units when a call end/power supply key is turned ON under the control of the user, thereby activating the digital portable phone with a camera 1200 to be turned into an operable state.

In the portable phone 1200, the respective units operate under control of the main control unit 1241 that is constituted by a CPU, a ROM, a RAM and the like. To be more specific, in the portable phone 1200, an audio signal that is obtained by voice inputting into the voice input unit 1205 in a voice communication mode is converted into digital audio data by the audio processing unit 1235. The digital audio data are subjected to a spectrum spread process by the modulation/demodulation circuit 1236, further subjected to a D/A conversion process and a frequency transformation process by the transmission/receiving circuit 1231, and transmitted through the antenna 1201.

In this portable phone set 1200, a signal received through the antenna 1201 in the voice communication mode is amplified, and then subjected to a frequency transformation process and an A/D conversion process. The received signal is further subjected to a spectrum inverse spread process in the modulation/demodulation circuit 1236, converted into an analog audio signal by the audio processing unit 1235, and this analog audio signal is outputted through the voice output unit 1208.

When the portable phone 1200 transmits electronic mail in a data communication mode, text data of the e-mail that is inputted by manipulation of the control key 1204 on the main body are transmitted to the main control unit 1241 via the operation input control unit 1234. The main control unit 1241 controls the respective units so that the text data are subjected to the spectrum spread process in the modulation/demodulation circuit 1236, then subjected to the D/A conversion process and the frequency transformation process in the transmission/receiving circuit 1231, and thereafter transmitted to the base station 1110 through the antenna 1201.

When this portable phone 1200 transmits image data in the data communication mode, data of a picture taken by the camera unit 1203 are supplied to the image coding unit 1242 via the camera interface unit 1233. When the portable phone 1200 does not transmit the image data, the data of the picture taken by the camera unit 1203 can be displayed directly on the display unit 1202 via the camera interface unit 1233 and the LCD control unit 1232.

The image coding unit 1242 includes the moving picture coding apparatus according to any of the aforementioned embodiments. This image coding unit 1242 compressively encodes the image data supplied from the camera unit 1203 by the moving picture coding method according to any of the above embodiments to convert the same into coded image data, and outputs the obtained coded image data to the multiplexing/demultiplexing unit 1238. At the same time, the portable phone 1200 transmits voices which have been inputted to the voice input unit 1205 while the picture has been taken by the camera unit 1203, as digital audio data, to the multiplexing/demultiplexing unit 1238 through the audio processing unit 1235.

The multiplexing/demultiplexing unit 1238 multiplexes the coded image data supplied from the image coding unit 1242 and the audio data supplied from the audio processing unit 1235 by a predetermined method. Resultant multiplexed data are subjected to a spectrum spread process in the modulation/demodulation circuit 1236, then further subjected to the DA conversion process and the frequency transformation process in the transmission/receiving circuit 1231, and obtained data are transmitted through the antenna 1201.

When the portable phone 1200 receives data of a moving picture file that is linked to a home page or the like in the data communication mode, a signal received from the base station 1110 through the antenna 1201 is subjected to a spectrum inverse spread process by the modulation/demodulation circuit 1236, and resultant multiplexed data are transmitted to the multiplexing/demultiplexing unit 1238.

When the multiplexed data that have been received via the antenna 1201 are decoded, the multiplexing/demultiplexing unit 1238 demultiplexes the multiplexed data to divide the data into a coded bit stream corresponding to the image data and a coded bit stream corresponding to the audio data, and the coded image data are supplied to the image decoding unit 1239 and the audio data are supplied to the audio processing unit 1235, via the synchronization bus 1250.

The image decoding unit 1239 includes the moving picture decoding apparatus according to any of the aforementioned embodiments. The image decoding unit 1239 decodes the coded bit stream of the image data by the decoding method corresponding to the coding method according to any of the above-mentioned embodiments, to reproduce moving picture data, and supplies the reproduced data to the display unit 1202 through the LCD control unit 1232. Thereby, for example, the moving picture data included in the moving picture file that is linked to the home page is displayed. At the same time, the audio processing unit 1235 converts the audio data into an analog audio signal, and thereafter supplies the analog audio signal to the voice output unit 1208. Thereby, for example, reproduction of the audio data included in the moving picture file that is linked to the home page is performed.

The system to which the moving picture coding method and the moving picture decoding method according to any of the aforementioned embodiments is applicable is not restricted to the above-mentioned contents provision system.

Figure 23:
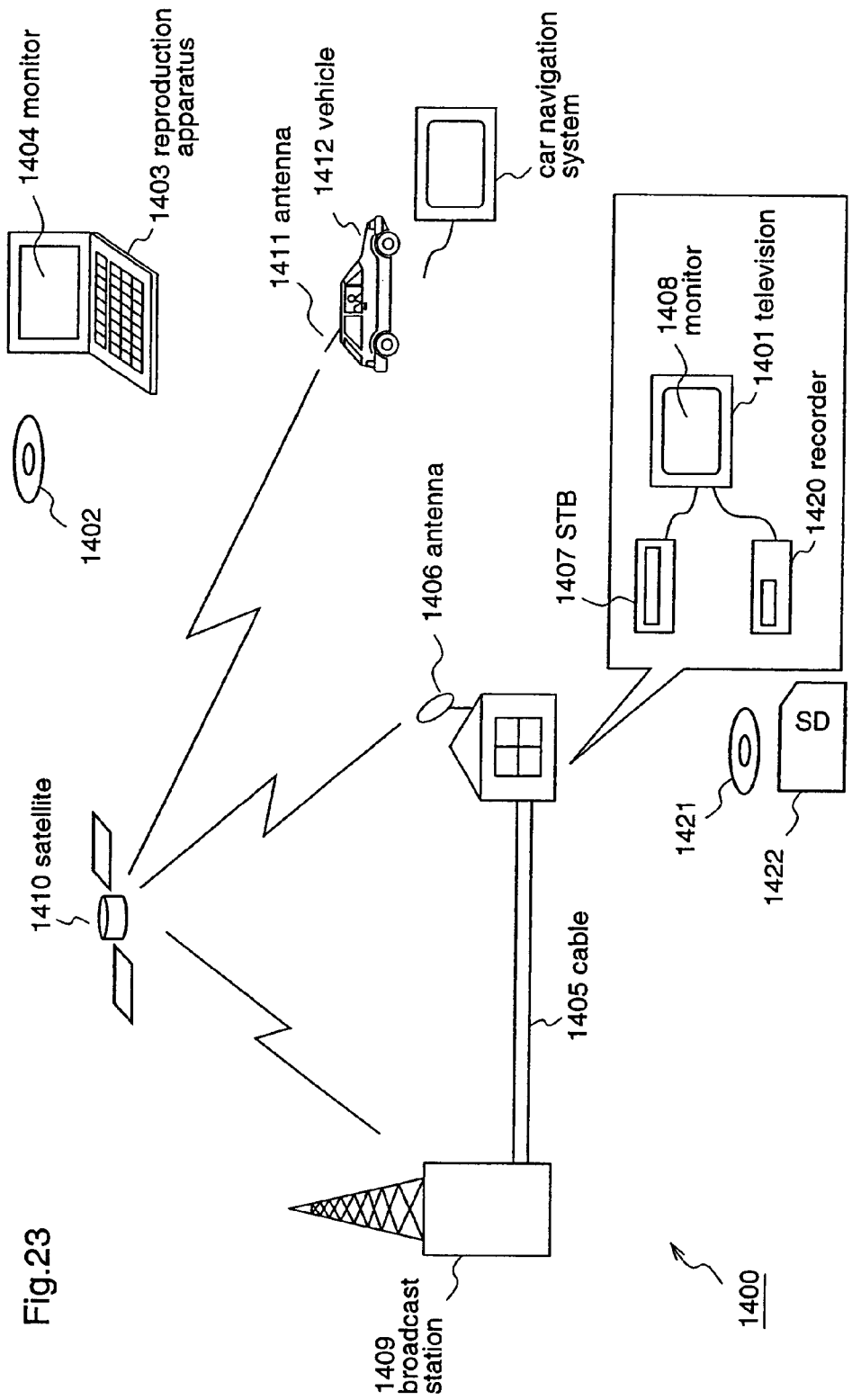
FIG. 23 is a conceptual drawing showing a digital broadcasting system 1400 that utilizes the moving picture coding apparatus or the moving picture decoding apparatus according to any of the above embodiments.
Figure 24A:
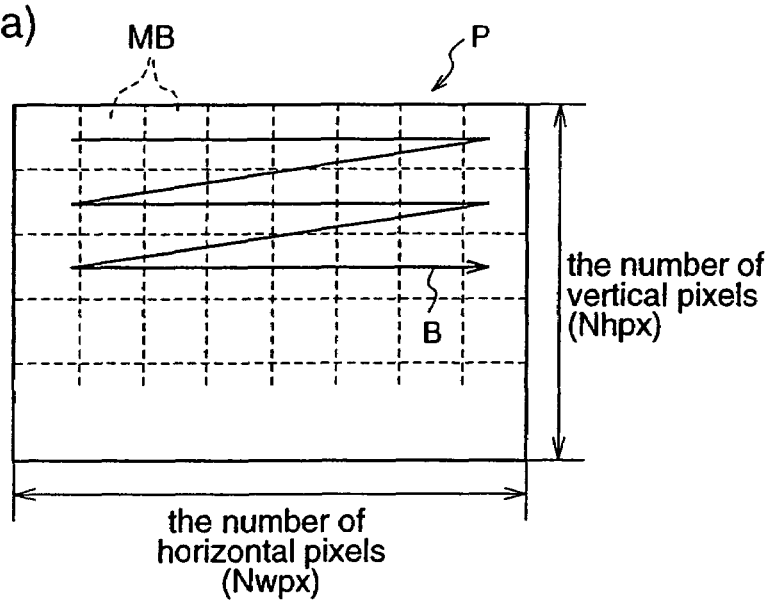
FIG. 24 are diagram for explaining a conventional coding method, and FIG. 24(*a*) showing the order of coding for macroblocks in a target picture to be coded, and FIG. 24(*b*) showing surrounding macroblocks which are referred to at the coding of a target macroblock to be coded.
Figure 24B:
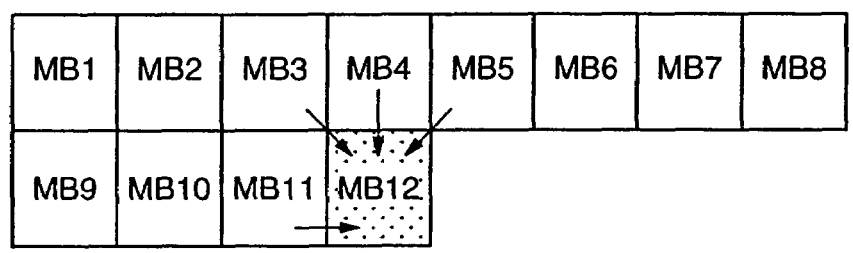
Figure 25:
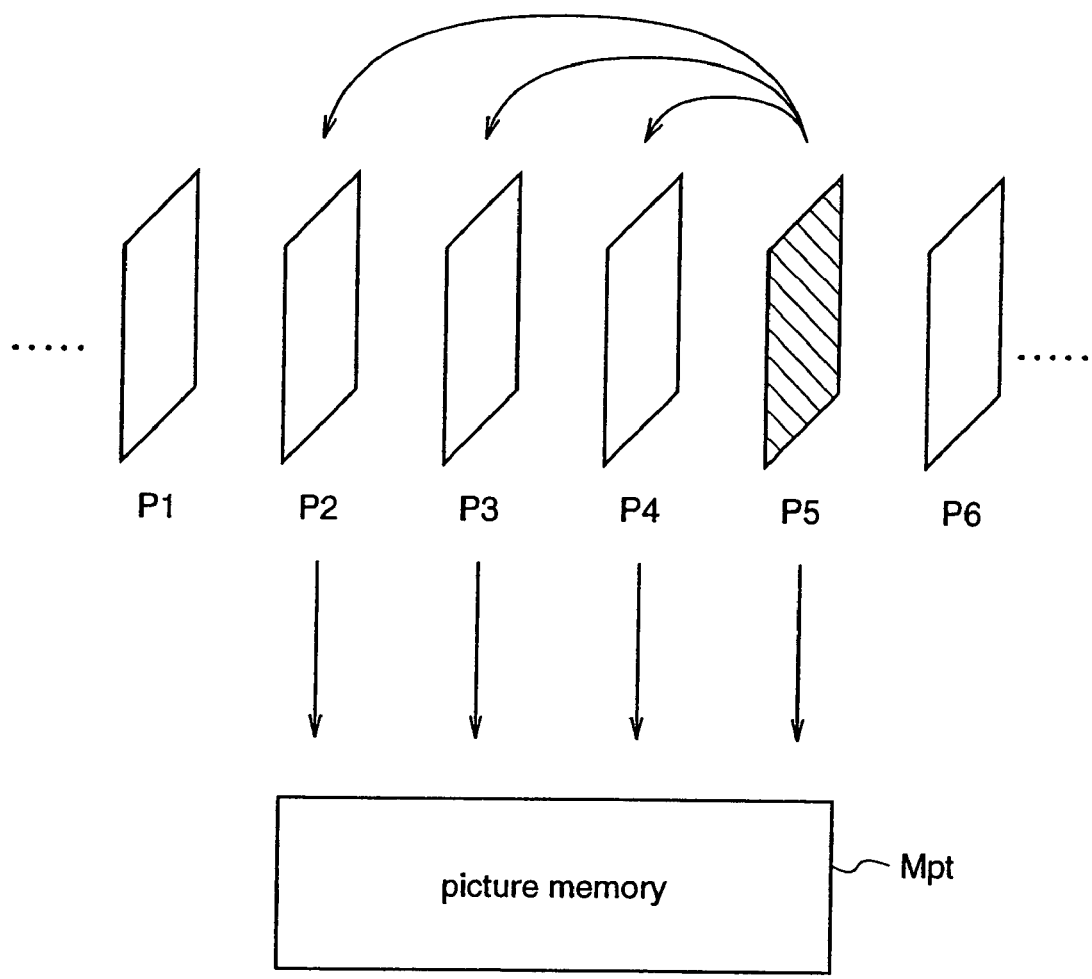
FIG. 25 is a diagram for explaining conventional coding method and decoding method, and shows other pictures whose image data are stored in a picture memory at the coding (or decoding) of a target picture.

Recently, digital broadcasting using satellites or terrestrial waves is talked frequently, and the moving picture coding apparatus and the moving picture decoding apparatus according to the above embodiments is applicable also to a digital broadcasting system 1400 as shown in FIG. 23.

More specifically, a coded bit stream corresponding to video information is transmitted from a broadcast station 1409 to a satellite 1410 such as a communication satellite or a broadcast satellite, via radio communication. When the broadcast satellite 1410 receives the coded bit stream corresponding to the video information, the satellite 1410 outputs broadcasting waves, and these waves are received by an antenna 1406 at home that is provided with satellite broadcast receiving facility. For example, an apparatus such as a television (receiver) 1401 or a set top box (STB) 1407 decodes the coded bit stream, and reproduces the video information.

Further, the moving picture decoding apparatus according to any of the aforementioned embodiments can be mounted also on a reproduction apparatus 1403 that can read and decode the coded bit stream recorded on a storage medium 1402 such as a CD or a DVD (recording medium).

In this case, reproduced video is displayed on a monitor 1404. The moving picture decoding apparatus may be mounted on the set top box 1407 that is connected to a cable 1405 for cable television or an antenna 1406 for satellite/terrestrial broadcast, to reproduce the output of the moving picture decoding apparatus to be displayed on a monitor 1408 of the television. In this case, the moving picture decoding apparatus may be incorporated not in the set top box but in the television. A vehicle 1412 having an antenna 1411 can receive a signal from the satellite 1410 or the base station 1107 (see FIG. 20), and reproduce a moving picture to be displayed on a display device of a car navigation system 1413 or the like which is mounted on the vehicle 1412.

Further, it is also possible that an image signal can be coded by the moving picture coding apparatus according to any of the aforementioned embodiments, and recorded in a recording medium.

A specific example of a recording device is a recorder 1420 such as a DVD recorder that records image signals on a DVD disk 1421, and a disk recorder that records image signals on a hard disk. The image signals may be recorded on a SD card 1422. Further, when the recorder 1420 includes the moving picture decoding apparatus according to any of the aforementioned embodiments, the image signals which are recorded on the DVD disk 1421 or the SD card 1422 can be reproduced by the recorder 1420 and displayed on the monitor 1408.

Figure 22:
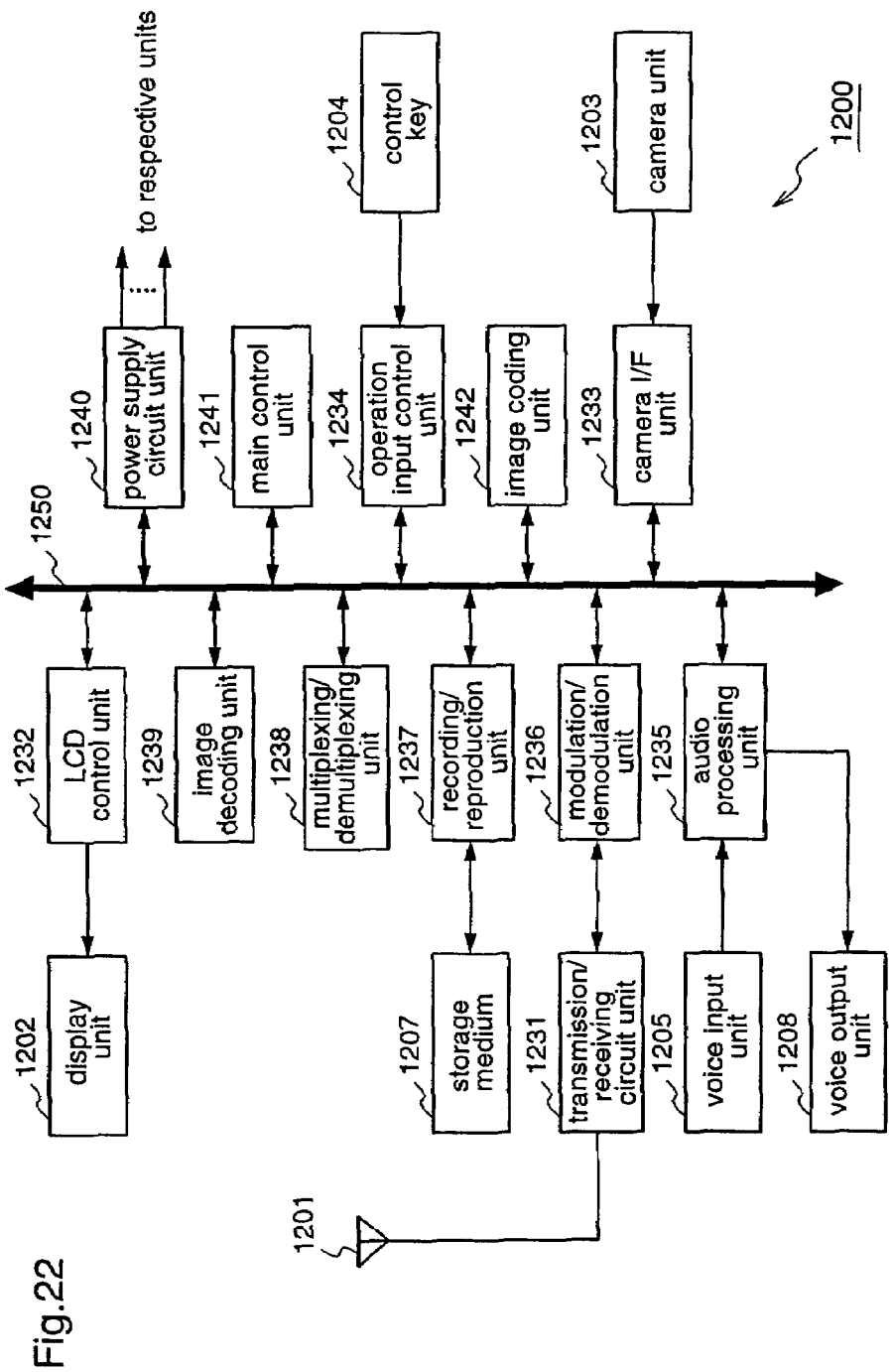
FIG. 22 is a block diagram illustrating a specific construction of the portable phone 1200 as shown in FIG. 21.

Here, the structure of the car navigation system 1413 may include, for example, the components of the portable phone shown in FIG. 22, other than the camera unit 1203, the camera interface unit 1233 and the image coding unit 1242. The same apply to the computer 1111 (see FIG. 20), or the television (receiver) 1401.

Further, as the terminal such as the portable phone 1114 (see FIG. 20), one of three types of terminals: a transmission-receiving type terminal having both of an encoder and a decoder, a transmission terminal having only an encoder, and a receiving terminal having only a decoder, can be mounted.

As described above, the moving picture coding apparatus or the moving picture decoding apparatus according to any of the aforementioned embodiments is applicable to any of the above-mentioned devices or systems, whereby the effects as described in the above embodiments can be obtained.

Further, it goes without saying that the embodiments and their applications of the present invention are not restricted to those shown in this description.

INDUSTRIAL AVAILABILITY

The moving picture coding method and the moving picture decoding method according to the present invention can set the maximum number of intra frame pixels for a picture which can be coded or decoded, at an optimum value selected from plural values that have been set stepwise depending on the coding level, in accordance with the specifications of the apparatus, whereby the memory area of the coding apparatus and the decoding apparatus that are adapted to a coding method in which there is no restraint on the capacity of the memory area can be designed, which is useful in designing the moving picture coding apparatus and the moving picture decoding apparatus.

The invention claimed is:

1. An LSI circuit which generates multiplexed data obtained by multiplexing coded audio data and coded picture data, said LSI circuit comprising:
   an audio coding circuit configured to obtain the coded audio data by coding audio data;
   a picture coding circuit configured to obtain the coded picture data by coding a moving picture including a plurality of pictures each picture having a prescribed number of pixels; and
   a multiplexing circuit configured to multiplex the coded audio data and the coded picture data,
   wherein said picture coding circuit includes:
   a level identifier output circuit configured to select a coding level which indicates a level of the coding processing for the moving picture and to output a level identifier for identifying the selected coding level;
   a coded data generating circuit configured to generate coded data of the moving picture by coding the moving picture according to the selected coding level; and
   a coded sequence generating circuit configured to multiplex the level identifier and the coded data to generate a code sequence,
   wherein the level identifier is an identifier that identifies i) a maximum in-frame pixel number which conforms to the selected coding level, the maximum in-frame pixel number being a maximum pixel number allowed for a picture of the moving picture, and ii) a maximum storage pixel number which conforms to the selected coding level, the maximum storage pixel number indicating an amount of data that can be stored in a picture memory;
   wherein said coded data generating circuit includes a predictive coding circuit configured to predictively code a picture to be coded with reference to a reference picture which has been coded;
   wherein a maximum number of candidate reference pictures which can be stored in the picture memory is calculated based on a vertical pixel number and a horizontal pixel number of the moving picture which is to be coded and the maximum storage pixel number identified by the level identifier,
   wherein the vertical pixel number (h) and the horizontal pixel number (w) of the moving picture satisfy the following condition:
   h×w<=(the maximum in-frame pixel number),
   where the vertical pixel number (h) is a multiple of 16, and the horizontal pixel number (w) is a multiple of 16.

2. A mobile terminal which comprises the LSI circuit of claim 1.

3. An LSI circuit which receives multiplexed data which is obtained by multiplexing coded audio data and coded picture data, said LSI circuit comprising:
   a demultiplexing circuit configured to separate the multiplexed data into the coded audio data and the coded picture data;
   an audio decoding circuit configured to decode the separated coded audio data; and
   a picture decoding circuit configured to decode the separated coded picture data which is generated by coding a moving picture comprising a plurality of pictures, each picture having a prescribed number of pixels;
   wherein said picture decoding circuit includes:
   a level identifier extracting circuit configured to extract a level identifier from the separated coded picture data, the level identifier identifying a coding level which indicates a level of the coding processing for the moving picture; and
   a decoding circuit configured to decode the separated coded picture data according to the level determined by the level identifier which is extracted by said level identifier extracting circuit, to generate decoded picture data of the moving picture,
   wherein the level identifier is an identifier that identifies i) a maximum in-frame pixel number which conforms to the coding level, the maximum in-frame pixel number being a maximum pixel number allowed for a picture of the moving picture, and ii) a maximum storage pixel number which conforms to the coding level, the maximum storage pixel number indicating an amount of data that can be stored in a picture memory,
   wherein a maximum number of candidate reference pictures which can be stored in the picture memory is calculated on the basis of a vertical pixel number and a horizontal pixel number of the moving picture which is to be decoded in said decoding circuit and the maximum storage pixel number identified by the level identifier, and
   wherein the vertical pixel number (h) and the horizontal pixel number (w) of the moving picture satisfy the following condition:
   h×w<=(the maximum in-frame pixel number),
   where the vertical pixel number (h) is a multiple of 16, and the horizontal pixel number (w) is a multiple of 16.

4. A mobile terminal which comprises the LSI circuit of claim 3.

* * * * *

UNITED STATES PATENT AND TRADEMARK OFFICE
CERTIFICATE OF CORRECTION

| | |
|---|---|
| PATENT NO. | : 7,664,178 B2 |
| APPLICATION NO. | : 11/976826 |
| DATED | : February 16, 2010 |
| INVENTOR(S) | : Kiyofumi Abe et al. |

It is certified that error appears in the above-identified patent and that said Letters Patent is hereby corrected as shown below:

Page 2, in Item (56) References Cited, under the "U.S. PATENT DOCUMENTS" heading, "6,381,275   4/2002   Fukunaga et al." should read --6,381,275   4/2002   Fukuhara et al.--.

Signed and Sealed this

Twenty-fourth Day of August, 2010

David J. Kappos
*Director of the United States Patent and Trademark Office*